US006965404B2

(12) United States Patent
Hosoda et al.

(10) Patent No.: US 6,965,404 B2
(45) Date of Patent: Nov. 15, 2005

(54) IMAGE RECORDING DEVICE, IMAGE INPUT DEVICE, AND DATA PROCESSOR, IMAGE RECORDING METHOD, AND STORAGE MEDIUM RECORDING IMAGE RECORD CONTROL PROGRAM

(75) Inventors: Yuichi Hosoda, Tokyo (JP); Nobuyodhi Kakigi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 09/910,896

(22) Filed: Jul. 24, 2001

(65) Prior Publication Data

US 2002/0021902 A1 Feb. 21, 2002

(30) Foreign Application Priority Data

Jul. 24, 2000 (JP) .............................. 2000/223138

(51) Int. Cl.⁷ .............................................. H04N 5/76
(52) U.S. Cl. ............................. 348/231.6; 348/207.2; 358/1.16
(58) Field of Search ..................... 271/298; 348/207.2, 348/231.6, 231.7; 358/1.16, 438, 434

(56) References Cited

U.S. PATENT DOCUMENTS 5,982,994 A * 11/1999 Mori et al. ................ 358/1.15

6,603,506 B2 * 8/2003 Ogawa et al. ............ 348/207.2
2002/0015171 A1 * 2/2002 Tsunekawa ................ 358/1.15
2003/0007078 A1 * 1/2003 Feldis, III ................ 348/231.6

FOREIGN PATENT DOCUMENTS

| EP | 1 085 745 A2 | | 3/2001 | |
|----|--------------|---|--------|---|
| JP | 62244870 A | * | 10/1987 | ............ B65H 39/11 |
| JP | 07187491 A | * | 7/1995 | ............ B65H 39/11 |
| JP | 09086783 A | * | 3/1997 | ............ B65H 39/11 |
| JP | 10013609 A | * | 1/1998 | ............ H04N 1/00 |
| JP | 11069076 A | * | 3/1999 | ............ H04N 1/00 |
| JP | 2001-80175 | | 3/2001 | |
| JP | 2001-154818 | | 6/2001 | |

* cited by examiner

Primary Examiner—Aung Moe
Assistant Examiner—Jason Whipkey
(74) Attorney, Agent, or Firm—Fitzpatrick, Cella, Harper & Scinto

(57) ABSTRACT

A recorded image can be automatically classified according to attached information by designating a name of each paper discharge tray, and determining the paper discharge tray of a paper on which an image is recorded based on an image data read by a storage unit according to the attached information read from the storage unit storing the image data and the attached information about the image data and the name designated by a designation unit.

20 Claims, 57 Drawing Sheets

IMAGE FILE

FIG. 5

REGISTRATION ON NAME OF SHEET DISCHARGE PORT

NAME OF SHEET DISCHARGE PORT:

- Bin1 : kakky
- Bin2 : yuichi
- Bin3 : maekawa
- Bin4 : hkita
- Bin5 :
- Bin6 :
- Bin7 :

[ OK ]  [ CANCEL ]

FIG. 12

VC · · · VIDEO CONTROLLER
EC · · · ENGINE CONTROLLER

| SIGNAL NAME | DIRECTION | CONTENTS |
|---|---|---|
| /CPRDY | VC → EC | SIGNAL INDICATING THAT VIDEO CONTROLLER 103 IS IN STATE THAT IT CAN COMMUNICATE WITH ENGINE CONTROLLER 105 |
| /PPRDY | VC ← EC | SIGNAL INDICATING THAT ENGINE CONTROLLER 105 IS IN READY STATE THAT IT CAN COMMUNICATE WITH VIDEO CONTROLLER 103 |
| /RDY | VC → EC | SIGNAL INDICATING THAT ENGINE CONTROLLER 105 IS IN READY STATE THAT IT CAN PRINT |
| /PRNT | VC → EC | SIGNAL FOR VIDEO CONTROLLER 103 TO ISSUE PRINTING REQUEST TO ENGINE CONTROLLER 105 |
| /VSREQ | VC ← EC | SIGNAL FOR ENGINE CONTROLLER 105 TO REQUEST VERTICAL SYNCHRONIZATION SIGNAL TO VIDEO CONTROLLER 103 |
| /VSYNC | VC → EC | VERTICAL SYNCHRONIZATION SIGNAL FOR VIDEO CONTROLLER 103 TO OUTPUT TO ENGINE CONTROLLER 105 |
| /BD | VC ← EC | HORIZONTAL SYNCHRONIZATION SIGNAL FOR ENGINE CONTROLLER 105 TO OUTPUT TO VIDEO CONTROLLER 103 |
| /CCRT | VC ← EC | SIGNAL TO REPORT TO VIDEO CONTROLLER 103 ON CHANGE OF CONDITIONS BY BEING "TRUE" IN CASE WHERE CONTENTS OF STATUS WHICH DO NOT DIRECTLY PARTICIPATE IN RDY SIGNAL HAVE CHANGED |
| /SCLK | VC → EC | SYNCHRONIZATION CLOCK SIGNAL FOR SERIAL COMMUNICATION |
| /CMD | VC → EC | COMMAND SIGNAL FOR VIDEO CONTROLLER 103 TO INSTRUCT ENGINE CONTROLLER 105 |
| /CBSY | VC → EC | STROBE SIGNAL FOR COMMAND OUTPUT |
| /STS | VC ← EC | SIGNAL TO INDICATE STATUS INSIDE ENGINE TO OUTPUT FOR COMMAND FROM VIDEO CONTROLLER 103 |
| /SBSY | VC ← EC | SIGNAL FOR STATUS OUTPUT |

FIG. 13

VC · · · · VIDEO CONTROLLER
OC · · · · OPTION CONTROLLER
EC · · · · ENGINE CONTROLLER

| SIGNAL NAME | DIRECTION | CONTENTS |
|---|---|---|
| SERIAL COMMUNICATION I/F 91 | VC ↔ OC | I/F TO EXECUTE SHEET FEEDING DESIGNATION TO SHEET FEEDING OPTIONS, SHEET DISCHARGING DESIGNATION TO SHEET FEEDING OPTIONS AND COMMAND DESIGNATION VIA JOINT MEMORY |
| /OPTRDY 92 | VC ← OC | READY STATE FOR FUNCTION THAT DESIGNATED OPTION APPARATUS HAS IS INDICATED |
| /POUTT 93 | EC → OC | TIMING SIGNAL FOR PRINTER MAIN BODY TO DISCHARGE RECORDING SHEET |
| /PFEDT 94 | EC → OC | TIMING SIGNAL FOR PRINTER MAIN BODY TO ACCEPT RECORDING SHEET FROM OPTION UNIT |
| /SPCNG 95 | EC → OC | SIGNAL TO DEACCELERATE RECORDING SHEET WHICH HAS BEEN RAPIDLY CONVEYED INSIDE OPTION APPARATUS SO AS TO ADJUST SPEED IN CONFORMITY WITH CONVEYING SPEED OF PRINTER MAIN BODY |

FIG. 28

* INDEX PRINT *
USER INFORMATION = SHIMOMARUKO TORO (TEL : 03-3757-????)
PRINT DATE AND TIME = 2000/05/05 15:51
NUMBER OF PRINTS = 41 COPIES

| 000-0000 | 000-0001 | 000-0002 | 000-0004 | 000-0005 |
| 2 COPIES | 1 COPY | 4 COPIES | 2 COPIES | 2 COPIES |

| 000-0006 | 000-0008 | 000-0009 | 000-0010 | 000-0011 |
| 1 COPY | 2 COPIES | 1 COPY | 1 COPY | 2 COPIES |

| 000-0014 | 001-0001 | 001-0003 | 001-0005 | 001-0006 |
| 2 COPIES | 2 COPIES | 5 COPIES | 3 COPIES | 1 COPY |

| 001-0010 | 001-0012 | 001-0013 | 001-0014 | 002-0015 |
| 2 COPIES | 1 COPY | 1 COPY | 1 COPY | 2 COPIES |

002-0016
3 COPIES

```
*ENTIRE SHEET DISCHARGING ORT PILING JOB INFORMATION*

SHEET DISCHARGING MODE = USER SEPARATE FIXING
  TOTAL NUMBER OF COPIES OF SHEET DISCHARGING = 165 COPIES
  OUTPUT DATE AND TIME = 2000/05/05 15:51

<Bin1>
SHEET DISCHARGING PORT NAME = kakky
NUMBER OF COPIES OF SHEET DISCHARGING = 41 COPIES <Bin2>
SHEET DISCHARGING PORT NAME = yuichi
NUMBER OF COPIES OF SHEET DISCHARGING = 20 COPIES <Bin3>
SHEET DISCHARGING PORT NAME = maekawa
NUMBER OF COPIES OF SHEET DISCHARGING = 64 COPIES <Bin4>
SHEET DISCHARGING PORT NAME = hkita
NUMBER OF COPIES OF SHEET DISCHARGING = 40 COPIES <Bin5>
SHEET DISCHARGING PORT NAME =
NUMBER OF COPIES OF SHEET DISCHARGING = 0 COPY <Bin6>
SHEET DISCHARGING PORT NAME =
NUMBER OF COPIES OF SHEET DISCHARGING = 0 COPY <Bin7>
SHEET DISCHARGING PORT NAME =
NUMBER OF COPIES OF SHEET DISCHARGING = 0 COPY
```

FIG. 30

* SHEET DISCHARGING PORT PILING JOB INFORMATION *

SHEET DISCHARGING PORT = Bin1
SHEET DISCHARGING PORT NAME = kakky
SHEET DISCHARGING MODE = USER SEPARATE FIXING
NUMBER OF PILING COPIES = 41 COPIES
OUTPUT DATE AND TIME = 2000/05/05 15:51

| IMAGE NUMBER | PHOTOGRAPHED DATE | TITLE | NUMBER OF COPIES | |
|---|---|---|---|---|
| 000-0000 | 1999.12.31 | OVERSEAS TRIP | 2 | ------------ |
| 000-0001 | 2000.01.01 | OVERSEAS TRIP | 1 | ------------ |
| 000-0002 | 2000.01.01 | OVERSEAS TRIP | 4 | ------------ |
| 000-0004 | 2000.01.01 | OVERSEAS TRIP | 2 | ------------ |
| 000-0005 | 2000.01.01 | OVERSEAS TRIP | 2 | ------------ |
| 000-0006 | 2000.01.01 | OVERSEAS TRIP | 1 | ------------ |
| 000-0008 | 2000.01.01 | OVERSEAS TRIP | 2 | ------------ |
| 000-0009 | 2000.01.01 | OVERSEAS TRIP | 1 | ------------ |
| 000-0010 | 2000.01.01 | OVERSEAS TRIP | 1 | ------------ |
| 000-0011 | 2000.02.02 | Untitled | 2 | ------------ |
| 000-0014 | 2000.02.02 | Untitled | 2 | ------------ |
| 001-0001 | 2000.04.22 | WEDDING CEREMONY | 2 | ------------ |
| 001-0003 | 2000.04.22 | CONTINUATION OF PARTY AT ANOTHER PLACE | 5 | ------------ |
| 001-0005 | 2000.04.22 | CONTINUATION OF PARTY AT ANOTHER PLACE | 3 | ------------ |
| 001-0006 | 2000.04.22 | CONTINUATION OF PARTY AT ANOTHER PLACE | 1 | ------------ |
| 001-0010 | 2000.04.22 | CONTINUATION OF PARTY AT ANOTHER PLACE | 2 | ------------ |
| 001-0012 | 2000.04.22 | CONTINUATION OF PARTY AT ANOTHER PLACE | 1 | ------------ |
| 001-0013 | 2000.04.22 | CONTINUATION OF PARTY AT ANOTHER PLACE | 1 | ------------ |
| 001-0014 | 2000.04.22 | CONTINUATION OF PARTY AT ANOTHER PLACE | 1 | ------------ |
| 002-0015 | 2000.04.22 | CONTINUATION OF PARTY AT ANOTHER PLACE | 2 | ------------ |
| 002-0016 | 2000.04.22 | CONTINUATION OF PARTY AT ANOTHER PLACE | 3 | ------------ |

FIG. 32A

PRINT SETTING

SETTING CONTENTS
   * SHEET DISCHARGING MODE
     MEDIA
     GRAPHIC MODE
     PRINT SYSTEM

NEXT ITEM TO BE DISPLAYED

| DETERMINE (→) | RETURN (←) |

FIG. 32B

PRINT SETTING

SHEET DISCHARGING MODE
     USER SEPARATE AUTOMATIC
   * USER SEPARATE FIXED
     SORT
     STUCK

| DETERMINE (→) | RETURN (←) |

FIG. 42
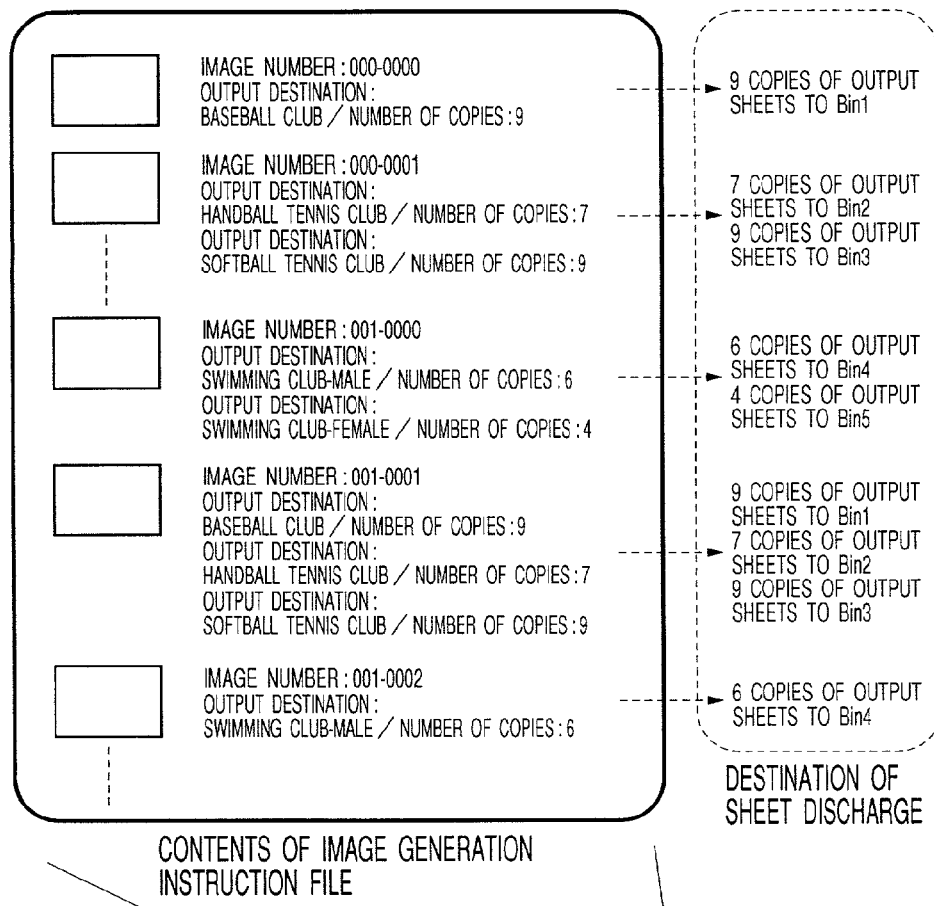
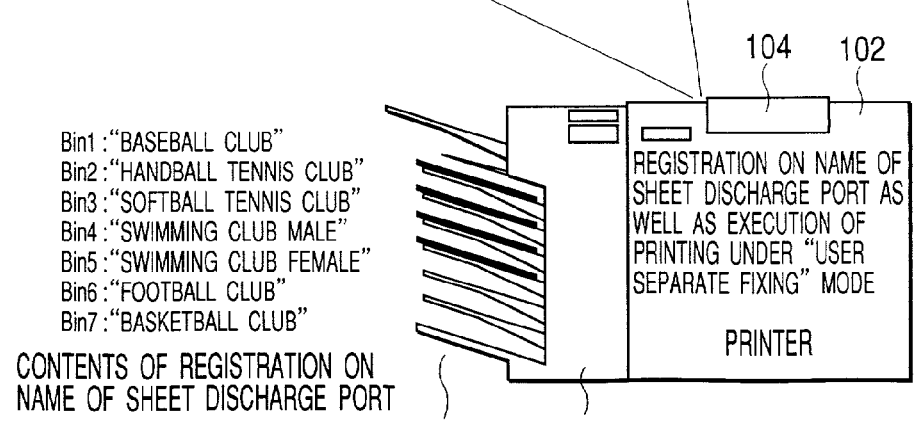

FIG. 43

FILE  EDITING  DISPLAY  HELP

| RETURN | NEXT | HALT | SEARCH |

| BOOK MARK | SITE: | http//:www.printservice.aa.bb/print/index.html |

PRINT SERVICE REQUEST

REQUESTING SERVICE TRADER:

[ PATENT PRINT SERVICE ▼ ]

STORAGE PLACE OF IMAGE GENERATION INSTRUCTION FILE

HOST INFORMATION (IP ADDRESS):

[ 111.2.33.44 ]

DIRECTORY INFORMATION:

[ /user/share/doc/www/print/form.dpf ]

[ EDITING OF IMAGE GENERATION INSTRUCTION FILE ]

RECEPTION METHOD:

☑ DELIVERY BY HAND AT SERVICE WINDOW

DESIGNATED SERVICE WINDOW: [ PATENT PRINT SERVICE: SHIMOMARUKO BRANCH ▼ ]

☐ DOOR-TO-DOOR DELIVERY

[ PRINTING STARTS ]   [ PRINTING TO BE RESERVED ]

FIG. 44

```
FILE  EDITING  DISPLAY  HELP
RETURN | NEXT | HALT | SEARCH
BOOK MARK          SITE: http//:www.printservice.aa.bb/form/index.html
```

EDITING OF IMAGE GENERATION INSTRUCTION FILE
STORAGE PLACE OF IMAGE GENERATION INSTRUCTION

FILE (DIRECTORY):                    [REFERENCE]

/user/share/doc/www/print/form.dpf

DESIGNATION OF IMAGE FILE: [REFERENCE]

/user/share/doc/www/print/travel/000-0000.jpg
/user/share/doc/www/print/travel/000-0001.jpg
/user/share/doc/www/print/travel/000-0002.jpg
/user/share/doc/www/print/travel/000-0003.jpg
/user/share/doc/www/print/home/002-0002.jpg
/user/share/doc/www/print/home/002-0003.jpg
/user/share/doc/www/print/home/002-0005.jpg

[EDITING OF IMAGE FILE]  [EDITING OF IMAGE ATTACHED INFORMATION]

USER INFORMATION:

FULL NAME: SHIMOMARUKO TARO

ELECTRIC MAIL ADDRESS: taro@xx.yy

ADDRESS: 0-1-2 SHIMOMARUKO, OHTA-KU, TOKYO

TELEPHONE NUMBER: 0120-123-456

FIG. 45

REGISTRATION OF SHEET DISCHARGE NAME — 63

SHEET DISCHARGE NAME:

- Bin1: BASEBALL CLUB
- Bin2: HANDBALL TENNIS CLUB
- Bin3: SOFTBALL TENNIS CLUB
- Bin4: SWIMMING CLUB MALE
- Bin5: SWIMMING CLUB FEMALE
- Bin6: FOOTBALL CLUB
- Bin7: BASKETBALL CLUB

OK  CANCEL

FIG. 46

```
┌─────────────────────────────────────────────────────────────┐ 64
│ PRINTING INSTRUCTION                                        │
├─────────────────────────────────────────────────────────────┤
│                                                             │
│  IMAGE DESIGNATION: │INDEX+ENTIRE IMAGE    ▼│  [DETAILED DESIGNATION]
│                                                             │
│  MEDIA:              ┌--- OUTPUT DESTINATION: ----------┐   │
│  ┌─────────────────┐ │ ☐ AS FOR OUTPUT DESTINATION,     │   │
│  │ ORDINARY PAPER ▲│ │   REFERENCE SHOULD BE MADE TO    │   │
│  │ POSTCARD        │ │   CONTENTS OF DATA               │   │
│  │ ███████████████ │ │ ☑ DESIGNATION OF OUTPUT DESTINATION│ │
│  │ COATED PAPER    │ │ │BASEBALL CLUB          ▼│       │   │
│  │ OHP SHEET     ▼ │ └──────────────────────────────────┘   │
│  └─────────────────┘ ┌--- NUMBER OF COPIES: ------------┐   │
│                      │ ☑ AS FOR NUMBER OF COPIES,       │   │
│                      │   REFERENCE SHOULD BE MADE TO    │   │
│                      │   CONTENTS OF DATA               │   │
│                      │ ☐ DESIGNATION OF NUMBER  ┌────┐  │   │
│                      │   OF COPIES              └────┘  │   │
│                      └──────────────────────────────────┘   │
│                                                             │
│  MAY PRINTING BE STARTED UNDER ABOVE DESCRIBED SETTING ?    │
│                                                             │
│                       [   OK   ]      [ CANCEL ]            │
└─────────────────────────────────────────────────────────────┘
```

FIG. 49
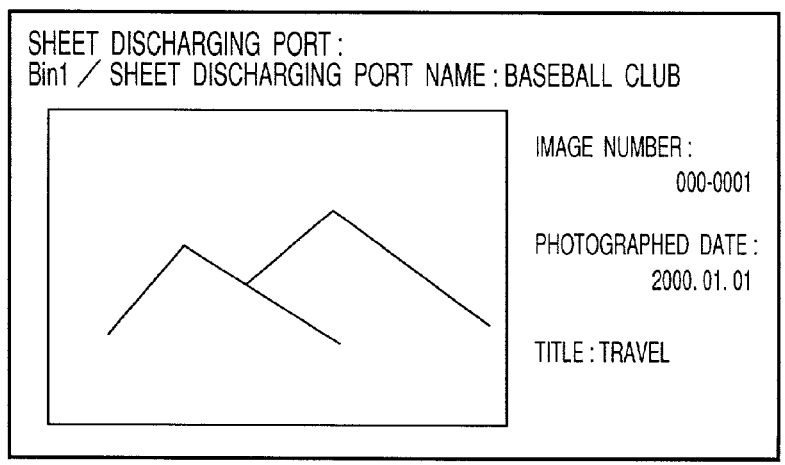
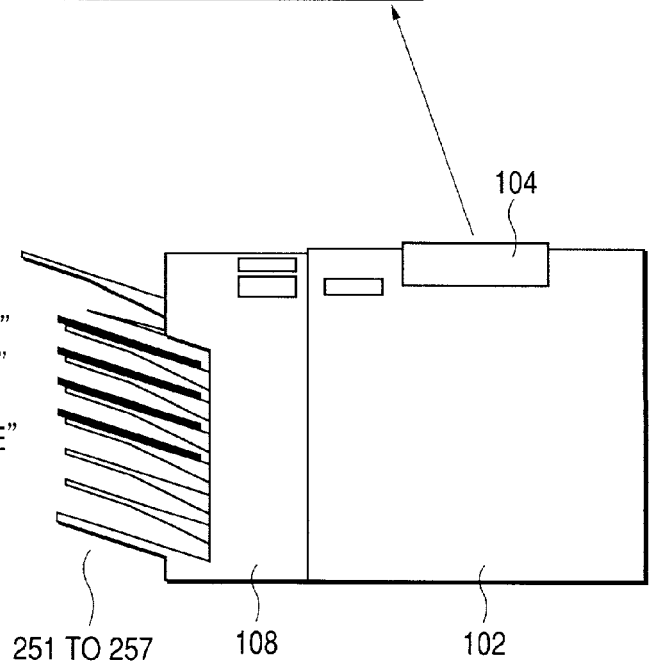

FIG. 50

```
*ENTIRE SHEET DISCHARGING PORT PILING JOB INFORMATION*
    SHEET DISCHARGING MODE = USER SEPARATE FIXING
    TOTAL NUMBER OF COPIES OF SHEET DISCHARGING = 165 COPIES
    OUTPUT DATE AND TIME = 2000/05/05 15:51

<Bin1>
SHEET DISCHARGING PORT NAME = BASEBALL CLUB
NUMBER OF COPIES OF SHEET DISCHARGING = 41 COPIES

<Bin2>
SHEET DISCHARGING PORT NAME = HARDBALL TENNIS CLUB
NUMBER OF COPIES OF SHEET DISCHARGING = 20 COPIES

<Bin3>
SHEET DISCHARGING PORT NAME = SOFTBALL TENNIS CLUB
NUMBER OF COPIES OF SHEET DISCHARGING = 64 COPIES

<Bin4>
SHEET DISCHARGING PORT NAME = SWIMMING CLUB MALE
NUMBER OF COPIES OF SHEET DISCHARGING = 40 COPIES

<Bin5>
SHEET DISCHARGING PORT NAME = SWIMMING CLUB FEMALE
NUMBER OF COPIES OF SHEET DISCHARGING = 0 COPY

<Bin6>
SHEET DISCHARGING PORT NAME = FOOTBALL CLUB
NUMBER OF COPIES OF SHEET DISCHARGING = 0 COPY

<Bin7>
SHEET DISCHARGING PORT NAME = BASKETBALL CLUB
NUMBER OF COPIES OF SHEET DISCHARGING = 0 COPY
```

```
*** SHEET DISCHARGING PORT PILING JOB INFORMATION ***
SHEET DISCHARGING PORT = Bin1
SHEET DISCHARGING PORT NAME = BASEBALL CLUB
SHEET DISCHARGING MODE = USER SEPARATE FIXING
NUMBER OF PILING COPIES = 41 COPIES
OUTPUT DATE AND TIME = 2000/05/05 15:51
```

| IMAGE NUMBER | PHOTOGRAPHED DATE | TITLE | NUMBER OF COPIES | |
|---|---|---|---|---|
| 000-0000 | 1999.12.31 | TRAVEL | 2 | ---------- |
| 000-0001 | 2000.01.01 | TRAVEL | 1 | ---------- |
| 000-0002 | 2000.01.01 | TRAVEL | 4 | ---------- |
| 000-0004 | 2000.01.01 | TRAVEL | 2 | ---------- |
| 000-0005 | 2000.01.01 | TRAVEL | 2 | ---------- |
| 000-0006 | 2000.01.01 | TRAVEL | 1 | ---------- |
| 000-0008 | 2000.01.01 | TRAVEL | 2 | ---------- |
| 000-0009 | 2000.01.01 | TRAVEL | 1 | ---------- |
| 000-0010 | 2000.01.01 | TRAVEL | 1 | ---------- |
| 000-0011 | 2000.02.02 | Untitled | 2 | ---------- |
| 000-0014 | 2000.02.02 | Untitled | 2 | ---------- |
| 001-0001 | 2000.04.22 | COMMEMORATIVE HOTOGRAPH | 2 | ---------- |
| 001-0003 | 2000.04.22 | GAME | 5 | ---------- |
| 001-0005 | 2000.04.22 | GAME | 3 | ---------- |
| 001-0006 | 2000.04.22 | GAME | 1 | ---------- |
| 001-0010 | 2000.04.22 | GAME | 2 | ---------- |
| 001-0012 | 2000.04.22 | GAME | 1 | ---------- |
| 001-0013 | 2000.04.22 | GAME | 1 | ---------- |
| 001-0014 | 2000.04.22 | GAME | 1 | ---------- |
| 002-0015 | 2000.04.22 | GAME | 2 | ---------- |
| 002-0016 | 2000.04.22 | GAME | 3 | ---------- |

IMAGE RECORDING DEVICE, IMAGE INPUT DEVICE, AND DATA PROCESSOR, IMAGE RECORDING METHOD, AND STORAGE MEDIUM RECORDING IMAGE RECORD CONTROL PROGRAM

BACKGROUND OF THE INVENTION

1. Field of the Invention

The present invention relates to an image recording device capable of obtaining image information and image attached information in the memory of a digital camera, a data processor, etc. regardless of the existence of a host computer, generating a printing job, and printing out predetermined image data in a predetermined output control method based on the generated printing job; an image input device and a data processor; an image recording method; and a storage medium recording an image record control program, and more specifically to the technology of automatically and efficiently performing classifying printing operations for a personal use and various classifying operations in a print service job using a plurality of paper discharge trays of the image recording device when data is printed from a storage medium (memory).

2. Related Background Art

There has been a conventional photograph print service as a common method of regenerating image data, for example, a photograph a user has at hand. This print service is performed by: a user taking a semitransparent negative cover (negative holder) containing a roll of developed film with the requested number of prints written or marked to a developer through a print shop, etc.; and the developer designating an image to be regenerated (printed) to print only the designated image.

Recently, a photo CD system has been developed. In this system, an image in film is read, and the image data is written on CD-ROM, and is further read from the CD-ROM to regenerate and display on an image display device such as a display, etc. In this photo CD system, a computer system reads the image data recorded on the CD-ROM and outputs on a high quality image printer, thereby obtaining a printed image. Since the high quality image printer is expensive, and it is hard for a personal user to own it, it is common that a user requests a print shop for a print service to obtain a printed image.

When a user requests a print service, he or she normally presents CD-ROM (compact disk ROM) and a memo containing the information (for example, an image number, etc. confirmed using an index print, etc.) designating image data recorded on the CD-ROM.

Furthermore, with the improvement of computer technology and the spread of personal computers and image input devices such as digital cameras, users have become able to process high precision digital image data. The image data is stored in various image file formats such as the TIFF (Tagged Image File Format which is a high-density bit map image file exchange format), PICT (standard graphics data format for Macintosh), JPEG (Joint Photographic Expert Group which is a static image data compression system), RAW (read and write), etc., and is normally output on a printer connected to a computer owned by a personal user.

However, since an output result from a personally owned printer is normally inferior to an output result by a print service of a developer, a print shop, a DPE shop, or a personal computer shop, there are not a few requests for print services of image data stored in an information storage medium.

When a user receives a print service from a print service company, it is recently possible to request to print image data by transmitting the image data through a communications line. However, it is common to present or taking to a service shop with an information storage medium storing image data. In this case, it is necessary to indicate a desired image in the image data stored in an information storage medium, and a user who requests a print service has to notify a service shop of the number or name of the image to specify a desired image in the image data stored in the information storage medium.

On the other hand, the image print service shop receives the instruction written on the memo, etc. of the user who requests the print service, manually selects and prints the user specified image from the image data stored in the information storage medium. Similarly, when image data is transmitted through communications lines, an image is selected and the number of prints is determined based on the instruction contents using a memo, etc.

Normally, since the computer system for the above mentioned print service requires complicated operations by an operator, it is not easy for a common staff of a service shop to correctly select and print an image to be printed. Additionally, it is a laborious operation to actually select and print a user desired image data from the image data stored in the information storage medium, thereby limiting the actual printing time.

Under the situation, a method of quickly obtaining a printed image by automatically specifying a desired image from among a plurality of images stored in an information storage medium has recently been suggested. The suggested contents are described below by referring to FIGS. 38A, 38B, 38C and 39.

FIGS. 38A to 38C show examples of the configurations of a storage medium 5001 as an information storage medium. In FIG. 38A, the storage medium 5001 is mapped into four independent areas, that is, a reserved area 5002, a file allocation table area 5003 (hereinafter referred to as a FAT area), a root directory area 5004, and a file area 5005.

The reserved area 5002 stores, for the storage medium 5001, the size of the reserved area 5002, the size of the file allocation table area 5003, and the number of entries in the root directory area 5004. The file allocation table area 5003 stores the use of the storage medium space in the file area 5005 of the storage medium 5001. The root directory area 5004 stores directory entry information indicating the information such as a file name, a size, a position, etc. stored in the storage medium 5001. The file area 5005 stores image forming instruction data and actual image data.

For convenience of explanation, the image forming instruction data is expressed as DPFxxx as shown in FIG. 38B, and the image data is expressed as IMGxxx as shown in FIG. 38C, where xxx indicates characters or numerals for identification of plural pieces of image forming instruction data and image data.

Next, as an example of a conventional print control process, a process of generating and outputting a desired print image by a printing device using image data recorded in the storage medium 5001 as shown in FIGS. 38A to 38C are described below by referring to the flowchart shown in FIG. 39.

In FIG. 39, in step S801, it is confirmed whether or not the storage medium 5001 has been set in the data reading unit in the printing device (refer to FIGS. 10 and 14 described later). If it is confirmed that the storage medium 5001 has been set in the data reading unit, control is passed to step S802. In step S802, it is checked in the data reading unit whether or not there is a file having the name of DPFxxx by referring to the contents of the root directory area 5004 stored in the storage medium 5001. If there is no DPFxxx file, the printing device terminates the operation.

If there is a DPFxxx file, control is passed to step S803, and the first DPFxxx file (FIG. 38B) in the file area 5005 is read. In step S804, the first file name IMGxxx indicated in the read DPFxxx file is read. In step S805, the image data (FIG. 38C) stored in the file IMGxxx read in step S804 is read.

In step S806, an image generating process is performed by an image generating unit (not shown) in the printing device on the image data read in step S805, and bit map image data is generated. The generated bit map image data is printed in step S807 by the image output unit in the printing device.

In step S808, it is checked whether or not there is another IMGxxx indicated in the DPFxxx file being read (refer to FIG. 38B). If another IMGxxx is indicated, then control is passed to step S809. If there is no other IMGxxx indicated, control is passed to step S810.

In step S809, the IMGxxx file is read, and control is passed to step S805. In step S810, the storage medium 5001 is accessed. If there is another DPFxxx file, then control is passed to step S811, the next DPFxxx file is read, and control is passed to step S804. If there is no other DPFxxx files, then the operation of the printing device terminates.

However, there has been the following problems in the above mentioned conventional system.

For example, in a photo print service, in the embodiment in which an information storage medium such as a negative cover, CD-ROM, etc. storing image data is directly taken to a service shop in the above mentioned conventional technology, a client has to go directly to a service shop, etc. to request them for prints, and has to go to the shop again to obtain requested prints, thereby requiring a considerable time and laborious steps. Furthermore, when a user requests a service shop for a print service, he or she has to specify a desired image to be printed, and write the number of prints, etc. on a memo, etc. in a predetermined format, and the staff of the service shop has to follow the information written on the memo in selecting the image to be printed, etc. As a result, the staff also requires a laborious operation.

In addition, when a print is made through an information storage medium, image data is stored in an information storage medium such as CD-ROM, etc., and the contents of the data have to be checked in advance, and prepares a memo.

When image data is transmitted through a communications line, a user does not have to go to a service shop to request a print service, but has to specify an image to be printed and the number of prints by preparing a memo. Therefore, a staff at the service shop still requires some laborious steps.

On the other hand, with the recent spread of personal computers, a large number of common users have installed their own personal computers at home. In addition, without personal computers, users are allowed to realize connections to Internet using domestic electric appliances such as a TV set, a game machine, etc. having the functions of personal computers. Furthermore, with the remarkable spread of mobile terminals, data has been transmitted and received through portable handy phones, etc. thus, not only computers but also all media have been interconnected regardless of cable or radio.

That is, when a printing process is performed using electronic image data without using a physical item such as a negative, etc., any user can easily issue an instruction to make a print through a personal computer, a portable handy phone, etc. at home. Accordingly, in making copies of a photograph, etc., a user can request from home any service shop to make copies.

Recently, computers are interconnected through a LAN (local area network), and a LAN connection can be made not only to a printer, but also to various other peripheral devices such as a multifunction image processing device, etc. having copying and facsimile functions. Therefore, an image recording device has realized a method of discharging paper in various paper discharge modes satisfying all needs of a plurality of users sharing a network, for example, a user separate fixing (mail box) mode, a user separate automatic (job separate) mode, a sort mode, a stack mode, etc.

In the user separate fixing mode and the user separate automatic mode, a unique name is assigned to each paper discharge tray of an image recording device, and the paper discharge trays are discriminated based on the names. The difference between the modes is described below. In the user separate fixing mode, paper is discharged by registering in advance an identification name for each paper discharge tray of an image recording device, and specifying the identification name as a selected paper discharge tray when a printing process is performed, thereby specifying a selected paper discharge tray and classifying printing by a user easily discriminated name (refer to Japanese Patent Application Laid-Open No. 2001-80175). On the other hand, in the user separate automatic mode, for example, a user name of a print requesting user is dynamically registered as an unused and available paper discharge tray during a printing process, and the paper discharge tray registered when the printing process is first performed is retrieved to discharge paper to the paper discharge tray if the same user specifies a print request again, thereby appropriately performing a printing job for each user without prompting a user to specify a correct selected paper discharge tray when the printing process is performed (refer to Japanese Patent Application No. 11-264645).

In the sort mode, a print of a printing job is sorted into the specified number of paper discharge trays using a series of paper discharge trays. In the stack mode, paper is continuously discharged to the same paper discharge tray in a printing job until it is full. When it is full, the paper discharge tray is switched to the next highest priority paper discharge tray to which paper is discharged. These paper discharge methods are well known.

As described above, when a printing process is performed by a host computer through a printer driver, various settings are made by selecting a paper discharge mode, etc., and various processes can be performed in various paper discharge modes. However, when a printing process is performed using a digital camera or performed directly from an information storage medium such as a memory stick, etc., there are no means for specifying a medium for performing the printing process or for specifying a selected paper discharge tray, thereby having a user manually classifying prints, and requiring a laborious and time-consuming process in classifying prints for personal use, or various classifying operations in a print service operations for each clients, etc.

SUMMARY OF THE INVENTION

The present invention has been achieved to solve the above mentioned problem. A first object of the present invention is to automatically realize a paper discharge method satisfying all needs of users in performing a printing process from a storage device in an external device such as a digital camera, etc. or from a storage medium such as a memory card, etc. regardless of the existence of a host computer, by issuing an instruction to perform a printing process with a paper discharge mode selected through an existing device such as a digital camera, a printing device, etc., and to efficiently perform various classifying operations such as classification of prints for each personal user or for each client.

A second object of the present invention is to realize an image recording method of requesting any service shop from home to copy any number of prints of desired image data by allowing an image recording device to be notified of necessary information by adding information such as an image data storage location, a print destination, the number of prints, a paper discharge method, a print reception method, a payment method, etc. to the electronic information communicated between an image recording device such as a printer, etc. and an external device such as a personal computer, a mobile terminal, a digital camera, etc. in a print service such as making copies of a photograph, etc.

An object accompanying the second object of the present invention is to provide a service system of allowing a user to specify the delivery of a print service according to the above mentioned electronic information to a place where an image recording device is installed, a nearest service shop (a convenience store, a developer, a personal computer shop, etc.) or to home, etc., thereby realizing the convenience of users and satisfying the need of users.

An object further accompanying the second object of the present invention is to realize an efficient print service in which a print instruction is all stored in the electronic information, a staff of a service shop is free of selection of an image according to a user memo, etc., thereby reducing a laborious steps in a printing process.

An object further accompanying the second object of the present invention is to automatically realize a paper discharge method satisfying all needs of users in performing a printing process directly from a host computer in a network, a storage device in an external device such as a digital camera, etc. or directly from a storage medium such as a memory card, etc. without an instruction of the host computer, by issuing an instruction to perform a printing process with a paper discharge mode selected through an existing device such as a digital camera, a printing device, etc., and also to efficiently perform various selecting operations such as classification of prints for each personal user or for each client.

To attain the above mentioned objects, the image recording device according to the present invention includes: designation means for designating a name of each paper discharge tray; and determination means for determining a paper discharge tray of paper recording an image based on image data read from the storage means according to attached information read from the storage means for storing image data and image data attached information, and the name designated by the designation means.

An image recording method according to the present invention includes: a designating step of designating a name of each paper discharge tray; and a determining step of determining a paper discharge tray of paper recording an image based on image data read from the storage means according to attached information read from the storage means for storing image data and image data attached information, and the name designated in the designating step.

A computer-readable program according to the present invention includes: a designating step of designating a name of each paper discharge tray; and a determining step of determining a paper discharge tray of paper recording an image based on image data read from the storage means according to attached information read from the storage means for storing image data and image data attached information, and the name designated in the designating step.

A storage medium according to the present invention stores a computer-readable program including: a designating step of designating a name of each paper discharge tray; and a determining step of determining a paper discharge tray of paper recording an image based on image data read from the storage means according to attached information read from the storage means for storing image data and image data attached information, and the name designated in the designating step.

BRIEF DESCRIPTION OF THE DRAWINGS

FIG. 5 is a plan view showing an example of a UI screen for registration of the name (identification name) of a paper discharge tray by a user when an operation is performed in a user separate fixing mode according to the first embodiment of the present invention;

FIG. 12 shows the contents and the direction of a signal communicated between a video controller and an engine controller shown in FIG. 11 according to the first embodiment of the present invention;

FIG. 13 shows serial communications performed by an option controller, a video controller, and an engine controller shown in FIG. 11, and the contents and the direction of a signal according to the first embodiment of the present invention;

FIG. 28 is a plan view of the index print of an output image output at each paper discharge tray when a printing process is performed in the user separate fixing mode according to the first embodiment of the present invention;

FIG. 29 is a plan view of the print output of the information about the loading job at all paper discharge trays according to the first embodiment of the present invention;

FIG. 30 is a plan view of the print output of the information about the loading job at a specific paper discharge tray according to the first embodiment of the present invention;

FIGS. 32A and 32B are plan views showing an example of a UI screen on which a user issues an instruction to perform a printing process using a digital camera according to the second embodiment of the present invention;

FIG. 42 shows the operation system of printing out an image in the user separate fixing mode, and shows the concept of an example of classifying an output image for each identification name based on the contents of the image forming instruction file designated by the identification name of the destination of each image file according to the third embodiment of the present invention;

FIG. 43 is a plan view showing an example of a Web browser UI screen on which a user issues a print request to a printer connected by the host computer through Internet according to the third embodiment of the present invention;

FIG. 44 is a plan view showing an example of a Web browser UI screen on which an image forming instruction file is edited to issue a print request through Internet according to the third embodiment of the present invention;

FIG. 45 is a plan view showing an example of an UI for the user registering the name of a paper discharge tray (identification name) when the process is performed in the user separate fixing mode according to the third embodiment of the present invention;

FIG. 46 is a plan view of an example of a UI screen on which a print instruction is issued in a printer panel operation based on an image forming instruction file and an image file downloaded from the host computer according to the third embodiment of the present invention;

FIG. 49 shows the concept of displaying in detail an image loaded at a specific paper discharge tray of the panel unit of the image recording device according to the third embodiment of the present invention;

FIG. 50 is a plan view of the print output of the information about the loading job at all paper discharge trays according to the third embodiment of the present invention;

FIG. 51 is a plan view of the print output of the information about a specific paper discharge tray according to the third embodiment of the present invention;

DETAILED DESCRIPTION OF THE PREFERRED EMBODIMENTS

With reference to drawings, embodiments of the present invention will be described in detail as follows.

(First Embodiment)

Figure 1:
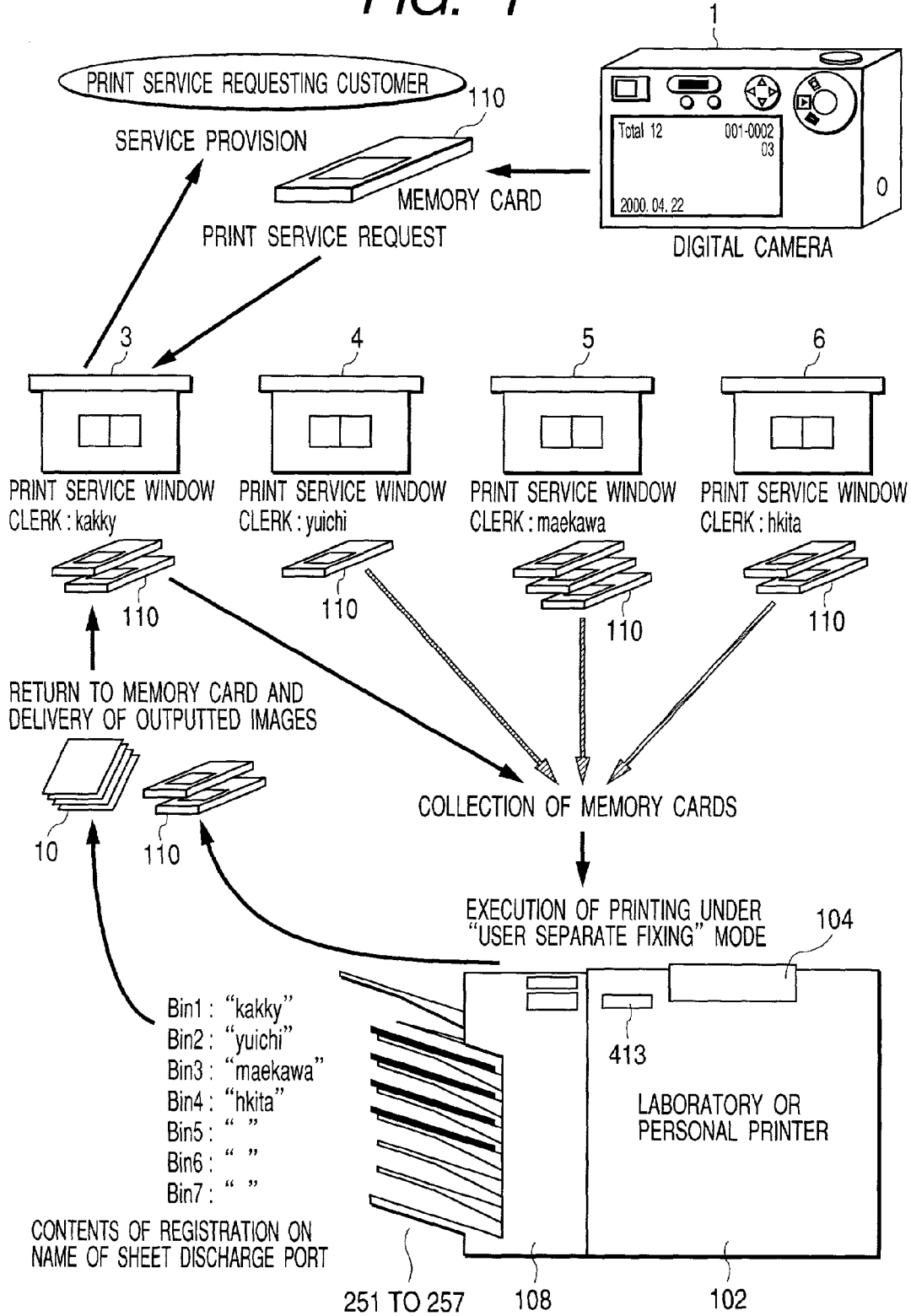
FIG. 1 shows a concept of an example of classifying an output image for each service window in a printing service job to explain an operation system of printing out an image photographed by a digital camera in a user separate fixing mode according to a first embodiment of the present invention.
Figure 2:
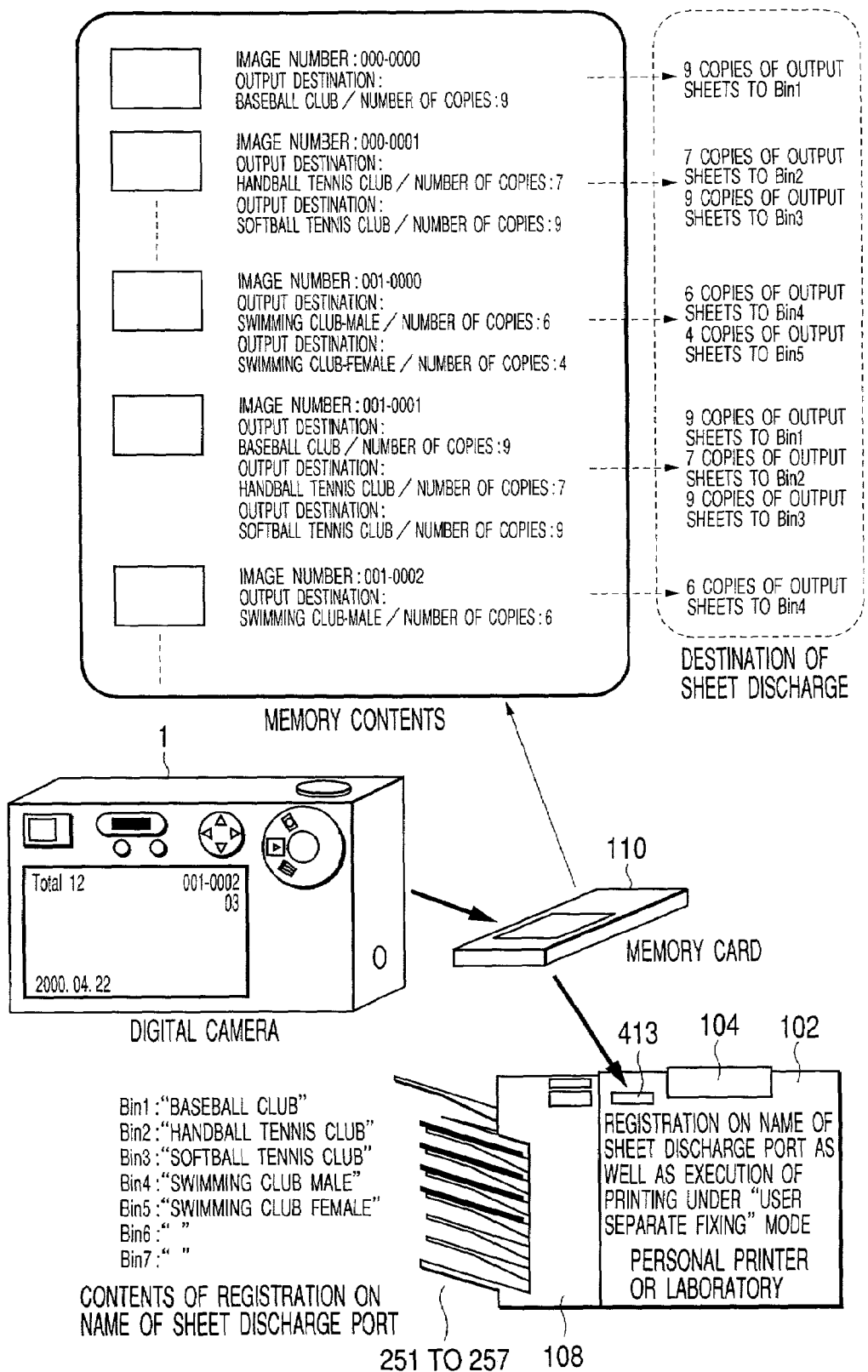
FIG. 2 shows the concept of an example of designating an identification name of a destination of each image by a digital camera, and classifying an output image by each identification name based on the contents of a memory card storing the image to explain the operation system of printing out an image photographed by a digital camera in a user separate fixing mode according to the first embodiment of the present invention.

FIG. 1 and FIG. 2 depict an operation system to print-output images shot with a digital camera under user separate fixed mode in the first Embodiment of the present invention.

FIG. 1 depicts an example to execute classification of output images on the basis of destination of windows in print service operations, and FIG. 2 depicts an example to designate output destination by a distinguishing name in advance on image-by-image basis so as to execute classification of output images on the basis of distinguishing name according to contents of memory cards where those pieces of information are stored.

FIG. 1 and FIG. 2 depict an example to mount onto an image recording device 102 a storage medium 110 such as a memory card, etc., which is detachable-attachable and stores image data shot with the digital camera 1 to execute printing based on that information in respective operation systems.

These storage medium 110 stores as shown in FIG. 2, attached information related to respective images other than image data of shot images. For these pieces of information, as information to be automatically stored, there are image number, photographed date, formatting format of an image file, etc., and as information to be inputted by a user after shooting session, there are title, trimming information, rotation information, and number of print sheet, etc. Otherwise, names of people who need distribution as distribution users so that the same image is delivered to a plurality of person as in the case of printing as well as names of their offices may be inputted there.

Moreover, into the storage medium 110, not only the above described image attached information but also information on printing indication may be stored. For this printing indication information, there are graphic mode, color mode, sheet discharging mode, number of sheet printing, etc. to become outputting printer information and control information at the time of printing and respective detailed setting information, etc. shall be included.

According to respective examples in FIG. 1 and FIG. 2, printing processing to be executed from an image recording device 102 via the storage medium 110 will be sequentially described as follows.

Firstly, the example of FIG. 1 will be described.

In FIG. 1, a print-service trustee (an ordering customer) submits a memory card 110 where image data shot by a digital camera 1 is stored to any of windows 3 to 6 for print service so as to request output of image data contained in the memory card 110. In this example, "kakky" is in charge of a print service window 3 where a print service is trusted.

In this example, a print service is trusted to the window 3, which "kakky" is in charge of and will submit the memory card 110 which the print service client has left to a deliverer who collect it periodically via windows so as to be transported to a place where special printing laboratory (image recording device) 102 exists.

For memory cards 110 transported in from the print service windows 3 to 6, the image output operators output images stored in respective memory cards 110. Here, the image output operators execute printing output under the above described "user separate fixing" mode in order to efficiently proceed with classification for each print service window when the images are outputted.

In order to execute print outputting under "user separate fixing" mode, distinguishing name needs to be registered on respective sheet discharging ports 251 to 257 of the printing laboratory 102, but here the name of clerks in charge of respective print service windows shall be registered in advance as the distinguishing names. In the example of FIG. 1, "kakky" is registered in "Bin1", "yuichi" in "Bin2", "maekawa" in "Bin3", and "hkita" in "Bin4".

When images are outputted on the memory card 110 left at the print service window 3 where "kakky" is in charge, printing indication is executed with "kakky" to be designated as the destination of outputting. For the printing jobs designated to "kakky" being the destination of outputting, the printing laboratory 102 execute predetermined image recording processing, and according to name registration information of the above described respective paper discharge trays 251 to 257, the image output result is sheet-discharged to "Bin1" which is registered under the distinguishing name of "kakky". Also for image outputs on the memory cards left by clerks in charge of the other windows, the names of the clerks in charge are likewise designated as the output destination so that printing is proceeded, and thus image output classification for each clerks in charge of windows can be executed.

When all image outputting on the memory cards 110 collected from the print service windows is completed, the memory cards 110 are again returned to respective windows 3 to 6 together with the outputted images allocated into respective paper discharge trays 251 to 257 for clerks in charge of respective windows via the deliverers. In the example of FIG. 1, an output image 10 sheet-discharged to "Bin1" together with a memory card 110 to be its source is conveyed to the window 3 of which "kakky" is in charge.

Thus, making the print service operation classifiable under "user separate fixing" mode, classification operations taking place at the time of large quantities of image output operation can be executed automatically without depending on manual processes so that efficiency in the entire print service operation will become improvable.

Next, an example in FIG. 2 will be described.

In FIG. 2, "user separate fixing" as sheet discharging mode, any distinguishing name for each image as output destination, and any necessary copy value for each image as number of copies is stored in the storage media 110 such as a memory card, etc. with input operations from a user. In FIG. 2, memory contents of the memory card 110 are depicted for example by an image with image number "000-0000" having distinguishing name of its output destination being "baseball club" and necessary number of prints being "9".

In receipt of printing indication from a user, the (not shown) job generation unit of the printing laboratory 102 reads stored information in the memory card 110 to start preparation of the job based on the "user separate fixing" mode designated as sheet discharging mode. In the case where the print job by way of "user separate fixing" mode is formed, the "distinguishing name" designated as output destination will become judgment clue to execute classification processing for each image. For the example in FIG. 2, "baseball club", "hardball tennis club", "softball tennis club", "swimming club male", and "swimming club female", etc. being "output destination" for each image is used as distinguishing name for classification processing. Here, images may be set for operations without any "output destination" being designated.

In the processing for forming print jobs, with "user separate fixing" mode being designated, the distinguishing name having been designated as "output destination" for each image is treated as the sheet discharging destination and the value designated as "number of copies" is added to the printing indication information for each image.

When preparation of a print job is completed, the job generation unit delivers that print job to the data analysis portion. The image recording device 102 analyzes contents of the print job based on the formed print job to execute predetermined print processing according to those contents. In the case of the print job as in the example of FIG. 2, as the page information on the number covering the value designated as the number of copies is copied, sheet discharge destination for each image will be determined so that the outputs are classified into the paper discharge tray registered under the same name as the distinguishing name designated as the sheet discharge destination. For example, in case of output destination being "baseball club", the sheet discharging port is Bin1 and nine copies of the image with image number being "000-0000" is determined to be sheet-discharged.

Here, respective paper discharge trays 251 to 257 of the image recording device 102 shall be registered by distinguishing names in advance, and that registration may be inputted by way of panel operation from the image recording device 102 or may be made to be stored in the memory card 110 as one of printing indication information so that after the memory card 110 is mounted onto the image recording device 102 the image recording device 102 reads the registered contents in from the memory card 110 for setting.

As for images for which feeding-discharging destinations have been determined, predetermined print processing is executed sequentially, and as in the example of FIG. 2, sheets for designated number of copies of each image covering the output results of images with sheet discharging destination being designated under distinguishing name of "baseball club" are sheet-discharged into the paper discharge tray "Bin1", sheets for designated number of copies of each image covering the output results of images with sheet discharging destination being designated under distinguishing name of "hardball tennis club" are sheet-discharged into the paper discharge tray "Bin2", sheets for designated number of copies of each image covering the output results of images with sheet discharging destination being designated under distinguishing name of "softball tennis club" are sheet-discharged into the paper discharge tray "Bin3", sheets for designated number of copies of each image covering the output results of images with sheet discharging destination being designated under distinguishing name of "swimming club male" are sheet-discharged into the paper discharge tray "Bin4", and sheets for designated number of copies of each image covering the output results of images with sheet discharging destination being designated under distinguishing name of "swimming club female" are sheet-discharged into the paper discharge tray "Bin5".

Thus, also in the case where operations are executed by an individual, the print processing is executed under "user separate fixing" mode so that without taking the position of the sheet discharging destination into consideration the sheet discharging destination can be designated under distinguishing names and necessary copies for each image can be designated. In addition, those designations are made to be stored into the memory card 110 so that only necessary number of necessary images can be outputted with printing indication at a time.

So far, a concept on an operation system to print and output images photographed with the digital camera 1 by way of "user separate fixing mode" via the storage medium 110 has been described.

As follows, embodied examples on the above described concept will be described further in detail as follows with reference to block diagrams and flowcharts or the like.

Figure 3:
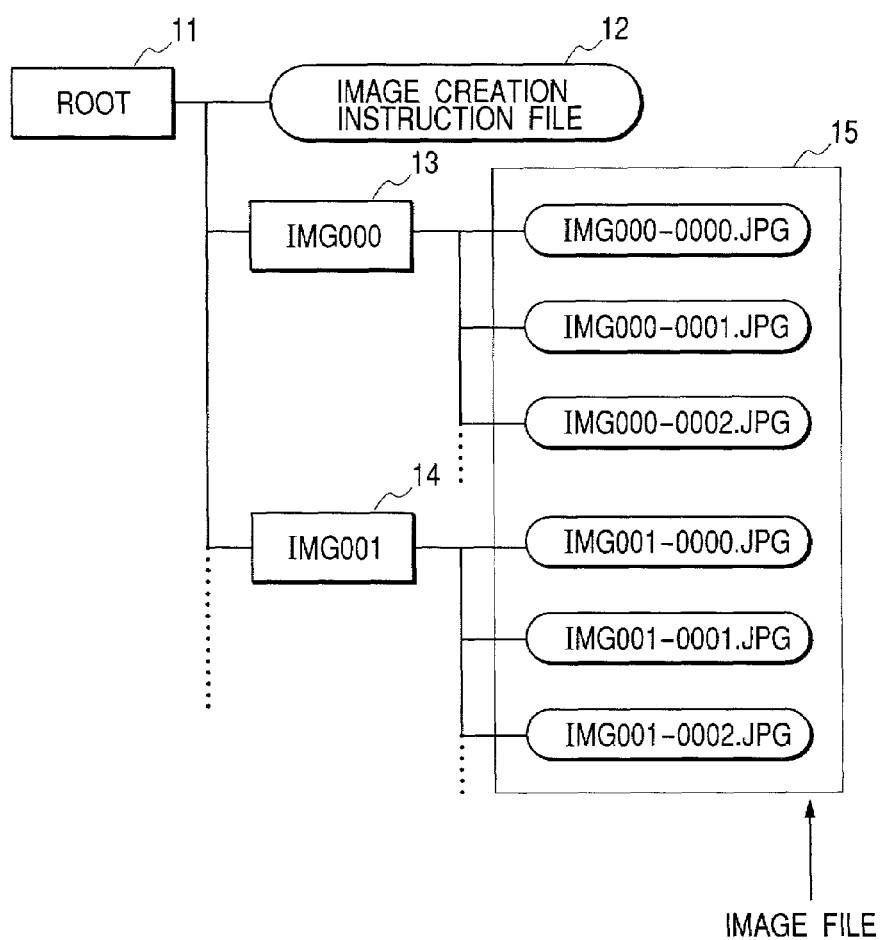
FIG. 3 is a block diagram showing a directory structure of a storage medium according to the first embodiment of the present invention.

FIG. 3 shows an example of directory structure of information storage medium 110. In FIG. 3, image data and image attached data are disposed in a lower layer of a root directory (ROOT) 11 respectively as image file 15 and Image forming instruction file 12. The image file 15 is processed at any directories 13 and 14 disposed in the lower layer of the root directory 11 with instructions of the user or automatic settings of the job generation unit and is constructed hierarchically. This hierarchy may be multiplex and does well if it provides with consistency with path designation of the image file described in the Image forming instruction file 12. Likewise the Image forming instruction file 12 may lack a (not shown) predetermined directory between itself and the root directory 11 but does well if the job generation unit is disposed in a detectable position.

Figure 4:
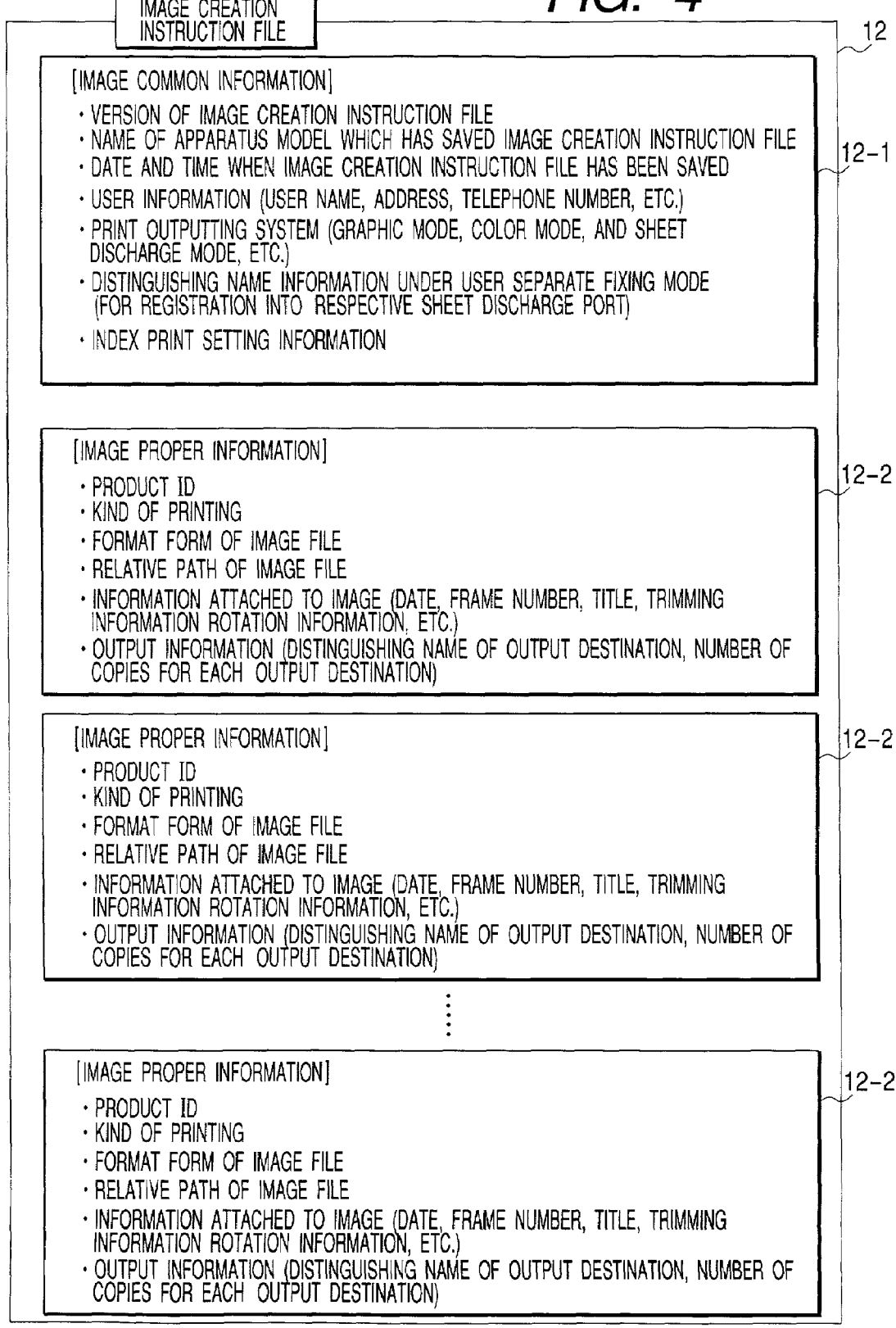
FIG. 4 shows the concept for explaining the contents of the data described in an image forming instruction file according to the first embodiment of the present invention.

FIG. 4 shows an embodied example of data contents described in the above described Image forming instruction file 12. As shown in FIG. 4, onto the Image forming instruction file 12, common information in image data to be stored in the storage medium 110 (to be referred to image common information) 12-1 and information inherent to each image data (to be referred to as image inherent information) 12-2 are described.

In the image common information 12-1 a version name of the Image forming instruction file 12, name of apparatus model, date and time when the Image forming instruction file has been saved, user information (user name, address, and telephone number, etc.), print output system (graphic mode, color mode, and sheet discharging mode, etc.), distinguishing attributes (classification attributes) under user separate automatic mode, etc. are described. On the other hand, in respective image inherent information 12-2 the product ID, the print class, the number of print, format form of the image file, relative path of the image file, image attached information (date, panel serial number, title, trimming information, rotation information, etc.) are described. This information could be one automatically described in accordance with settings at the time of image input or could be one described by a user instructing clearly after image input.

In the case where the user has indicated printing, the job generation unit detects the above described Image forming instruction file 12 from the storage media 110 and analyzes contents of the detected Image forming instruction file so as to prepare print jobs based on that analyzed content.

FIG. 5 depicts an example of UI (user interface) for a user to register a paper discharge tray name (distinguishing name) at the time of operation under user separate fixing mode. In order to operate the image recording device 102 under the user separate fixing mode, it is necessary to register the distinguishing names for respective paper discharge trays 251 to 257 of the image recording device 102 in advance. When the distinguishing names are registered for respective paper discharge trays 251 to 257, user interface 16, shown in FIG. 5 for example, displayed in the display part of the panel part 104 of the image recording device 102 (reference should be made to FIG. 2) can be used for registration.

In FIG. 5, respective bins 1 to 7 (Bin1 to Bin7) of the fixed paper discharge trays 251 to 257 set at the EEPROM (a ROM electrically erasable/writable) of the printer in advance such as "Bin1", "Bin2" or "Bin3" are registered under names that the user can recognize easily such as "kakky", "yuichi", "maekawa" and "hkita" respectively. As names to be registered for the paper discharge tray under user separate fixing mode, user name, group name, and service shop name or the like are effective.

Figure 6:
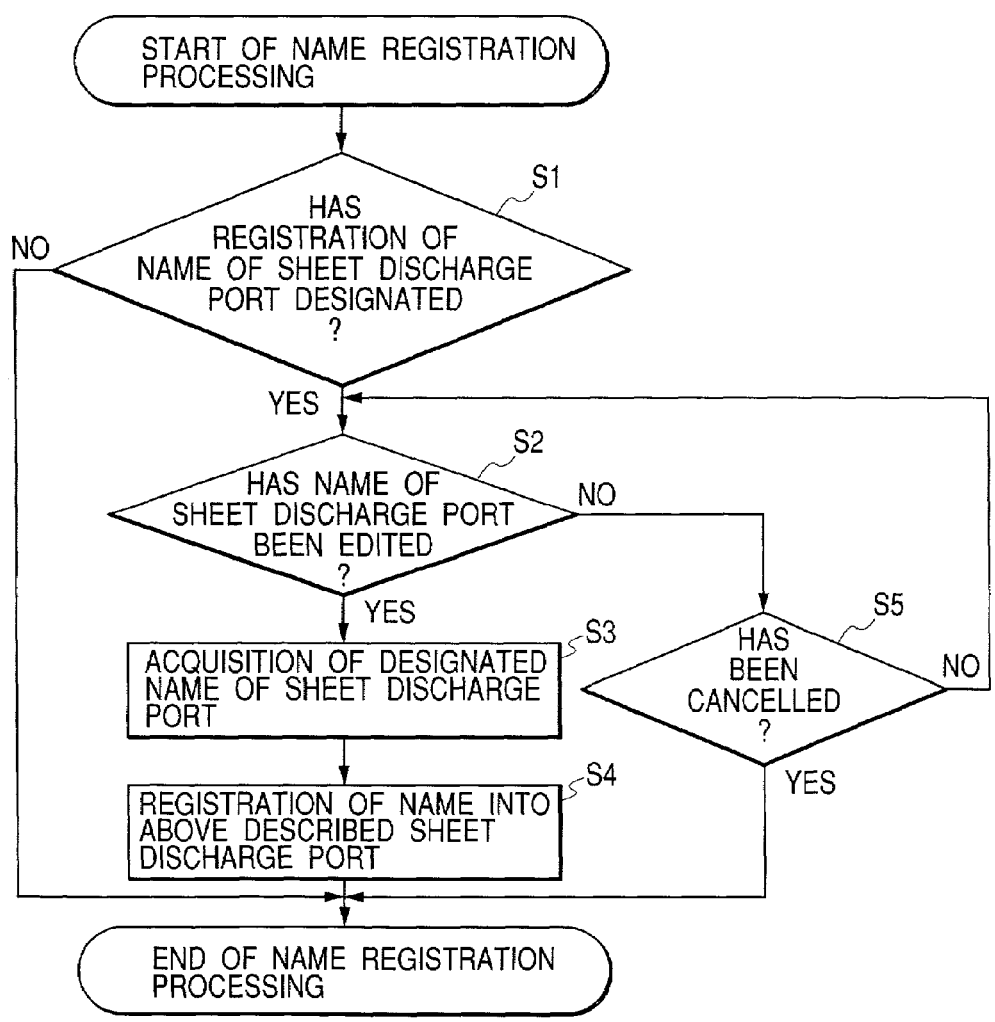
FIG. 6 is a flowchart of a process procedure of registering the name (identification name) of a paper discharge tray by a user when an operation is performed in a user separate fixing mode according to the first embodiment of the present invention.

The flow chart in FIG. 6 shows a processing procedure to register the paper discharge tray name (distinguishing name) at the time of operation under user separate fixing mode. Incidentally, in descriptions as follows, reference character S placed at the top of reference symbols denotes a processing step.

In FIG. 6, at first it is judged whether or not a user has designated registration of paper discharge tray name (S1). In S1, in the case where the registration of paper discharge tray name has been designated, while waiting for an input from the user, it is judged whether or not the paper discharge tray name has been edited (S2). In S2, in the case where the paper discharge tray name has been edited, the designated name is registered at a corresponding paper discharge tray (S4).

In the case where registration of paper discharge tray name has not been designated in S1, processing of the paper discharge tray name registration ends. In addition, in S2, in the case where paper discharge tray name has not been edited in S2, in S5 it is judged whether or not editing of paper discharge tray name has been cancelled, and if not yet cancelled, the step goes back to the processing of S2. In S5, if cancelled, the processing of registration of paper discharge tray name ends.

Figure 7:
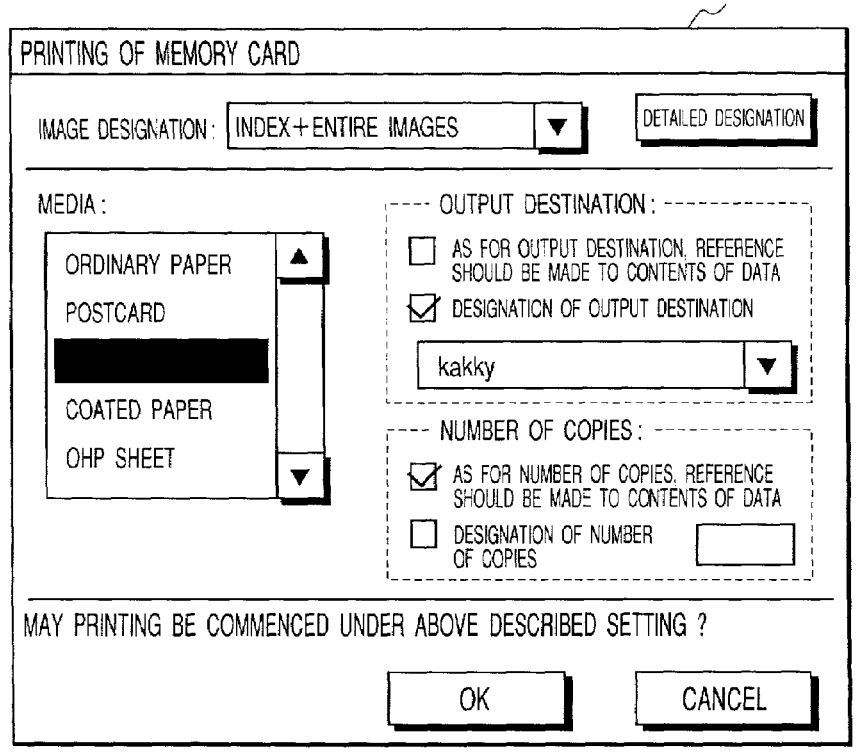
FIG. 7 is a plan view showing an example of a UI screen used by a user to issue a print instruction on the image recording device according to the first embodiment of the present invention.

FIG. 7 shows an example of user interface UI 17 to make printing indication based on data inside the memory card 110 when the memory card 110 is inserted into the memory card insertion port 413 (reference should be made to FIG. 2) of the image recording device 102. Printing from the storage medium 110 such as a memory card may start at once with its insertion as a trigger, or as in the case having been shown in the example of FIG. 1, printing may start subject to user's setting and instruction so that designations on printing can be made. In addition, as in the case having been shown in the example of FIG. 2, designation on sheet discharging mode, designation on output destinations for respective images and designation on number of copies for respective images or the like may be referred to data contents inside the memory card and the other designations and printing indication only may be executed by the image recording device. FIG. 7 shows an input example shown in an example of FIG. 1 in particular.

As shown in FIG. 7, the display part of the panel part 104 of the image recording device 102 provides with "image designation" and "media" being selectable, and as for "output destination" and "number of copies", designation on whether reference should be made to data contents or designation should be made clearly without reference to data contents can be designated with check boxes. Moreover, in the case where "output destination" and "number of copies" are clearly designated without reference to data contents, desired output destinations as well as desired numbers of copies can be designated respectively.

For "image designation", for example, whether all images inside the memory card are printed or a portion thereof is printed, or a page of an index print showing a list of selected images is printed, is selected.

In "media", it is selectable onto what the image should be printed. In some cases, the image recording device 102 could be a machine exclusive for photos, but in the present embodiment, the apparatus shall be printable for a plurality of media, and ordinary paper, postcard, photo, coated paper, OHP (overhead projector) sheet or the like can be selected, and in the input example of FIG. 7, "photo" has been selected.

In the case where "output destination" is clearly designated, all paper discharge tray names (distinguishing names) having been registered in respective paper discharge trays in advance are displayed as selection items, and among them a paper discharge tray of an image selected at "image designation" can be selected under distinguishing name corresponding with desired classification purposes. In the input example of FIG. 7, "kakky" is selected.

In case of clearly designating "number of copies", desired number of output copies for images selected at "image designation" can be selected. In the input example of FIG. 7, "as for number of copies, reference should be made to contents of data" is designated, and therefore number of copies for images selected under "image designation" is not designated clearly.

After executing these selections, the user (operator) pushes "OK" button, information inside the memory card 110 is read out so that printing starts with the above described settings.

Figure 8:
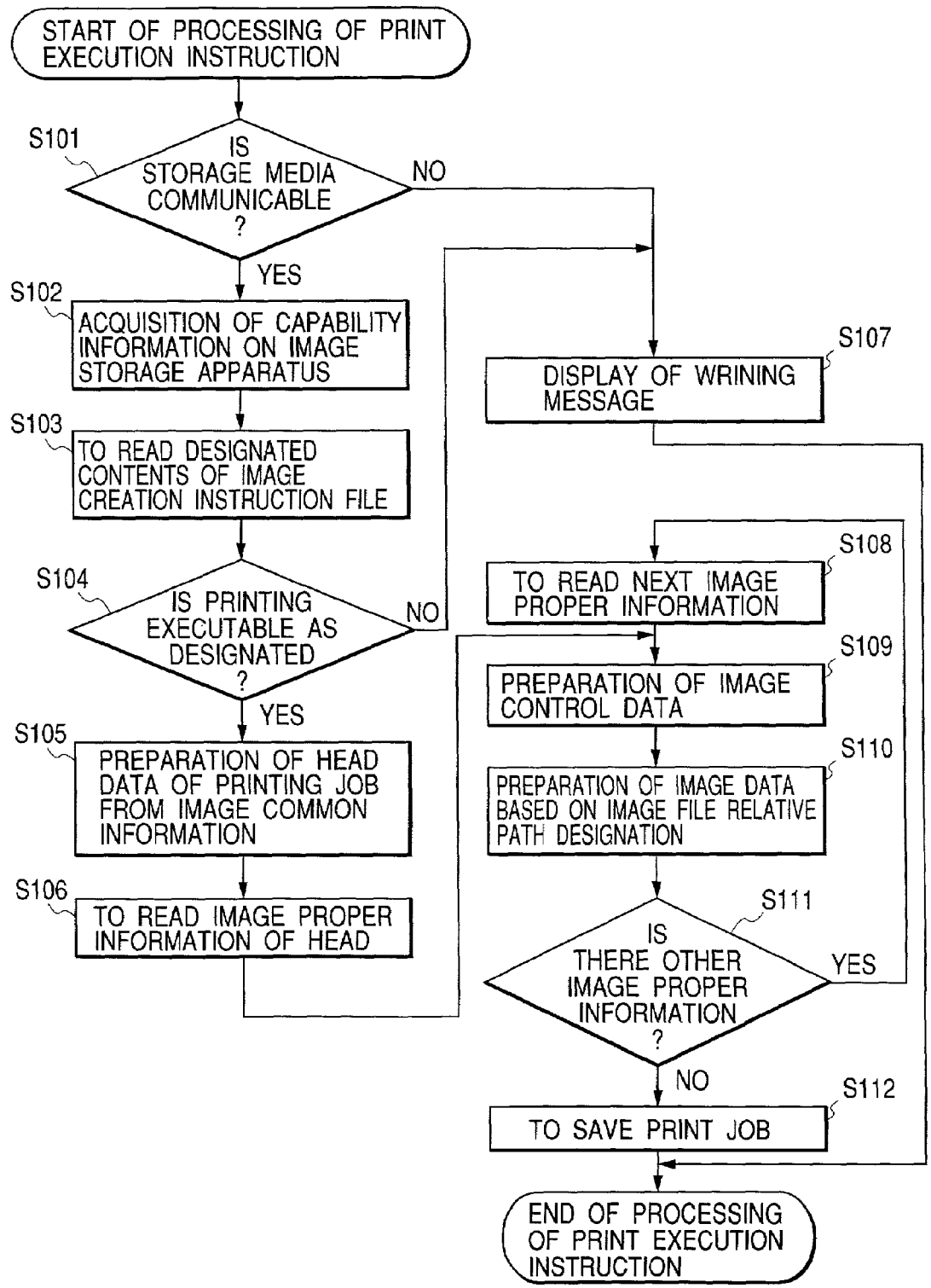
FIG. 8 is a flowchart of the print execution instructing procedure in the image recording device according to the first embodiment of the present invention.

The flow chart in FIG. 8 shows a processing procedure in the case where execution of memory card printing is instructed as described above from the user (operator).

In FIG. 8, when print execution is instructed from the user, the data readout part inside the memory card insertion port 413 starts data take-in from the predetermined storage medium 110 so as to investigate whether or not communication with the storage medium 110 to be mounted onto the data readout part is executable (S101). In S101, in the case where communication with the storage medium 110 has been judged to be not executable, the warning message such as "please mount a memory card" or the like is displayed so that the user is notified that no communication connection is implemented from the storage medium 110 (S107) and the printing execution indication processing ends.

In S101, if communication with the storage medium 110 is executable, capability information (number of paper discharge trays, number of sheet feeding ports, feeding paper size and type or the like) of the image recording device 102 is acquired (S102). In addition, in the next S103, the Image forming instruction file 12 is detected from the storage medium 110 and its contents are read in and reference is made to image data, image attached data and print setting data or the like. From those referred contents, in the next S104, it is judged whether or not printing as designated is executable, and in S104, if printing is not executable, warning message such as "user separate sheet discharge cannot be executed," or the like is displayed, display corresponding with the contents is executed, the user is notified that printing as designated is not executable (S107), and the printing execution indication processing ends. In S104, if printing is executable, the step goes forward to processing of next S105 and onwards.

In S105, considering print setting data, header data for a print image is added based on image common information 12-1 described in the read-in Image forming instruction file 12 in S103 so that the print job is formed. Moreover, each image inherent information 12-2 described in the Image forming instruction file 12 will be read in, and at first, in S106 the leading image inherent information is read in, and thereafter, processing to prepare image control data of S109 as well as processing to prepare image data based on the image file relative path designation of S110 is executed, and if other image inherent information exists in S111, the step goes back to S108 so that the next image inherent information is sequentially read in and by repeating the above described processings in S109 and S110 and the print job will be generated. Here, the image inherent information 12-2 to undergo reference is images designated under user interface UI 17 among print setting data in FIG. 7, and non-designated images shall be excluded in advance.

For further detailed description, in S109, the control data of that image are prepared based on the image inherent information in midst of reference, and in S110, the image data part of the print job is prepared from the image file stored in a position which the relative path of the image file expresses, and processing for image inherent information in midst of reference will be considered. At the time when the image control data are prepared in S109, if there are output destination and number of copies or the like clearly designated from the user at the time of printing execution indication, those pieces of information are reflected onto the image control data.

In S111, if there is no other image inherent information to be read in, the generated print job is stored (S112) and the printing execution indication processing ends.

Figure 9:
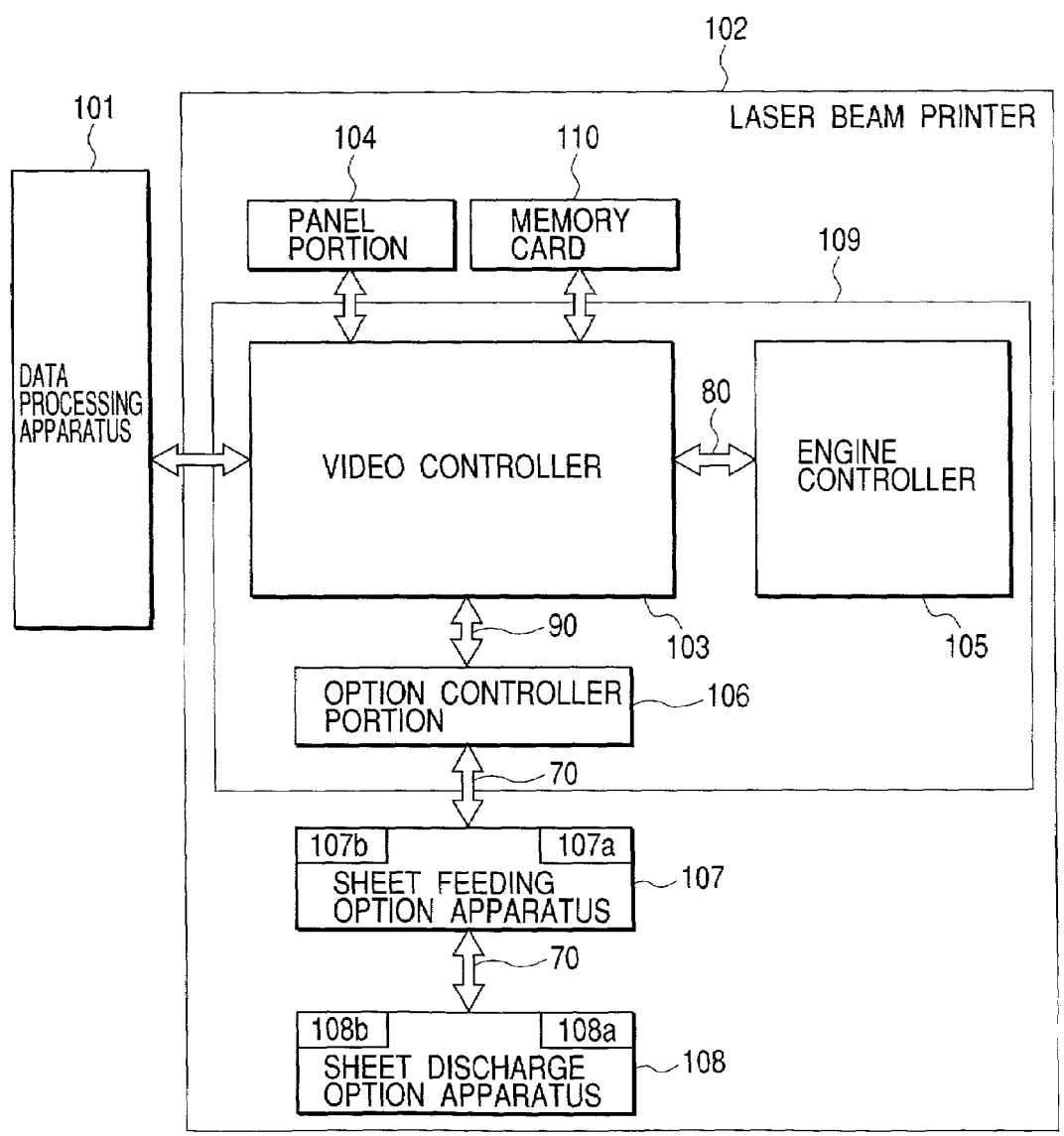
FIG. 9 is a block diagram of a configuration of the circuit of the image recording device according to the first embodiment of the present invention.

FIG. 9 shows an example of system construction of the image recording device 102 in the image storage system of the first Embodiment of the present invention, and for example shows a case of laser beam printer. Incidentally, the image recording device 102 to which the present embodiment is applied will not be limited to laser beam printers, but it goes without saying that they may be printers of other printing systems such as ink jet printers, etc. In addition, in the following descriptions as well as drawings, an example with which two option units have been brought into connection will be described, but further many option units can be connectable and the main body may commonly have function of the option units.

In FIG. 9, reference numeral 102 denotes a laser beam printer (printer), with which respective kinds of option apparatuses can be brought into connection, and is brought into connection with a data processor 101 with general-purpose interface (such as Centronics, RS232C or the like), and based on printing information (control information on code data, etc. based on a predetermined printer language including for example PostScript, LIPS (list processing program) III, LIPS IV and image data or the like) transferred from the data processor 101 via this general-purpose interface and printing information read out from the memory card 110 connected with the image recording device the stored images are processed.

Reference numeral 103 denotes a video controller, which is brought into connection with the data processor 101 with the above described general-purpose interface, receives code data (ESC (escape character) code and respective PDL (page description language) data, etc.) transferred from the data processor 101 via the above described general purpose interface so as to form page information consisting of dot data or the like based on this code data, transmits image data (in binary or multivalue) to a later-described engine controller 105, and transmits commands on sheet feeding designation as well as sheet discharging designation or the like toward a later-described option controller part 106 via unified interface 90.

The engine controller 105 forms a latent image on the photosensitive drum (the later-described reference numeral 220 in FIG. 10) by way of a known electrophotography processing, based the image data transferred from the above mentioned the video controller 103, and transfers and fixes it onto a supplied stock paper to execute printing. Incidentally, at this time, timing on sheet feeding/discharging or the like is instructed to the option controller part 106.

Reference numeral 104, which denotes a panel part (operation panel) of the laser beam printer 102, is an interface with a user constructed by various switches (buttons) for user's operation, an LED (light emitting device) display device, an LCD (liquid crystal device) display device, etc., and the user operates the panel part 104 so as to instruct the printer 102 for the predetermined operation. Incidentally, various data or the like set by the user are stored and controlled, a non-volatile memory, for example, (not shown) NVRAM (non-volatile RAM), EEPROM (electrically erasable/writable ROM), etc.

An option controller part 106, which comprises (not shown) CPU, ROM and RAM, etc., is a unified controller to unify and control one or more option apparatuses (units) based on sheet feeding/discharging instruction, etc. transferred from the above described video controller 103 as well as sheet feeding/discharging instruction, etc. from an engine controller 105, and communicates with an option controller unit 106 which various option apparatuses comprise via option unit interface 70 so as to control the various option apparatuses in a unified fashion.

In addition, inside the option controller part 106, there is a common memory (shown in the later-described FIG. 15) to which the video controller 103 is accessible, and this common memory is constructed by conveying status control area covering approximately 40 pages, basic status area, command status control area, start-up processing area or the like, and the video controller 103 makes instructions to respective options apparatuses via respective areas of the above described common memory.

Incidentally, the above described conveying status control area is constructed by a region where the video controller 103 notifies respective option apparatuses of printing method (sheet feeding port, paper discharge tray, color, stapling, and to shifting, etc.) and a region to notify the video controller 103 of the respective option status (up to where printing is executed and sheet discharging is completed, etc.).

In addition, the basic status area is a region to notify the video controller 103 of abnormality of respective option apparatuses (door open, jam, mechanical trouble, cassette stock paperlessness, discrepancies in paper sizes, fully loaded, staple neddlelessness or the like), the command and status control area is a region to exchange command status with the video controller 103, and the start-up processing area is a region where the video controller 103 designates start-up processings for respective option apparatuses.

Reference numeral 107 denotes a sheet feeding option apparatus (unit), and is, for example, a paper deck option unit, which has a paper deck controller (large capacity sheet feeding cassette controller) 107*a* inside it and controls sheet feeding based on the control information transmitted from the option controller part 106. Incidentally, the above described paper deck controller 107*a* comprises a CPU, a ROM, and a RAM (which are not shown) and the CPU is housed in the ROM to control the sheet feeding option apparatus 107 based on the program. In addition, in the ROM, extended information of the sheet feeding option apparatus 107, e.g. information on the stock paper size storable in the paper deck or the like, is stored.

Reference numeral 108 is a sheet discharging option apparatus (unit), e.g. a sorter option unit having sorting function, for example, which has a sorter controller (large capacity sheet discharging stucker controller) 108*a* inside it to execute sorting operation as well as sheet discharging operation based on the control information transmitted from the option controller part 106. Incidentally, the above described sorter controller 108*a* comprises a CPU, a ROM, and a RAM (which are not shown) and the CPU is housed in the ROM to control the sheet discharging option apparatus 108 based on the program. In addition, in that ROM, extended information of the sheet discharging option apparatus 108, e.g. information on the number of paper discharge trays, availability of sorting function, availability of stapling function, availability of shifting function to move a sheet-discharged sheet to a predetermined direction, availability of reversing function to reverse direction of the face of the discharged sheet or the like, is stored.

Incidentally, the sheet feeding option apparatus 107 and the sheet discharging option apparatus 108 are respectively provided with the operation parts 107*b* as well as 108*b* comprising display parts and various keys so as to be capable of displaying message and operation methods to the user during use of respective options and operating.

Reference numeral 110 denotes a memory card and the box of the printer 102 is provided with one or more of its mounting ports so that the card is attachable and detachable. The user mounts the memory card 110 or controls the panel part 104 so as to be capable of instructing a predetermined operation to the printer 102.

In addition, reference numeral 109 denotes a control unit, and is constructed by an engine controller 105 to execute print process control of the above described printer 102, a video controller 103 to control the entire printer 102, analyze data from a data processor 101 and convert them to image data, and an option controller part 106 to control respective option units in a unified fashion.

Incidentally, the option controller 106 controls the respective option units with a common option unit interface 70 and communicates with the video controller 103 via the unified interface 90. The present embodiment features that the video controller 103 controls the respective sheet feeding/discharging option units via the option controller part 106.

Figure 10:
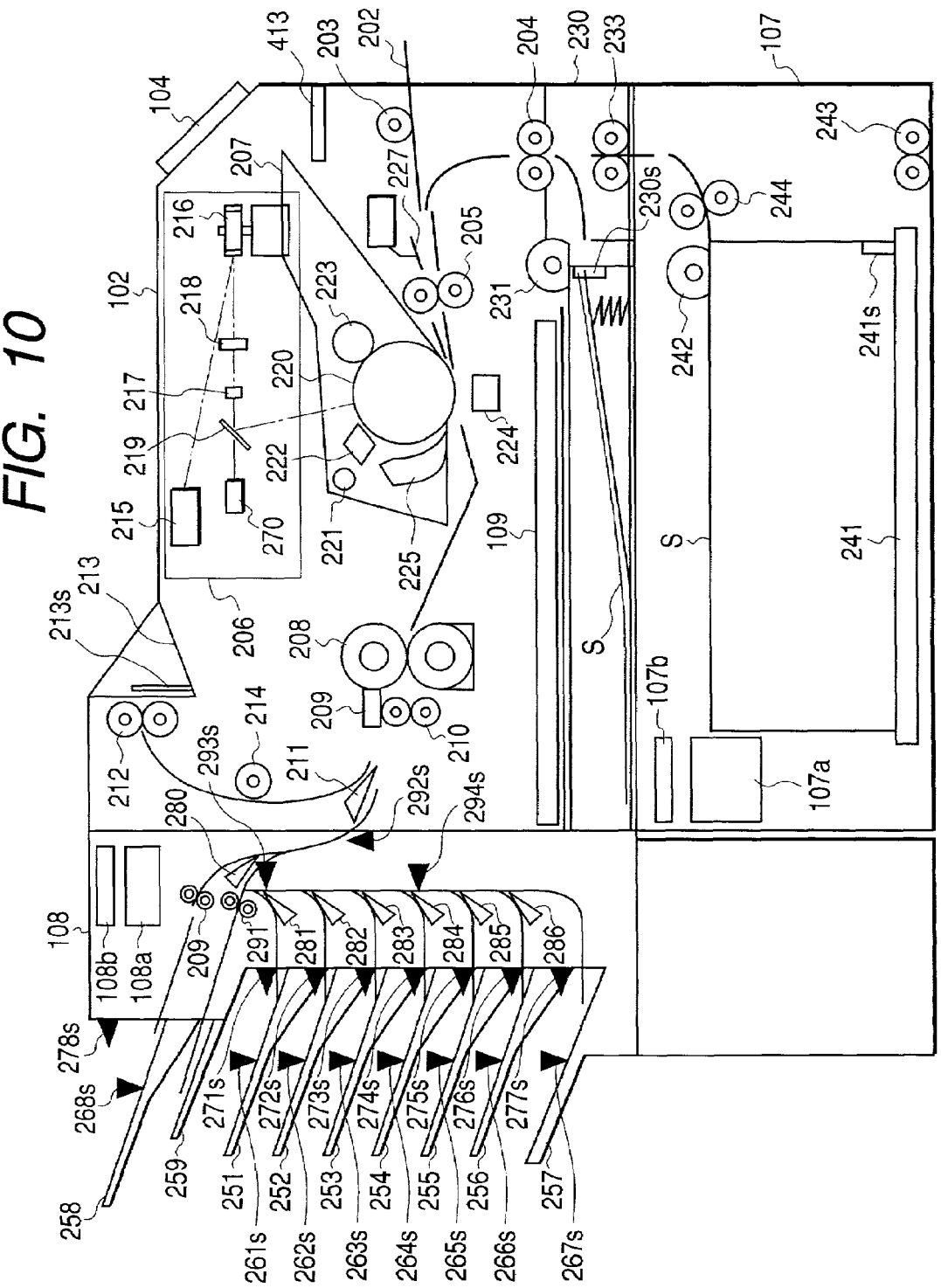
FIG. 10 is a sectional view of an outline of an internal configuration of the image recording system configured by the image recording device and an option unit according to the first embodiment of the present invention.

FIG. 10 depicts sectional structure of the printer 102 in FIG. 9, and the same reference numeral denotes the same parts as those in FIG. 9 so that repeated description will be omitted.

In FIG. 10, reference numeral 230 denotes a stock paper cassette, which holds recording sheets S and has a mechanism to detect sizes of the recording sheets S electrically with a (not shown) partition. Reference numeral 231 denotes a cassette sheet feeding clutch, which is a cam to separate only one recording sheet in the top of the recording sheets S disposed on the stock paper cassette 230 to make the separated recording sheet S to be conveyed to reach the sheet feeding roller 204 with (not shown) driving means, intermittently rotates on each sheet feeding and sheet-feeds one recording sheet corresponding with one rotation. Reference numeral 230S denotes a recording sheet detection sensor to detect quantity of the recording sheets S held in the stock paper cassette 230.

Reference numeral 227 denotes a resist shutter, which pushes stock papers and halts sheet feeding. The sheet feeding roller 204 conveys the tip part of the recording sheet S to reach the resist shutter 227. Reference numeral 202 denotes a tray for manual supply for the recording sheets S to be disposed. Reference numeral 203 denotes a sheet feeding clutch for manual sheet supply, which conveys the recording sheet S disposed in the tray for manual sheet supply 202 to reach the resist shutter 227. Reference numeral 233 is an option sheet feeding roller (sheet feeding relay conveying roller) which supplies into the main body of the printer 102 the recording sheet S supplied from the sheet feeding option 107.

In addition, the downstreams of the above described sheet feeding roller for manual supply 203, the cassette sheet feeding clutch 231 and the option sheet feeding roller 233 are provided with a pair of resist roller 205 to convey the recording sheets S in a synchronized fashion, and the downstream of the resist roller is provided with an image recording part 207 to form a toner image onto the recording sheet S with laser beams emitted from a laser scanner part 206 by way of the known electrophotography process.

In the laser scanner part 206, reference numeral 215 denotes a laser unit, which emits laser beams based on image signals (VDO signals) transmitted from the video controller 103. The laser beams emitted from the laser units 215 is scanned by a polygon mirror 216 to form a latent image onto a photosensitive drum 220 via image forming lens group 218 as well as reciprocating mirror 219. Reference numeral 217 denotes a beam detector, which detects laser beams emitted from the laser unit 215 to output main scanning synchronization signals. Reference numeral 270 denotes a light amount sensor, which detects light amount of laser beams emitted from the laser unit 215.

In addition, in the image recording part 207, reference numeral 222 denotes a primary charger to uniformly charge the surface of the photosensitive drum 220. Reference numeral 223 denotes a developing device, which is charged with the primary charger 222, toner develops a latent image formed in the photosensitive drum 220 subject to laser exposure with the laser scanner part 206. Reference numeral 224 denotes a transfer charger to transfer the toner image on the photosensitive drum developed with the above described developing device 223 onto the sheet-fed recording sheet S with the resist roller 205. Reference numeral 225 denotes a cleaner and removes the residual toner on the photosensitive drum 220. Reference numeral 221 denotes a pre-exposure lamp to deprive the photosensitive drum 220 of photoelectricity.

Reference numeral 208 denotes a fixing device to fix with heat the toner image formed in the recording sheet S with the image recording part 207 onto the recording sheet S. Reference numeral 210 denotes a conveying roller to sheet-discharge and convey the recording sheets S. Reference numeral 209 denotes a sheet discharging sensor to detect delivery state of the recording sheets S. Reference numeral 211 denotes a flapper to switch the conveying direction of the recording sheet S subject to completion of recording to the side of the sheet discharging sheet loading tray 213 or the side of the sheet-discharging option apparatus 108. Reference numerals 214 and 212 denote sheet discharging rollers to sheet-discharge the recording sheets S conveyed with switching of the flapper 211 to the loading tray 213. Reference numeral 213S denotes a sheet-discharged sheet load capacity detecting sensor to detect load capacity of the recording sheets loaded on the discharged-sheet loading tray 213.

In addition, the engine controller 105 inside the control unit 109 controls the electrophotography process with the laser scanner part 206, the image recording part 207 and the fixing device 208 and control conveyance of recording sheets inside the main body of the laser printer 102.

Moreover, the video controller 103 is brought into connection with the data processor 101 with a general-purpose interface (for example, Centronics and RS (recommended standard) 232C or the like) to extend the coming image information transmitted via the genera-purpose interface into bit data and to transmit those bit data to the engine controller 105 via the video interface 80 as VDO signals.

In addition, the data read out part 413 is a portion to mount detachably attachable storage medium 110 such as a compact flash, smart media and a memory stick or the like, to read out printing data from the data stored in those storage media at the time when the storage media are mounted, execute the processing as in the case when the coming data have been transmitted from the above described data processor 101 and to execute printing.

Next, respective option units brought into connection with the main body of the printer 102 in a detachably-attachable fashion will be described.

The option controller part 106 depicted in FIG. 9 is provided inside the main body depicted in FIG. 10 so that various option units are constructed to be communicable with the same protocol via an option unit interface 70 to become a common bus. In addition, the option controller part 106 is brought into connection with the video controller 103 via the unified interface 90.

In the sheet feeding option apparatus 107 such as a paper deck option unit or the like, reference numeral 241 denotes a paper deck where large amount of the recording sheets are piled up on the ascending/descending deck. Reference numeral 242 denotes a paper deck sheet feeding roller and sheet-feeds the recording sheets S loaded on the paper deck 241. Reference numeral 244 denotes a conveying roller and conveys the recording sheets S sheet-fed from the paper deck sheet-feeding roller 242 in the direction of the option sheet-feeding roller 233. Reference numeral 243 denotes a sheet feeding relay conveyance roller to relay-convey the recording sheets sheet fed from another sheet-feeding system option unit (an option unit capable of sheet-feeding the recording sheets with different sizes and same sizes) which is detachably/attachably connectable in plurality in the lower part of the paper deck option. In addition, reference numeral 241S denotes a recording sheets housing amount detection sensor to detect disposed amounts of the recording sheets S disposed onto the paper deck 241.

Incidentally, the paper deck option unit (sheet feeding option apparatus) 107 is controlled by the paper deck controller 107a.

In the sheet discharging option 108 of the sorter option unit or the like, reference numerals 251 to 257 denote a first sheet-discharging bin to a seventh sheet-discharging bin executing face down sheet discharge and to classify already recorded recording sheets S to be loaded. In addition, reference numeral 258 denotes an eighth sheet discharging bin to sheet-feed the conveyed-in sheets to the sorter option directly straight and to execute face up sheet discharge. Reference numeral 280 denotes a flapper to switch conveyance so as to switch faces of sheets on the recording sheets S transmitted to the sorter option unit (sheet-discharge option apparatus) 108 sorted by the flapper 211 of the main boy of the printer 102 based on instructions from the video controller 103. In addition, reference numerals 261S to 268S denote sheet-discharge empty detection sensor to detect existence or lack of the recording sheets to be sheet-discharged to the first sheet-discharge bin 251 to the eighth sheet-discharge bin 258.

Moreover, the sheet discharge load capacity detection sensors 271S to 278S denote full-mount detection sensors and the sorter controller 108a notifies the video controller 103 via the option controller 106 on the full mount at the point of time when the height of the recording sheets loaded on the above described first sheet-discharging bin 251 to eighth sheet-discharging bin 258 reaches (detects) for example 18 mm (equivalent to approximately 120 sheets).

In addition, the above described first sheet-discharge bin 251 to eighth sheet-discharge bin 258 can load approximately 120 sheets for each bin, that is approximately 960 sheets in eight bins, and among them, the first sheet-discharge bin 251 to seventh sheet-discharge bin 257 can execute sorting sheet-discharge.

In the case where the video controller 103 has designated face up via the unified interface 90, sorting is executed with the face up flatter 280 being switched on so that the sorted recording sheets S are transmitted as they are to the paper discharge tray with the roller 290. In addition, in the case where the video controller 103 has designated face down via the unified interface 90, sorting is executed with the face up flatter 280 being switched off so that the sorted recording sheets S are conveyed by the roller 291 until the tail end of the recording sheet S once exceeds the face up flapper 280, and next the roller 291 rotates in the reverse direction so that the tail end of the recording sheet S is transmitted into the vertical path, and the bin flappers 281 to 286 are driven at a predetermined timing by the designated sheet-discharge bin so that sorting is executed to respective face down paper discharge trays and sheet discharge is completed in the face down state. With the sheet-discharge bin being the seventh sheet-discharge bin 257, without driving the bin flapper, sheet discharge is executed as is so that face down sheet discharge is completed.

Moreover, in the case where the video controller 103 has designated (not shown) stapler to execute stapling via the unified interface 90, the recording sheets S are deposited in the (not shown) staple tray so that the recording sheets S are arranged and the stapler execute stapling to discharge sheets to any of the first sheet-discharge bin 251 to the eighth sheet-discharge bin 258. In addition, in the case the video controller 103 designates shifting via the unified interface 9, the stock sheets are deposited in the (not shown) staple tray as in case of staple designation, and the recording sheets S are arranged with the recording sheets S being moved together with the tray, that is, the disposition area (tray) of the recording sheets S to undergo sheet discharge is moved and thereafter sheet-discharge is executed any of the first sheet-discharge bin 251 to the eighth sheet-discharge bin 258. In addition, a (not shown) staple needles remaining amount detection sensor is provided so as to detect the remaining amount of the staple needles stored inside the staple.

Incidentally, the sorter option unit 108 is controlled by the sorter controller 108a.

In addition, the option controller part 106, the paper deck controller 107a and the sorter controller 108a are respectively brought into connection with (not shown) connectors and serial communication is executed by the option unit interface 70. Each party is connected in series with the same connector, and accordingly, the paper deck option unit 107 and the sorter option unit 108 can be brought into connection with their connection order being changed.

Incidentally, the downstreams of the above described sheet feeding roller for manual supply (sheet feeding clutch for manual supply) 203, the cassette sheet feeding clutch 231 and the paper deck sheet feeding roller 242 are provided with a pair of the above described resist roller 205 to convey the recording sheets S, the sheet feeding roller 204 and the conveying roller 244 respectively, and the downsream of the resist roller 205 is provided with the above described image storage part 207 to form a toner image onto the recording sheet S with laser beams emitted from the above described laser scanner part 206. Moreover, the downstream of the image recording part 207 is provided with the above described fixing device 208 to fix with heat the toner image formed on the recording sheet S, and the downstream of the fixing device 208 is provided with the sheet-discharge sensor 209 to detect the conveyance state of the sheet-discharging part, the conveying roller 210 to convey the recording sheets and the flatter 211 to switch the conveying direction of the recording sheet S which has completed recording or the like.

Figure 11:
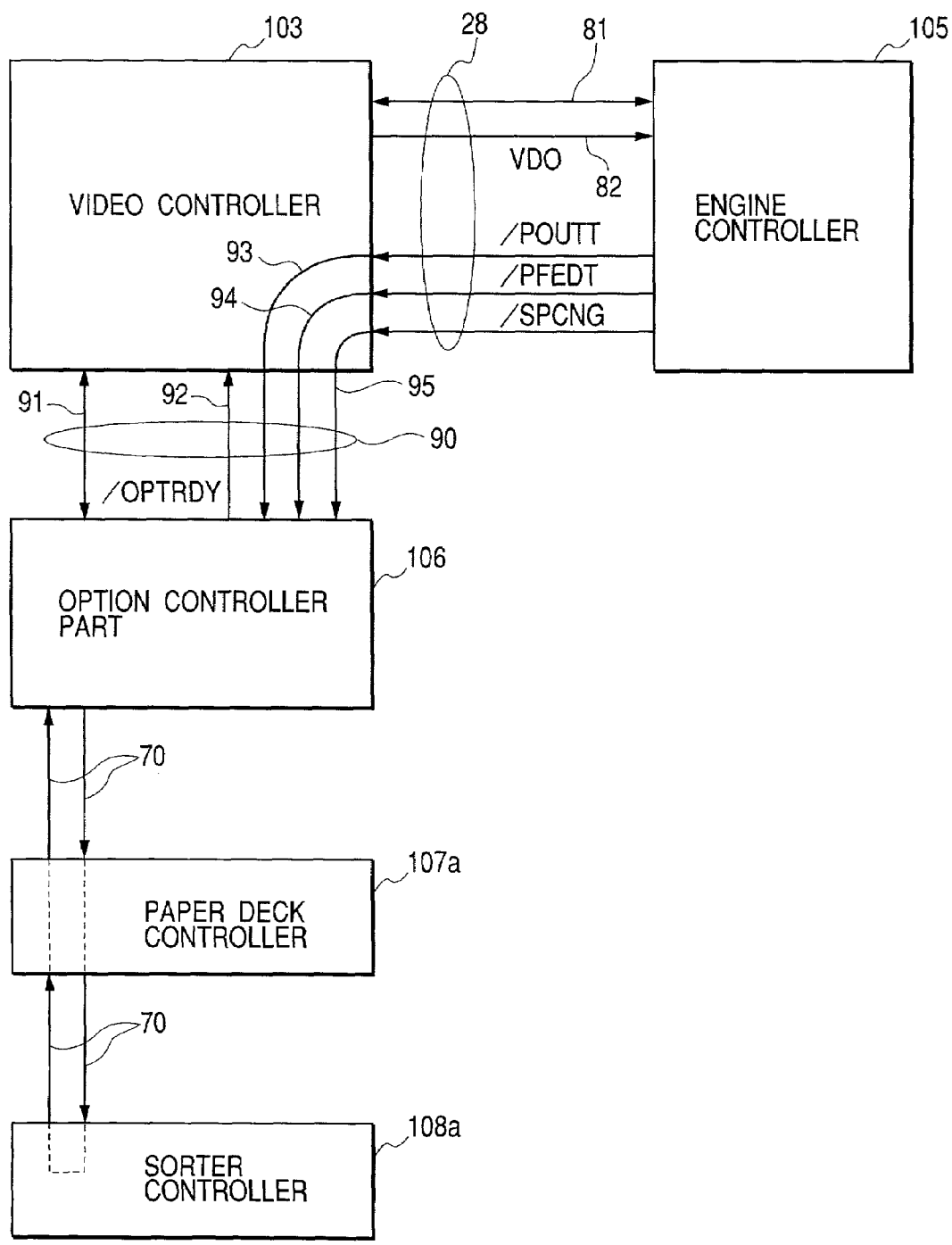
FIG. 11 is a block diagram showing an interface of each controller in the image recording device shown in FIG. 9 according to the first embodiment of the present invention.

FIG. 11 shows flows of signals in a circuit of the printer 102 depicted in FIG. 9, and the same reference numeral denotes the same item as in FIG. 9.

In FIG. 11, reference numeral 91 denotes a serial communication interface, and commands such as sheet-feeding designation to the paper deck option unit 107 and the sheet-discharge bin designation to the sorter option unit 108 or the like are transmitted to the option controller part 106 from the video controller 103 while status such as sheet existence or lacking in the paper deck option unit 107, loading of each sheet-discharge bin in the sorter option unit 108 and existence or lack of staple needles are transmitted to the option controller part 106, and the option controller part 106 and the video controller 103 may be directly connected with the CPU bus.

Reference numeral 92 denotes /OPTRDY signal, which functions as signals to show an option designated by the video controller 103, for example whether or not the staple is in a ready state for use, to be transmitted to the video controller 103 from the option controller part 106. Reference numeral 93 denotes /POUTT signal to function as timing signals for the main body of the printer 102 to sheet-discharge the recording sheets. Reference numeral 94 denotes /PFEDT signals and functions as signals to show timing to receive the recording sheets from option units. Reference numeral 95 denotes /SPCNG signals, which deaccelerates the recording sheets S conveyed in rapidly inside the option units, and functions as signals to adjust itself to the conveying velocity of the main body of the printer 102.

Reference numeral 81 denotes a communication interface, commands such as sheet feeding designation to the sheet feeding cassette of the main body of the printer 102, sheet discharging designation to the sheet discharging tray 231 of the main body of the printer 102 and printing etc. is transmitted from the video controller 103 to the engine controller 105, and the status such as existence or lack of paper and jam, etc. in the paper stock cassette 230 of the main body of the printer 102 is transmitted from the engine controller 105 to the video controller 103. Reference numeral 82 denotes bit data transmitted from the video controller 103.

In addition, FIG. 11 does not depict but control on respective processings by this engine controller 105 is executed based on signals to be exchanged with the video controller 103, and as those signals, there are /CPRDY, /PPRDY, /RDY, /PRNT, /VSREQ, /VSYNC, /BD, /SCLK, /CMD, /CBSY, /STS, /SBSY and /CCRT (Condition Change Report T), details of which are as shown in FIG. 12.

Among the above described signals, in order to show methods for use on /CCRT signals, processing will consist of Procedure 1 and Procedure 2 described as follows.

(Procedure 1)

The video controller 103 normally checks /RDY signals and /CCRT signals, and will go to read out status information when those signals are changed. At that time, /CCRT signals are "FALSE" (false) and /RDY signals have become "FALSE", at first, status on contents of misprint, wait, sleep, operator all or the like is checked. Corresponding with that check outcome, status at low-ranking status corresponding with respective bits is referred to so that details are confirmed.

(Procedure 2)

On the other hand, when /CCRT signals have become "TRUE" (true), at first, status of contents such as changes in stock sheet sizes, changes in existence or lack of stock sheets in sheet feeding part change function of sheet feeding part and changes in warning contents or the like are read out so that kinds of status having undergone changes is recognized and status of the group is sequentially read out in order to recognize details. In addition, as for resetting procedure of /CCRT signals, the engine controller 105 always checks status change in the very end, that is changes in paper sizes, changes in existence or lack of paper, changes in sheet feeding function, changes in warning states, and when there has occurred any change, the condition change status falling under the upper-ranking thereof is set at "1" as well as /CCRT signals being hard signals are made "TRUE". Thereafter, in receipt of status request command from the video controller 103, with the fact that the condition change status is read in to the video controller 103, /CCRT signals are made "FALSE".

In addition, the unified interface 90 is constructed with five lines of hard signals of serial communication interface (I/F) 91, /OPTRDY signals 92, /POUTT signals 93, /PFEDT signals 94 and /SPCNG signals 95.

Incidentally, three signals of /POUTT signals 93, /PFEDT signals 94 and /SPCNG signals 95 are outputted from the engine controller 105, and are inputted to the option controller part 106 via the video interface 80 through the video controller 103. Details of the above described respective signals are as described in FIG. 13.

Figure 14:
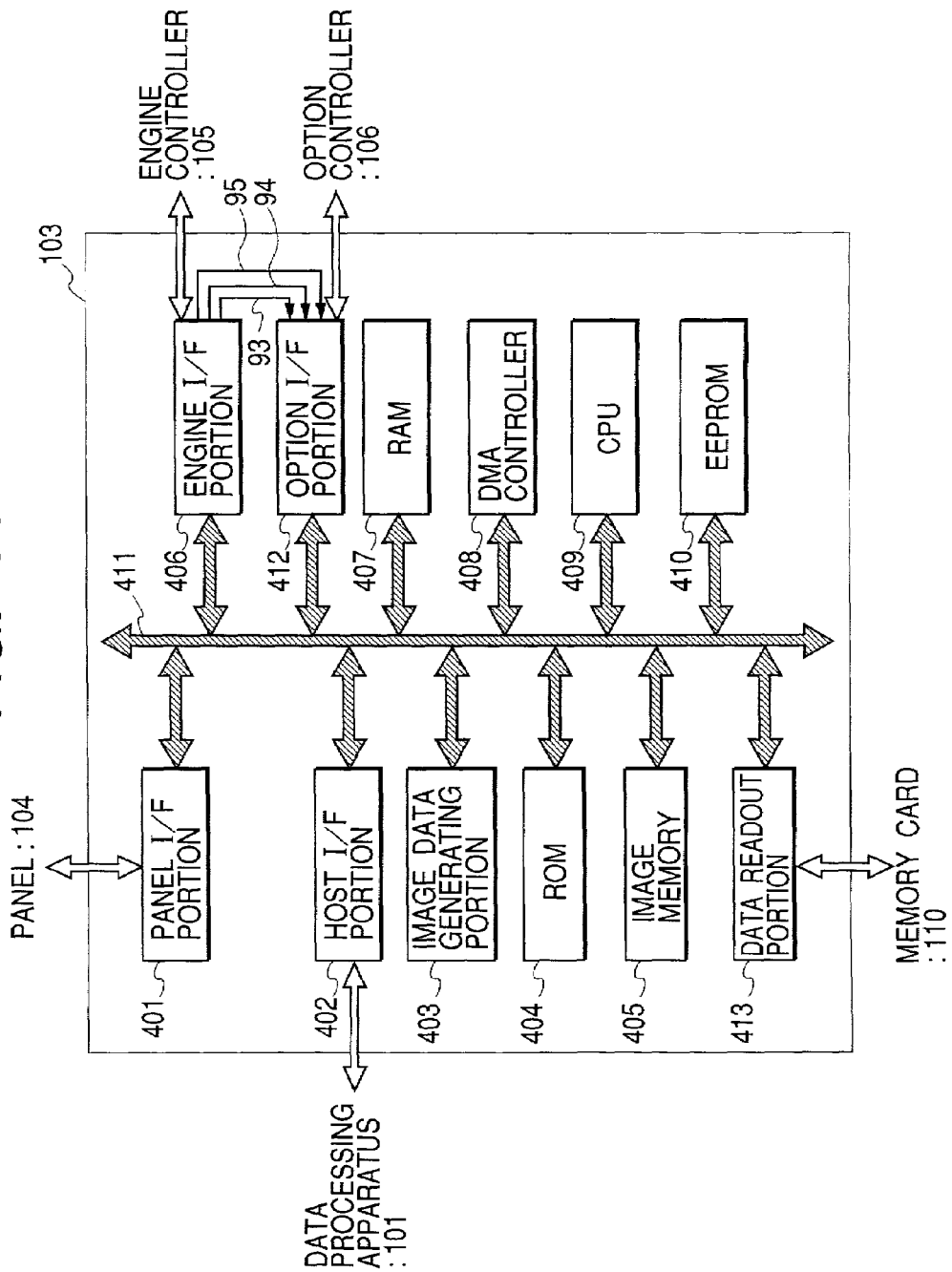
FIG. 14 is a block diagram of a detailed configuration of a video controller shown in FIG. 11 according to the first embodiment of the present invention.

FIG. 14 shows a detailed circuit construction of the video controller 103 shown in FIG. 9, and the same reference numeral denotes the same item as in FIG. 9.

In FIG. 14, reference numeral 401 denotes a panel interface (I/F) part, which receives respective settings as well as instructions from the operator from the panel part 104 by way of data communication with the panel part 104. Reference numeral 402 denotes a host interface (I/F) part, and is a part inputting-outputting signals to and from the data processor 101. Reference numeral 406 denotes an engine interface (I/F) part, and is a part inputting-outputting signals to and from the engine controller 105 so as to transmit data signals from the (not shown) output buffer register and execute communication control with the engine controller 105.

Reference numeral 403 denotes an image data generating part and generates bit map data for actual printing based on control code data sent from the data processor 101. Reference numeral 405 denotes an image memory, that houses image data. Reference numeral 409 denotes a CPU, which is in charge of entire control of the video controller 103. Reference numeral 404 denotes a ROM, which houses the control code of the CPU 409. Reference numeral 407 denotes a RAM, which functions as temporal storage means to be used by the CPU 409. Reference numeral 410 denotes EEPROM, which is constructed by non-volatile memory media.

Reference numeral 408 denotes a DMA (dynamic memory access) control part, which transfers the bit map data inside the image memory to the engine interface part 406 by instructions from the CPU 409. Reference numeral 412 denotes an option interface (I/F) part, which executes communication with the option controller part 106 corresponding with instruction from the CPU 409. In addition, /POUTT93, /PFEDT94 and /SPCNG95 having been shown in FIG. 13 are transmitted to the unified interface 90 from and through the engine interface part 406.

Reference numeral 413 denotes a data read-out part, which reads out printing data of the memory card 110 based on insertion of the memory card 110 or instructions of the operator from the panel part 104. Here, based on the read-out data, execution of printing will be proceeded as in case of data reception from the data processor 101.

Reference numeral 411 denotes a system bus, which has an address bus as well as a data bus. The panel interface part 401, the host interface part 402, the image data generation part 403, the ROM 404, the image memory 405, the engine interface part 406, the RAM 407, the DMA control part 408, the CPU 409, EEPROM 410 and the option interface part 412 are respectively brought into connection with a system bus 411 and are accessable to all functioning parts on the system bus 411.

Incidentally, the control code controlling the CPU 409 shall be constructed by an OS (operation system) to execute time-division control with load module unit called a task by the (not shown) system clock and a plurality of load modules (tasks) shown in FIG. 18 to be described later that operates on a function-by-function basis.

Figure 15:
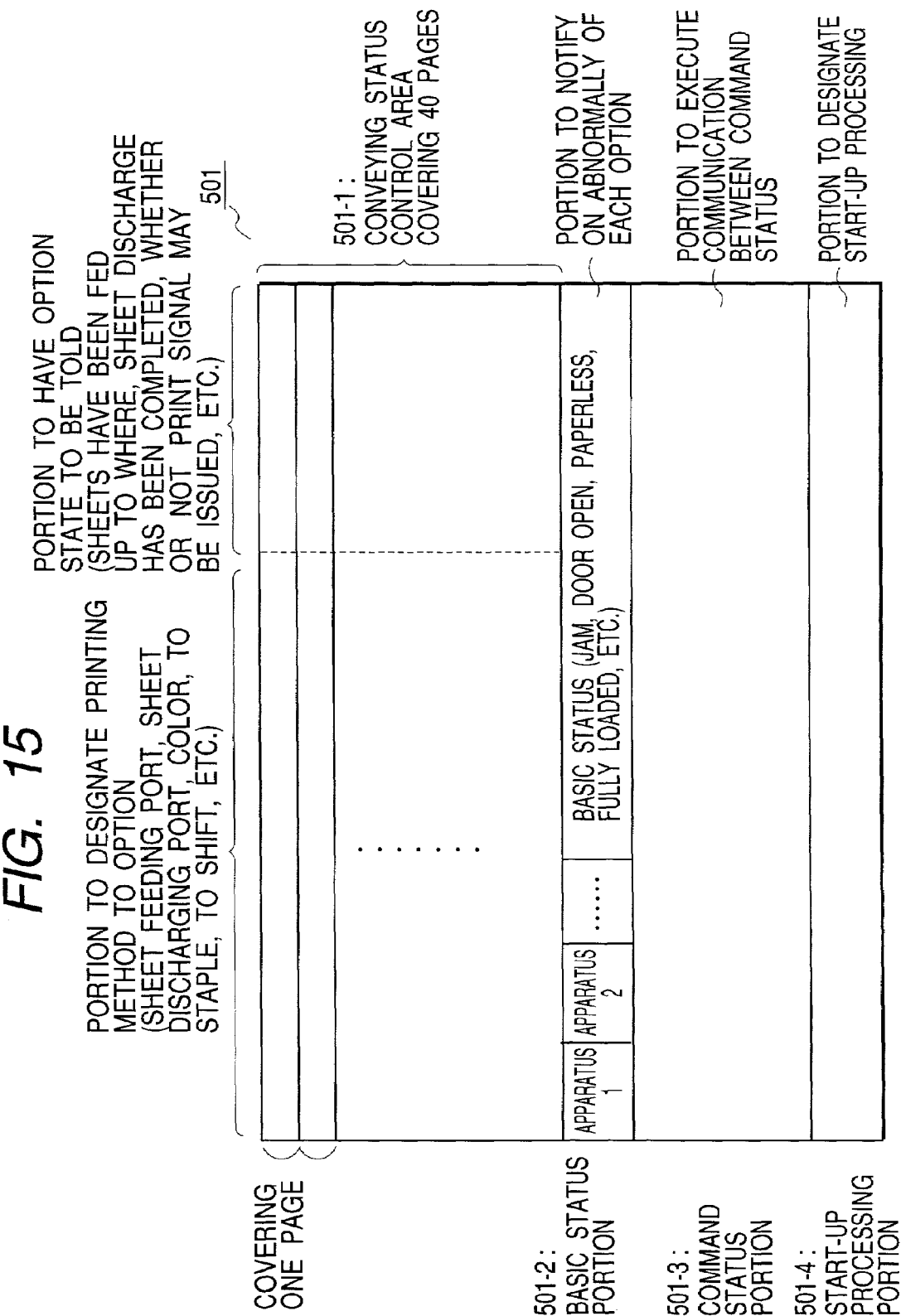
FIG. 15 is a memory map showing the contents of the memory shared with the video controller reserved in a RAM provided in the option controller shown in FIG. 11 according to the first embodiment of the present invention.

FIG. 15 is a schematic view being a memory map of the common memory 501 with the video controller 103 secured in (not shown) RAM provided inside the option controller part 106 having been shown in FIG. 9 in the present embodiment.

Figure 16A:
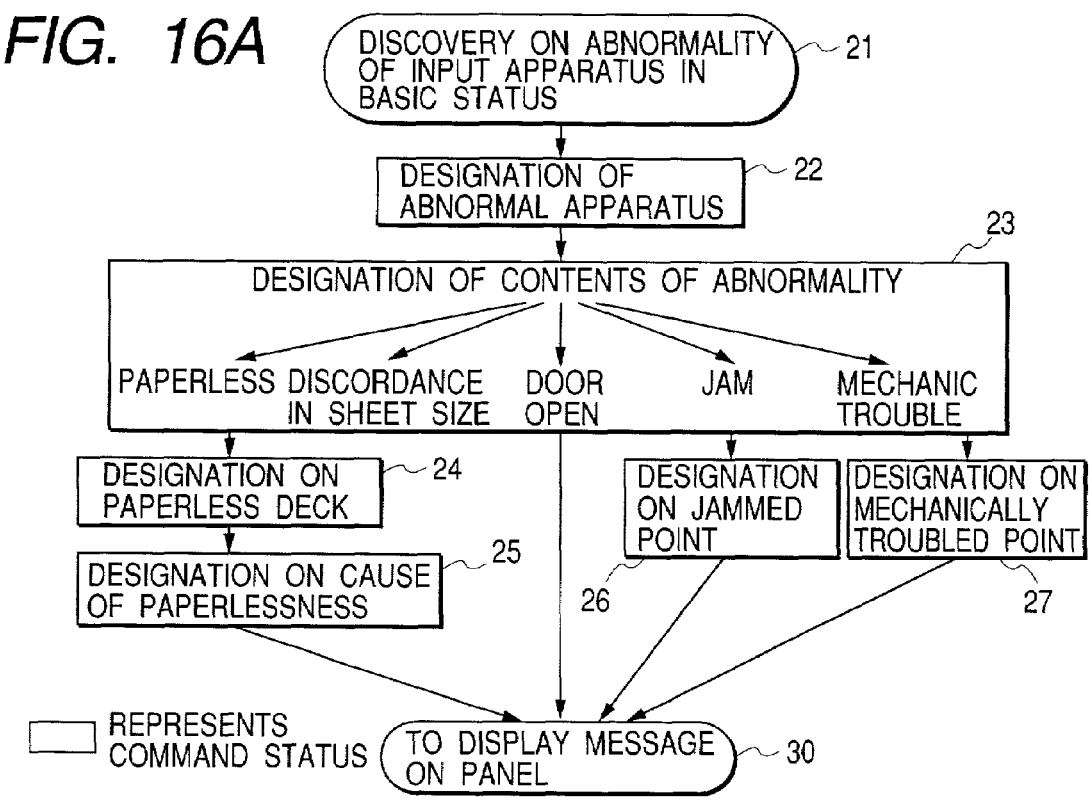
FIGS. 16A and 16B show the type of the procedure of obtaining detained information about each paper supply/discharge option unit by issuing a command status based on the basic status of an option unit according to the first embodiment of the present invention.
Figure 16B:
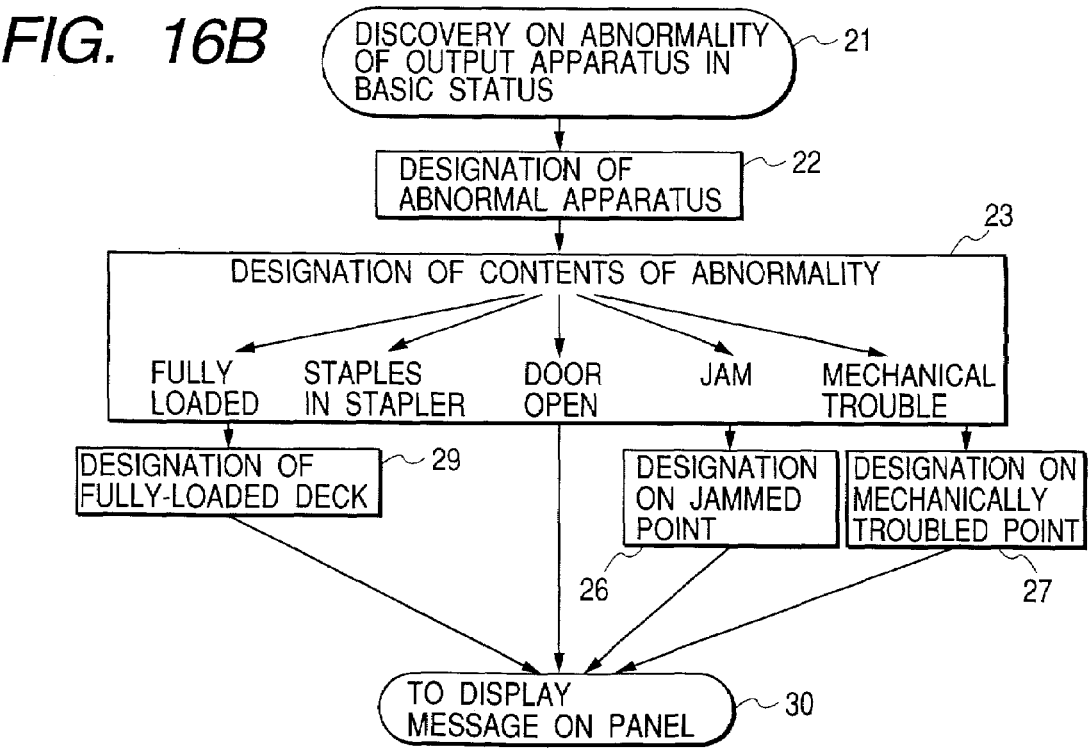

FIGS. 16A and 16B are schematic views showing procedures of the video controller 103 and the option controller part 106 issuing the command status to acquire detailed information of input and output options respectively.

At first, with reference to FIG. 15 and FIGS. 16A and 16B, a control method that the video controller 103 unifies and controls respective option apparatuses via the option controller 106 will be described.

The common memory 501 shown in FIG. 15 consists of a conveying status control area 501-1 to know the conveying status of the sheets, a basic status portion 501-2 to know abnormal states of respective options, a command status portion 501-3 to exchange command status and a start-up processing portion 501-4 to designate the start-up processing of the option apparatuses.

The start-up processing portion 501-4 consists of a start-up designating portion to execute designation from he video controller 103 and the completion notifying portion to notify that as a result of executing designation the respective options have completed processings. The video controller 103 executes designation to this start-up processing portion 501-4 so as to execute start-up processing for the respective option or the like.

When the power is turned on, the video controller 103 notifies the start-up designation portion of the start-up processing portion 501-4 of initializing designation of the common memory 501, the configuration information acquisition designation of respective options necessary for the option controller 106, and completion of information acquisition so as to supervise at the completion notifying portion whether or not the respective processing is completed, and when all are completed, the start-up processing will come to an end.

The conveying status control area 501-1 consists of a portion to designate printing methods such as the sheet feeding port, the paper discharge tray, color/monochrome, staple position and execution and a portion to be kept addressed of option status such as up to where the sheets have been fed, whether or not the print signal may be outputted, or whether or not sheet discharge has been completed. The video controller 103 designates the above described print methods and will execute printing, keeping status of the respective options under control. For this above-described designation in the start-up processing 501-4, designation covering maximum 40 pages is possible, and designation is executed sequentially every page, and the region where sheet discharge is completed is regarded as a vacant region and is initialized so that redesignation is executable and is used as a ring buffer.

The basic status portion 501-2 is an area (region) to notify abnormal status of respective apparatuses, and acquires from this region the status such as sheetless, jam, door open, mechanical trouble and fully-loadedness or the like. From the contents of the basic status, further detailed information is acquired with the command status.

The command status portion 501-3 is a region to acquire detailed information of respective options as well as to control operation of options, and designates the command corresponding with necessity to this region to acquire information. For example, acquirable information is a device name, a sheet-feeding implementation sheet size, a sheet feeding paper capacity, a position of jam, a kind thereof, an access point, a load capacity of the sheet discharging paper, and details on mechanical troubles etc., and these issue commands corresponding respective circumstances as shown in FIGS. 16A and 16B (Procedure 23) to receive status. In addition, control on options such as transition to power saving mode, emergency stop at the time of jam, movement of the sheet discharging bin, execution of resetting or the like is executed involving the command status portion 501-3 as well.

Thus, the video controller 103 acquires the above described information, executes printing under a state without any abnormality, and in case of having detected occurrence of abnormality from the basic status (Procedures 21 and 22), issues a command status to specify the abnormal spot (Procedure 23), and moreover specifies the abnormal contents on that apparatus (Procedures 24 to 28 and 29) and will execute detailed information collection or the like (30) as well control corresponding with that abnormality.

Figure 17:
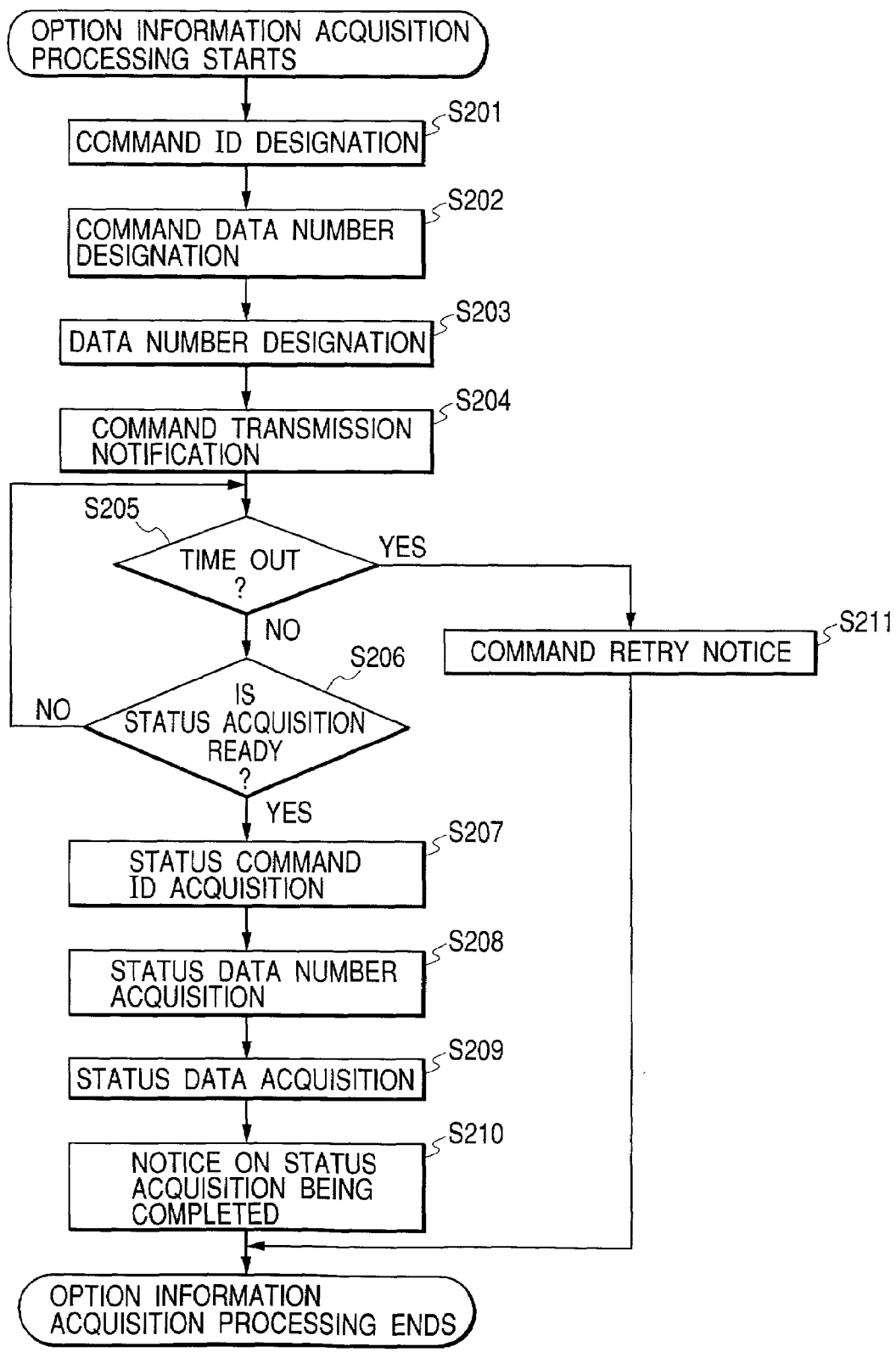
FIG. 17 is a flowchart of an embodiment of a method of obtaining option information through an option controller shown in FIG. 11 according to the first embodiment of the present invention.

The flow chart in FIG. 17 accesses to the common memory 501 in the option controller 106 in FIG. 15, exchanges command status with respective options, and shows mechanism to exchange information.

In FIG. 17, when the video controller 103 acquires option information, designation is executed to the command status control area 501-3 inside the memory that the option controller 106 has and the information is received. ID (distinguisher) to distinguish necessary kinds of information (S201), number of data to execute designation to the option controller 106 with execution commands (S202), data expressing the designated contents (S203) is designated to a predetermined address for the command designating region so that the fact the command has been transmitted is notified, and the option controller 106 triggers to communicate with respective option apparatuses and to acquire information (S204).

Based on trigger by S204 and the designated contents, the option controller 106 executes serial communication with necessary option apparatuses to obtain the designated information. On the other hand, until the option controller 106 gets the information completely, the timer is started so that it is supervised whether or not the video controller 103 is conditioned to be capable of acquiring the status information (S205, S206).

In the case where no transition to the status information acquirable state takes place even in a constant time, the status information can not be acquired, and therefore a try notification is executed to execute commands again (S611) and the processing comes to an end.

In S206, when transition to the status information acquirable state has taken place, the status ID is acquired so that it is confirmed whether or not it is the status information for the designated command (S207). Next, the status data number is acquired (S208), the status data covering the status data number are acquired (S209) and completion of status acquisition is notified to the option controller 106 (S610).

Figure 18:
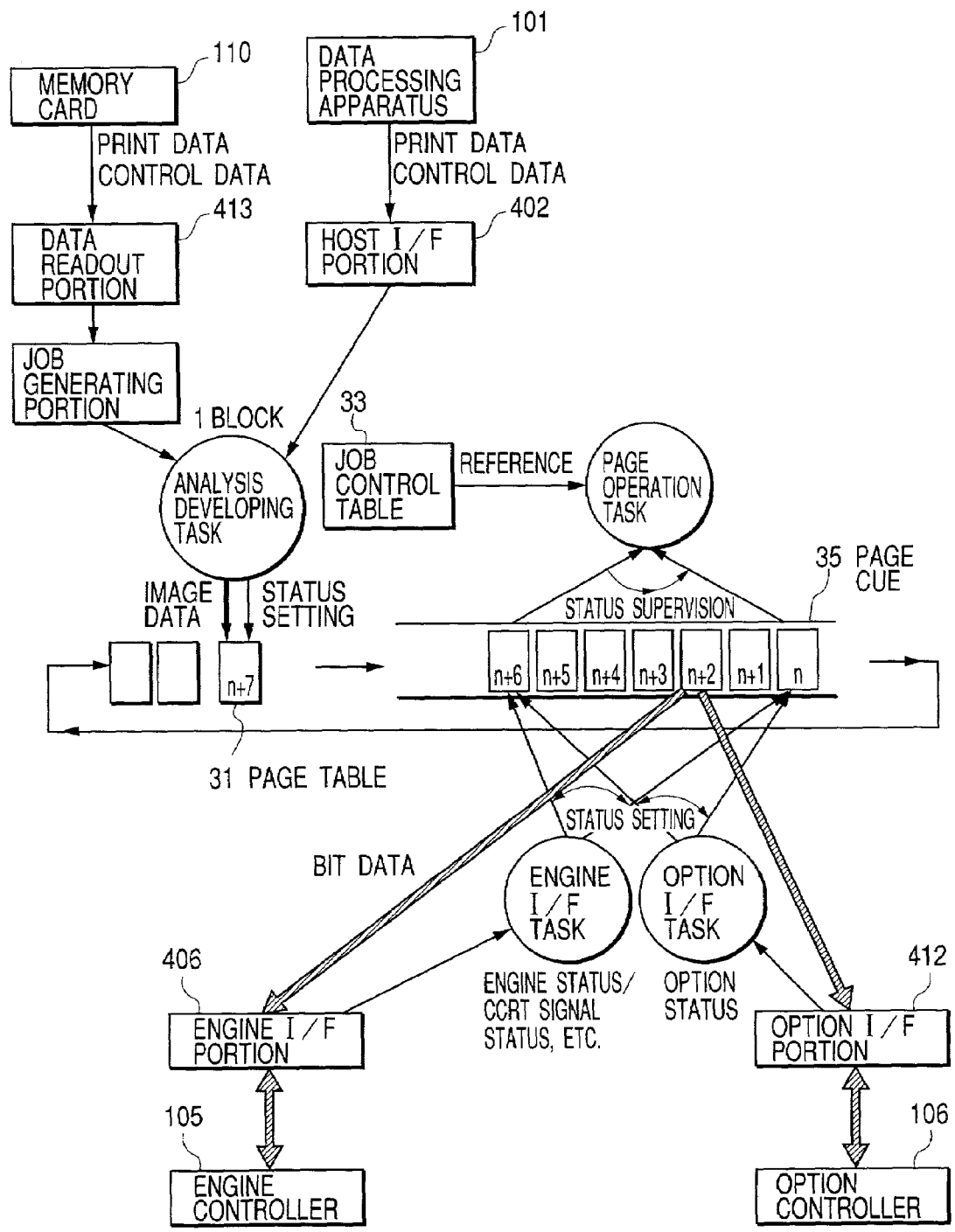
FIG. 18 is a block diagram showing a data flow in the image recording process according to the first embodiment of the present invention.

FIG. 18 is a flow chart showing data flow, in the present embodiment from the data processor 101 or the memory card 110 to the option controller part 106 as well as the engine controller part.

The control code controlling the CPU 409 shall be constructed by an OS to execute time-division control with load module unit called a task by the (not shown) system clock and a plurality of load modules (tasks) that operates on a function-by-function basis.

Translator processing system (analysis extension task) in FIG. 18, scheduling system (page operation task), engine I/F part 406 and the option I/F part 412 are tasks that are embodied by the CPU 409 as described above, and shall be operated in parallel logically. Prior to detailed description on the data flow in FIG. 18, various tables in FIG. 19 to FIG. 21 related to this flow will be described.

Figure 19:
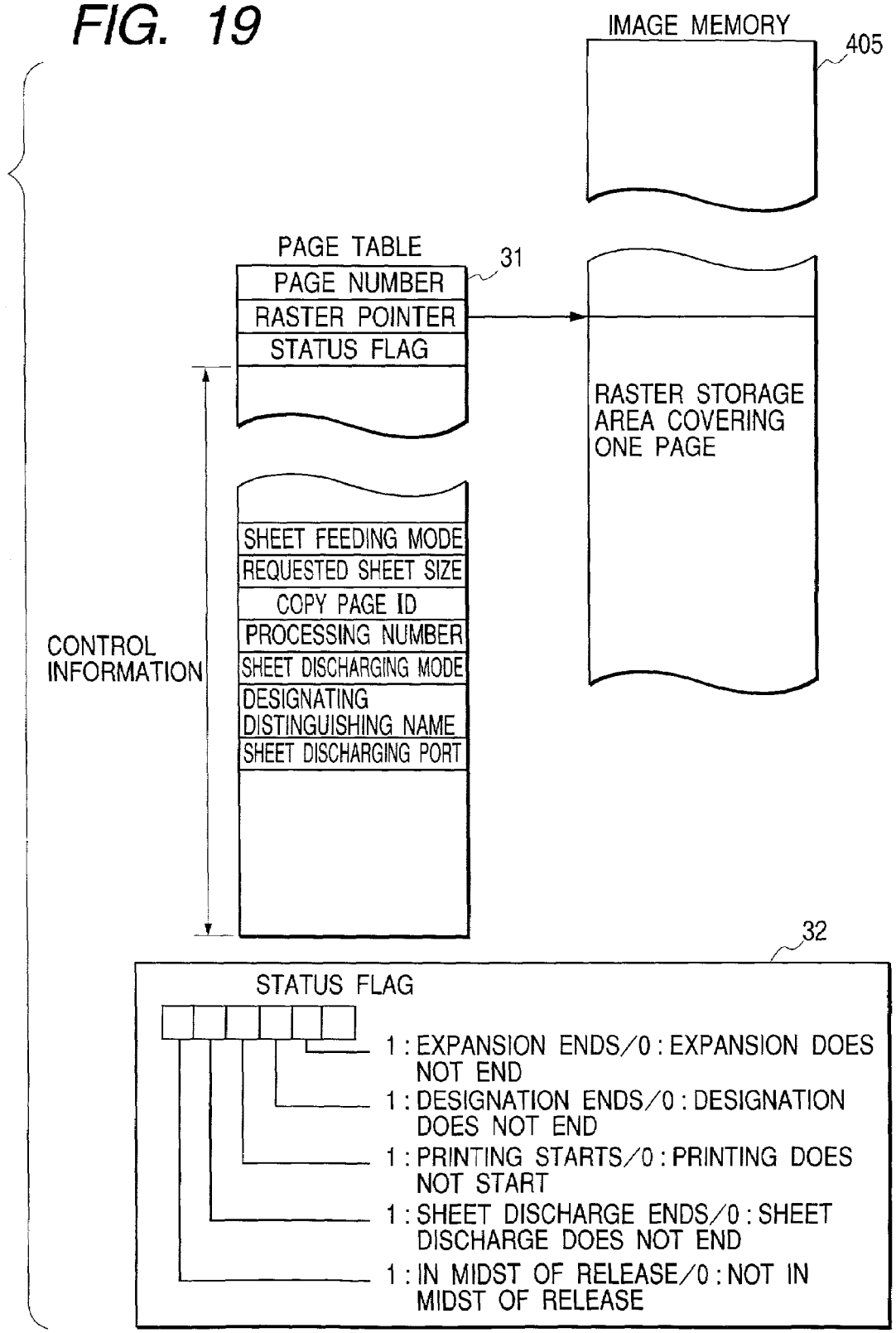
FIG. 19 is a memory map showing the map relating to the page table in the image memory shown in FIG. 14 according to the first embodiment of the present invention.

FIG. 19 shows a structure of page table 31 that stores the page information in FIG. 18. The page table 31 is a table to recognize each page logically in the CPU 409 in FIG. 14, is embodied to exist as continuous regions to the above described RAM 407 (not shown) control information storage region, and is controlled by the (not shown) page control function part for acquisition and release.

"Raster pointer" in the page table 31 in FIG. 19 is a leader pointer of the region covering one gape in the above described image memory 405, and the CPU 409 divides the (not shown) region in question in the image memory 405 on a page-by-page basis to link it to here at the time of initializing subject to the power being switched on.

"Status flag" in the page table 31 is a region to store the flag showing the status of the page, and as shown in reference numeral 32 in FIG. 19 includes:

"extension completion flag"
"page designation completion flag"
"print start flag"
"sheet discharge completion flag"
"release flag"

or the like, and this status flag can judge in what status the prepared page information is.

"Sheet feeding mode" in the page table 31 is to instruct determination method of the sheet feeding means and includes:

"automatic sheet feeding"
"cassette 1 (cassette 230) sheet feeding"
"paper deck (cassette 107) sheet feeding"
"MP tray sheet feeding"

(all of which are not shown) or the like. Here, "automatic sheet feeding" is a mode to search from the sheet-feeding means where the sheet size is corresponding and the sheets are disposed in accordance with a predetermined priority for determination.

As for "requested sheet size" in the page table 31, numerical expression on the sheet size requesting sheet feeding to the engine controller 105 is stored.

Figure 22:
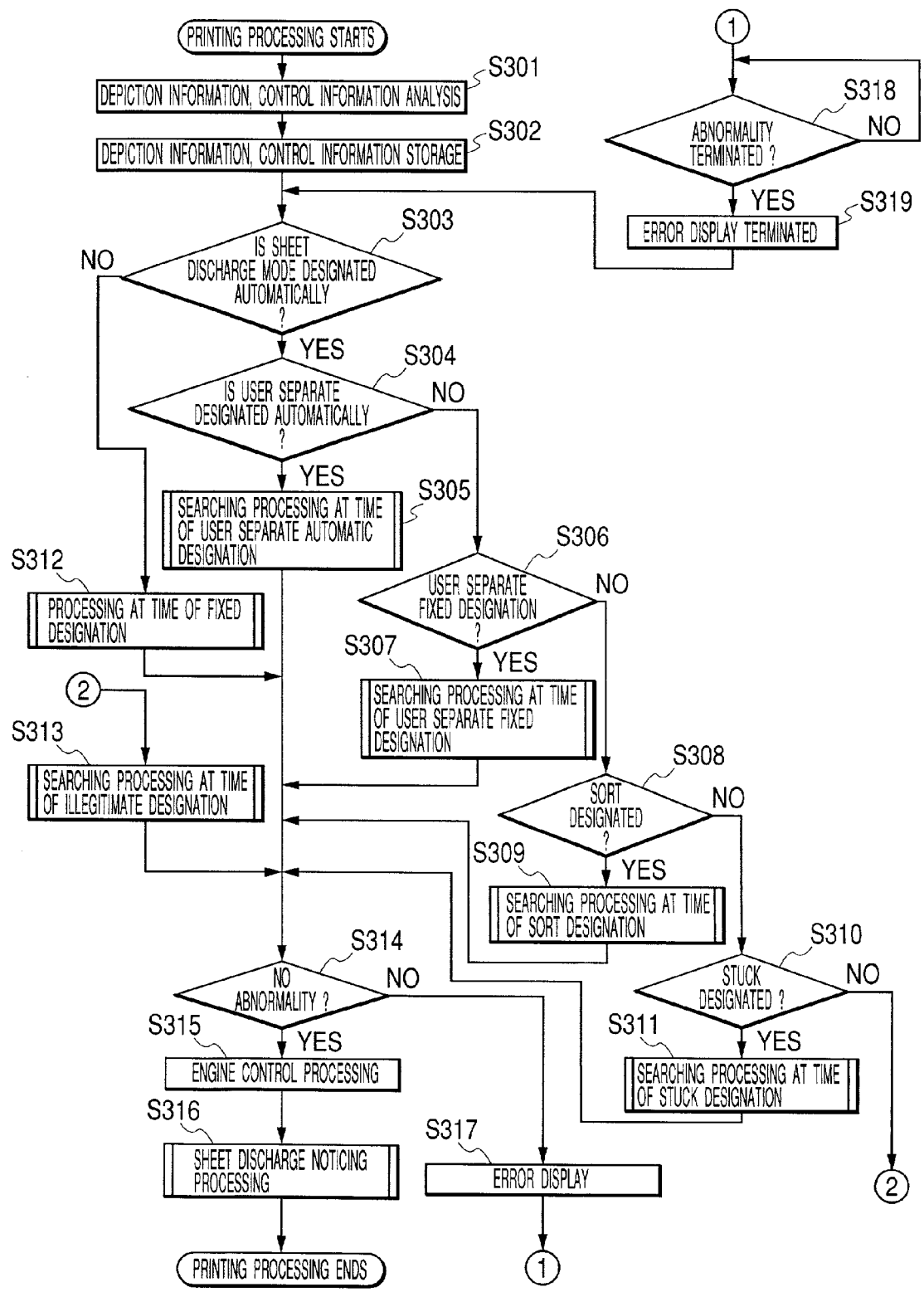
FIG. 22 is a flowchart of the process procedure of the image recording device receiving print data until the completion of the printing process according to the first embodiment of the present invention.
Figure 23:
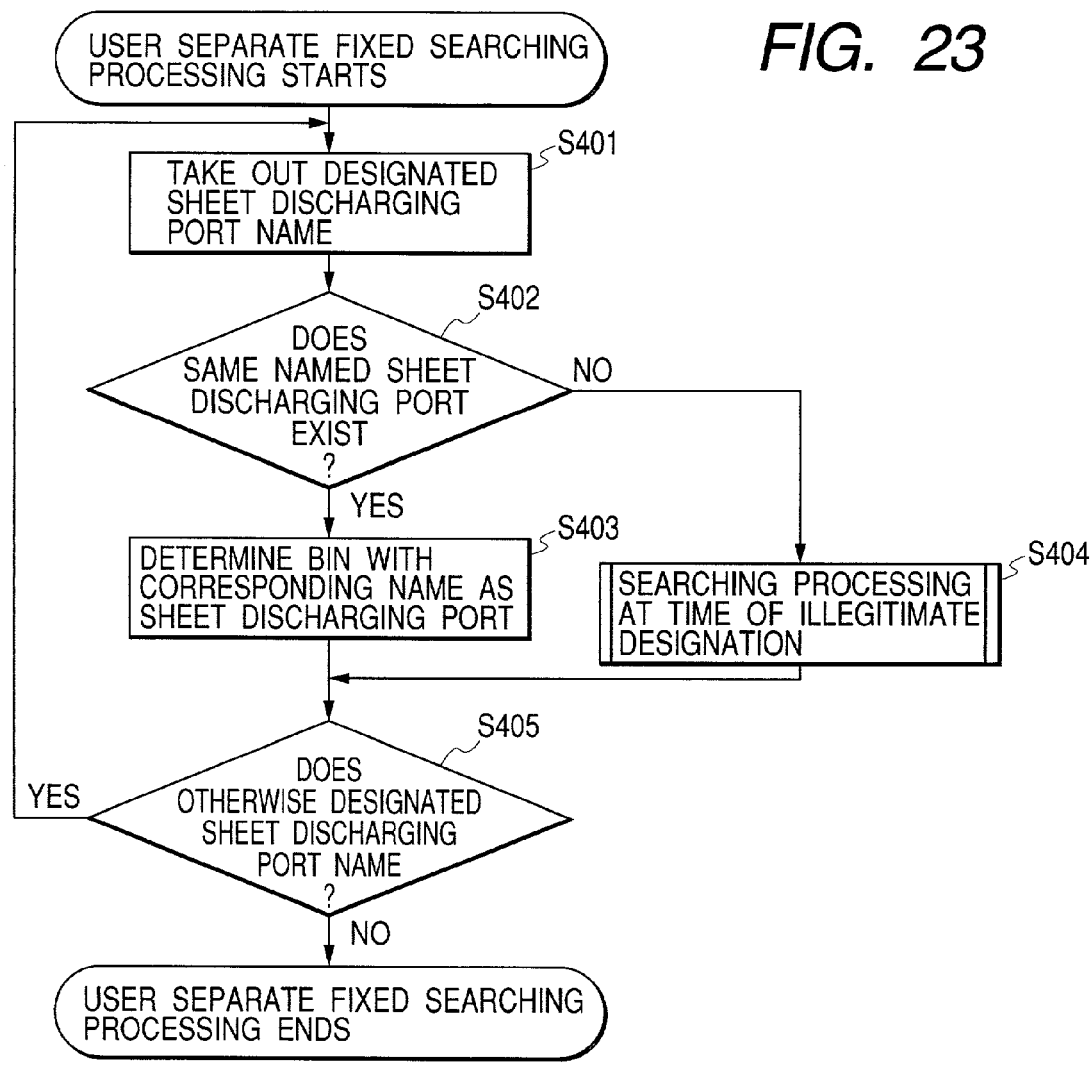
FIG. 23 is a flowchart of the procedure of retrieving a paper discharge tray in the user separate fixing mode according to the first embodiment of the present invention.

In addition, "sheet discharge mode" in the page table 31 is to instruct the determination method of the sheet discharging means, and "user separate automatic mode" and "user separate fixing mode" are designated to this "sheet discharging mode". In the case where "user separate automatic mode" or "user separate fixing mode" have been designated, the name designated as the sheet discharge destination is stored in "designated distinguishing name", and the actual paper discharge tray determined by the paper discharge tray searching processing to be described later in FIG. 22 and FIG. 23 is stored in "paper discharge tray" in the page table 31.

Figure 20:
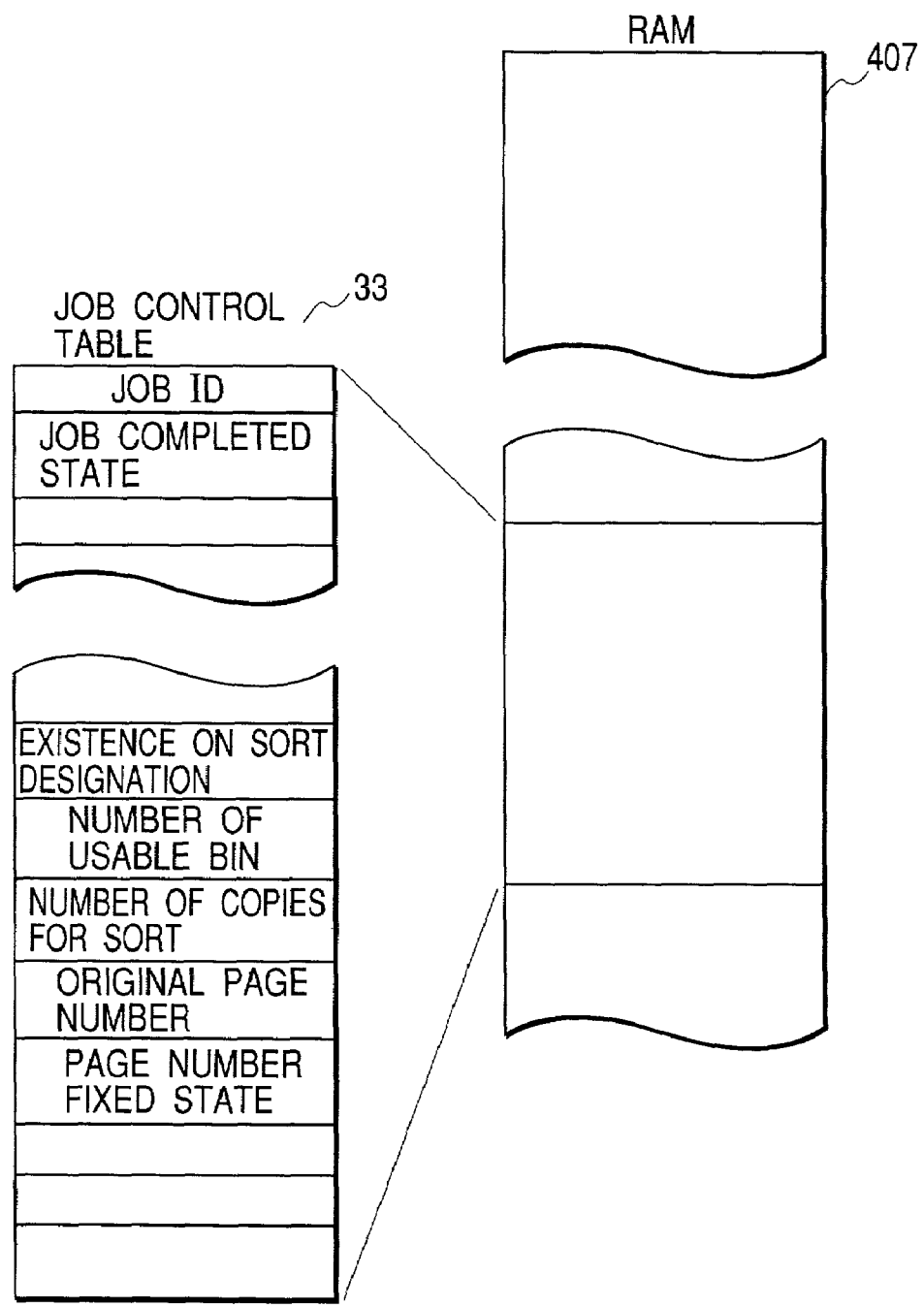
FIG. 20 is a memory map showing the map relating to the job control table in the RAM shown in FIG. 14 according to the first embodiment of the present invention.

FIG. 20 shows the structure of the job control table 33 in the RAM 407 of FIG. 14. The job control table 33 is status as well as contents of the input job taken under control in the video controller 103, and is embodied to exist as continuous regions to the above described RAM 407 (not shown) control information storage region, and is controlled by the (not shown) job control function part for acquisition and release.

Any of the above described tables are referred to or renewed from the analysis extension task, the page operation task, the engine I/F task and the option I/F task.

Figure 21:
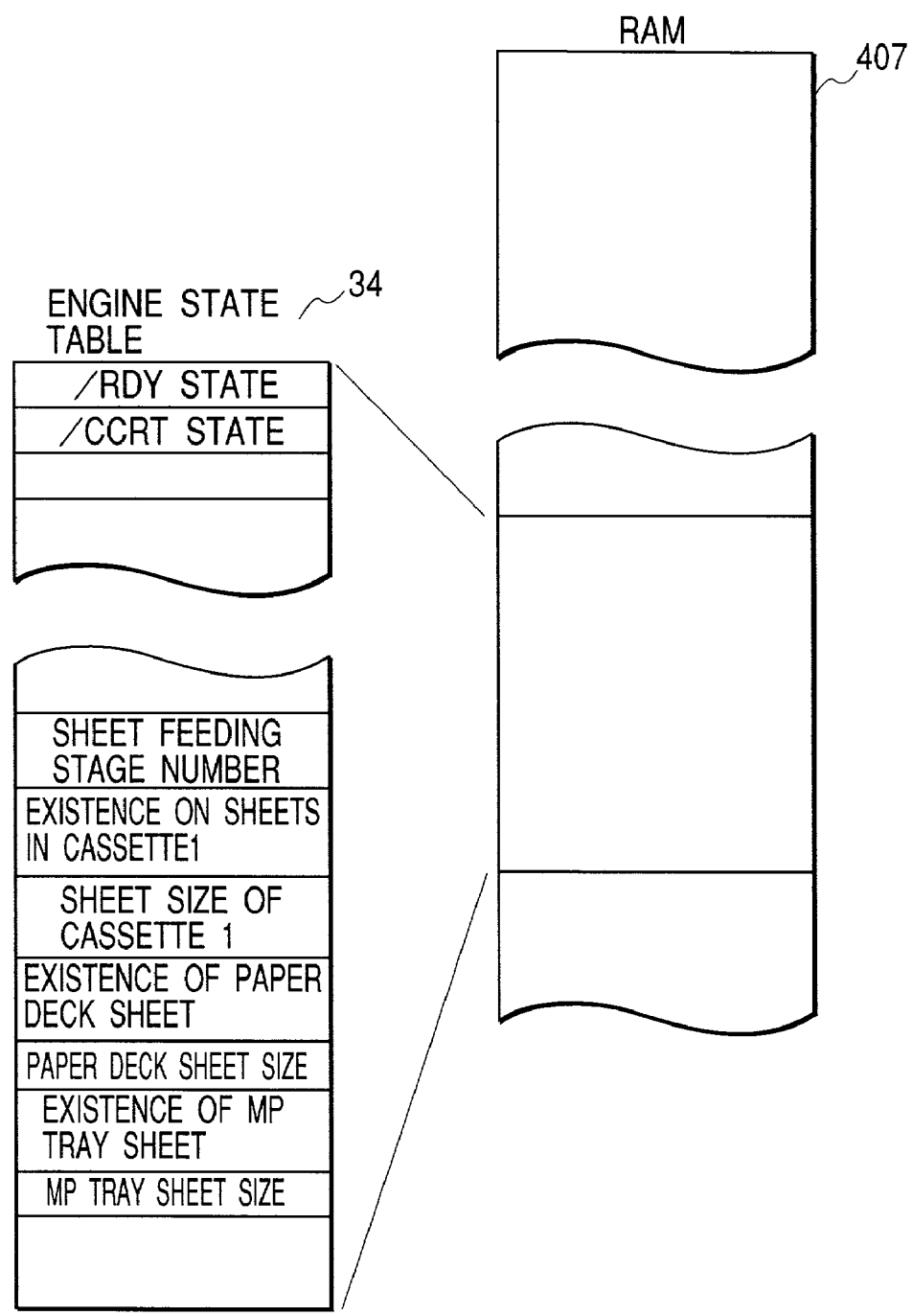
FIG. 21 is a memory map showing the map relating to the engine status table in the RAM shown in FIG. 14 according to the first embodiment of the present invention.

FIG. 21 shows a structure of the engine status table 34 in the RAM 407 in FIG. 14. The engine status table 34 is the status of the engine controller 105 taken under control of the video controller 103, and is not the same as the status of the actual engine controller 105, but reflects the status of the engine controller 105 and is renewed by a predetermined communication at any timing.

For example, "/RDY status" is a flag reflecting the status of the /RDY signals, and the engine I/F task (reference should be made to FIG. 18) comes up with "TRUE" while it is detecting "FALSE" of the /RDY signals.

In addition, "/CCRT state" is a flag reflecting the state of the /CCRT signal and the engine I/F task reflects the state of the actual /CCRT signals. The engine I/F task detects "TRUE" of the /CCRT signals, and by acquiring the state of the engine controller 105 with a predetermined serial communication so that the /CCRT signal will become "FALSE" as described above.

"Sheet feeding stage number" reflects mount of the option cassette unit or the like and is selectable sheet feeding stage number.

"Existence of sheets in the cassette 1" is existence or lack of sheets in a cassette 230. "Cassette 1 sheet size" is a sheet size set with a (not shown) dial of the cassette 230, and with a precondition that the operator has mounted the same sheets as in the dial value, is recognized as the sheet size of the cassette 230.

"Existence of paper deck sheets" is existence or lack of sheets in the cassette (paper deck option unit) 107. "Paper deck sheet size" is a sheet size set by a (not shown) partition plate of the sheet feeding option cassette 107, and with a precondition that the operator has mounted the same sheets as in the value of the partition plate, is recognized as the sheet size of the sheet feeding option cassette 107.

The data flow in FIG. 18 will be described as follows. As an input method of the printing data there are a case from the data processor 101 and a case from the memory card 110, and in case of printing from the data processor 101, the inputted print data (control codes and PDL or the like) are stored on a predetermined block-by-block bases in the host interface part 402, and in case of printing from the memory card 110, the data readout part 413 reads out the Image forming instruction file 12 and the image data, etc. inside the memory card so that the same printing data (control codes and PDL or the like) as the printing data formed in the data processor 101 are generated in the job generation unit inside the ROM 404 and will be stored on a predetermined block-by-block bases.

The analysis extension task detects data in the host I/F part 402 or the job generation unit to acquire the page table 31. In addition, the data are analyzed on a the above described block-by-block bases, and the image forming information (a figure drawing order of the PDL and a character code or the like) undergoes image extension with the image data generating part 403 in FIG. 14 (which are not shown in FIG. 18) or the CPU 409 itself and is stored in the region indicated by "raster pointer" in the page table 31. In addition, the control information (number of copies and selection on feeding sheet or the like) for the printer is stored in the page table 31. After analysis and extension on the data covering one page is completed, the "extension completed" is made TRUE and the page cue 35 of the FIFO structure is enqueued.

The page operation task simultaneously supervises "status flag" of the all pages in the above described page cue 35, and changes conveying procedures corresponding with status to realize printing. At this time, printing designation on sheet feeding means, sheet discharging means and printing mode or the like are executed with the option I/F part 412, and setting such as sheet feeding means, etc. is actually executed toward the engine controller 105 with the engine I/F part 406. The page table the "sheet discharge completion flag" having become TRUE is dequeued from the page cue and is returned to the above described page control function part.

The engine I/F task as well as the option I/F task respectively communicates with the engine controller 105 as well as the option controller 106 via the engine I/F part 406 and the option I/F part 412 at a predetermined cycle and renews the above described "status flag" when a factor to change the page status. In addition, it supervises changes in /RDY signals and, for the change of TRUE to FALSE, indicates that an error is taking place and supervises cancellation of the error. In addition, it supervises status changes such as /RDY signals as well as /CCRT signals, etc., and executes the above described "Procedure 1" and "Procedure 2" having been described with FIG. 12 and renews the above described "engine status table".

The operation mode designation (number of copies and selection on feeding sheet or the like) from the panel part 104 is temporarily stored in the panel I/F part 401. The (not shown) printer control task executes rounds of supervision on the panel I/F part 401 in an appropriate interval and stores data that might exist into the EEPROM 410, and at the same time stores them in the (not shown) control information storage region of the RAM 407 as the control information. Storage into the EEPROM 410 will enable the printer to operate with a mode desired by a user even after the power of the print is once switched OFF.

Figure 24:
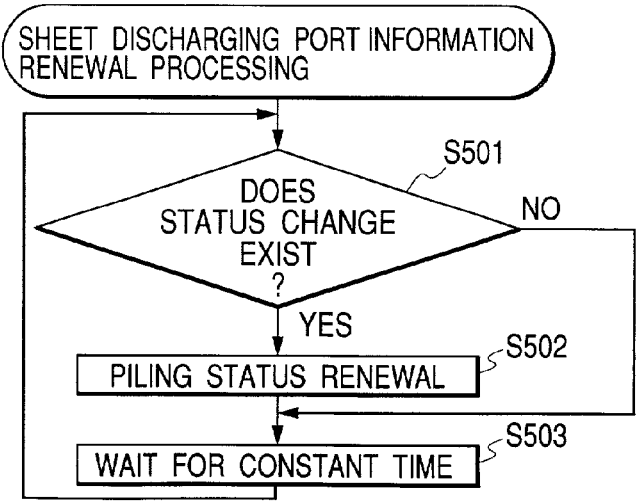
FIG. 24 is a flowchart of the procedure of updating information about each paper discharge tray according to the first embodiment of the present invention.
Figure 25:
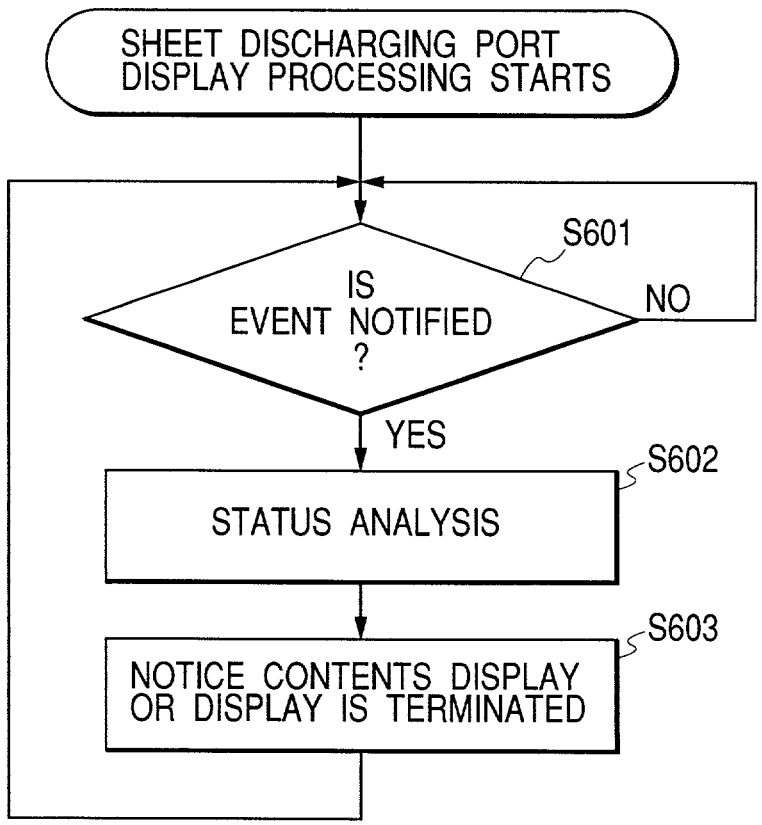
FIG. 25 is a flowchart of the procedure of the state displaying process of each paper discharge tray according to the first embodiment of the present invention.

A flow chart in FIG. 22 shows processing up to reception of the printing data and completion of printing. A flow chart in FIG. 23 shows paper discharge tray searching processing at the time of user separate fixing mode. A flow chart in FIG. 24 shows notifying processing to the data processor at the time when the job comes to an end. A flow chart in FIG. 25 shows an information renewing processing of respective paper discharge trays. With reference to these FIGS. 22 to 25, processing procedures which the printer in the present embodiment will be described.

At first the printing data transmitted from the data processor 101 are analyzed in S301 in FIG. 22 so that the control information as well as the drawing information is extended and stored into the memory in S302.

In the next S303, it is judged whether or not the sheet discharge mode is automatic designation from the control information, and in the case that it is not automatic designation, the fixedly designated paper discharge tray is selected based on the control information (S312) to judge existence or lack of abnormality (S314), and if no abnormality exists, printing is executed (S315).

In case of automatic designation, what in a plurality of automatic modes has been designated is judged in S304, S306, S308 and S310 so that any searching processings among user separate automation (S305), user separate fixing mode (S307), sorting (S309), stack (S311) and unjust designation processing (S313) is executed according to the determined designation. Also in this case, as at the time of fixed designation, existence or lack of abnormality is judged (S314), and if no abnormality exists, printing is executed (S315).

After printing is executed in S315, subject to sheet discharge of the printed sheet in S316, sheet discharge comes to an end or the finalization of the job is notified to the data processor 101.

On the other hand, in S314, in the case where abnormality such as full stack or the like has been detected, an error display corresponding with the contents of the abnormality is executed (S317), and subject to cancellation of the abnormality by an operation of the user (S318), the error display is cancelled (S319), the processing from S303 is reexecuted so that the step goes forward to a recovery processings.

Subject to repetition of the above described processing, entire sheet discharge of the printing job comes to an end, and then the finalization notifying event of the printing job is transmitted to respective data processors 101, and the user is notified of to which paper discharge tray the sheet has been outputted on a user interface of the respective data processors (S316).

Next, in FIG. 23, the user separate fixing mode processing of S307 in FIG. 22 will be described in detail. Incidentally, S305, S309, S311, S312 and S313 in FIG. 22 and the searching processing of S404 in FIG. 23 do not directly relate to the present invention, and therefore the detailed description thereof will be omitted in the present embodiment.

When searching processing of the user separate fixing mode starts, at first in S401, paper discharge tray name designated in the printing data is taken out so that it is judged whether or not there exists the same paper discharge tray name by comparison with the sheet discharging port name registered in each paper discharge tray (S402). In S402, if there exists the same paper discharge tray name, the paper discharge tray registered under that name is determined as the paper discharge tray of the designated printing data (S403).

In S402, if there does not exist the same paper discharge tray name, a processing such as the paper discharge tray for escape is determined as the paper discharge tray for the designated printing data as the searching processing at the time of unjust designation will be executed (S404).

After the searching processing of the paper discharge tray name taken out in S401 has come to an end, it is judged whether or not there exists other paper discharge tray names designated in the printing data (S405), and if not, the searching processing of the mail box sheet discharge comes to an end, and if there is any, processings of S401 to S405 are repeated.

Next, with reference to FIG. 24, processing to execute information renewal of the sheet discharge bin will be described. The status renewal of the sheet discharge bins 251 to 257 is executed by acquiring status information that changes status in a constant cycle interval.

At first, in S501, it is judged whether or not the load capacity in the sheet discharging bin has changed, and if there is any change, the loading status is renewed (S502). In addition, subject to waiting for a constant time (S503), the processing from S501 is repeated.

Next, with reference to FIG. 25, processing to display information indicating status of the paper discharge tray of the printer will be described. In the case where the status of the printer has changed, the event is received in S601 and the contents of that event are analyzed (S602). Corresponding with those contents, as a result of that analysis, a predetermined display or cancellation on display is executed so that the status change on the printer is notified to the user (S603).

Executing the above described processing, in the case where, for example, the user would like to confirm the loading state in the paper discharge tray, the loading state information of each paper discharge tray is displayed in the panel of the printer, etc.

Figure 26:
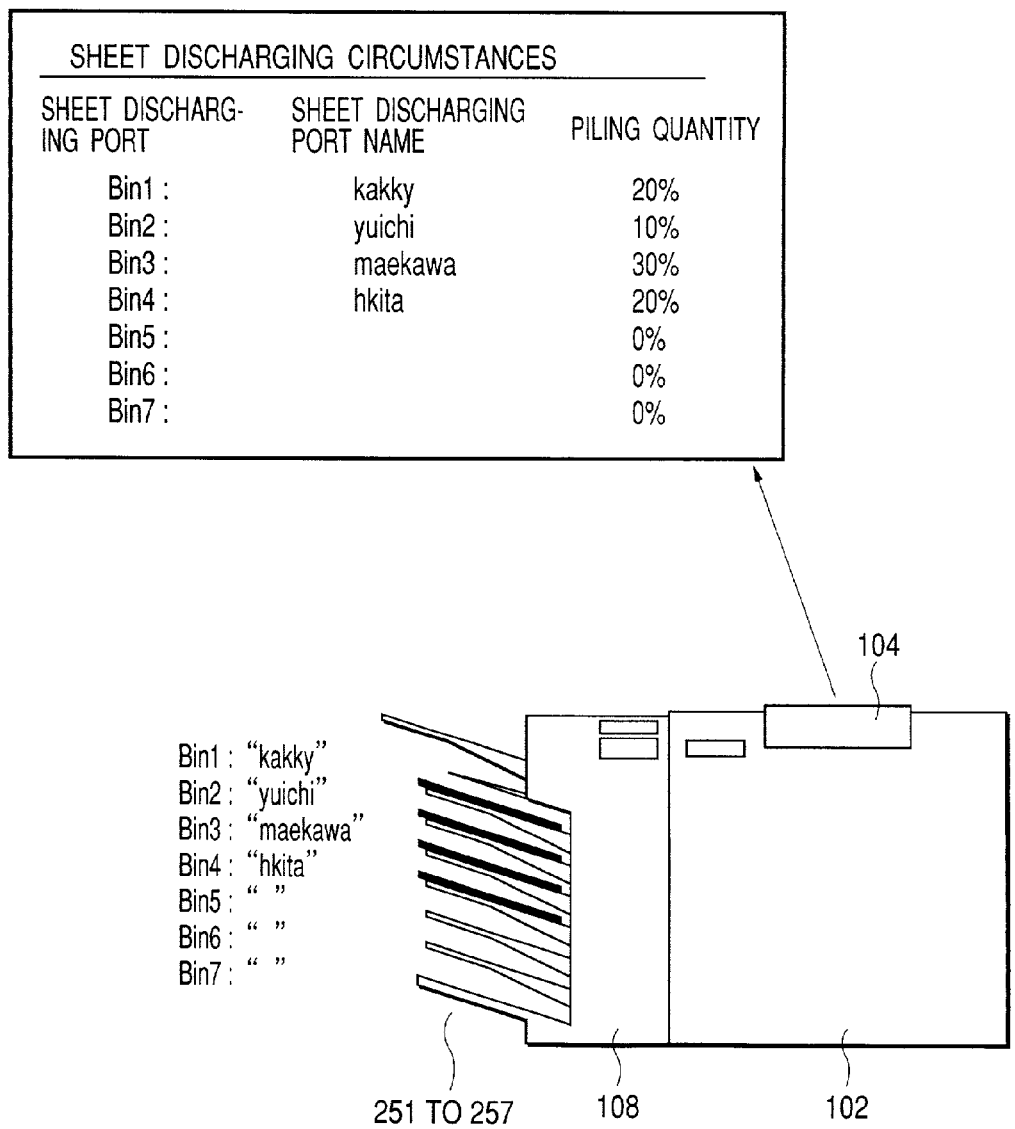
FIG. 26 shows the concept of displaying the delivery state (loading information) at each paper discharge tray by the panel unit of the image recording device according to the first embodiment of the present invention.

That is, as shown in FIG. 26, information such as the paper discharge tray name registered in each paper discharge tray or the loading rate or the like is displayed so as to be recognizable at one sight and the information such as the use status of each paper discharge tray or the like is notified to the user.

Figure 27:
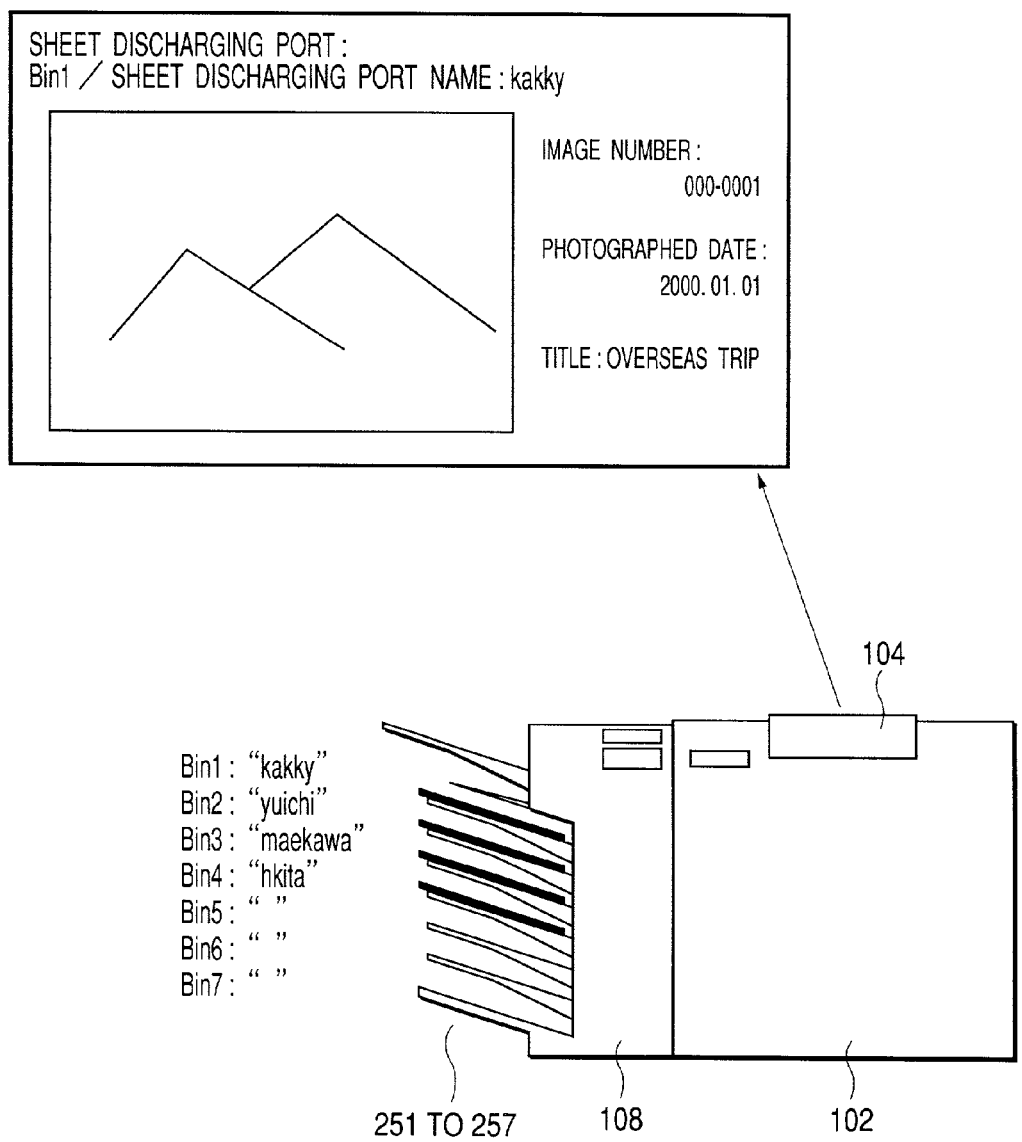
FIG. 27 shows the concept of displaying in detail an image loaded at a specific paper discharge tray by the panel unit of the image recording device according to the first embodiment of the present invention.

In addition, as shown in FIG. 27, for a specific paper discharge tray or a specific image of that paper discharge tray, information such as the paper discharge tray name, the image number, the photographed date and the title, etc. may be displayed, and these pieces of information may be displayed in the panel of the printing apparatus, the digital camera, the display of the computer or the like, and other display apparatuses. Moreover, if the memory card is accessable, respective images themselves may be displayed.

FIG. 28 shows an example of index printing of images respectively sheet-discharged to respective paper discharge trays in the case where printing processing has been executed under the user separate fixing mode in one embodiment of the present invention. The index print 36 sheet-discharged into respective paper discharge trays 251 to 257 having loading is the one that the output image having undergone sheet discharge to that sheet discharging port has arranged to be ready for a glance, and may be the one to automatically output on a job-by-job bases according to setting of the user or the system, or may be the one to output only the index print in the case where the user has clearly instructed. The output instruction of the index print may be executed by operations of buttons from the digital camera 1 or may be executed by operations of the panel of the image recording device 102. In addition, it may be instructed from outside equipment such as a host computer, etc.

FIG. 28 shows an example of the index print of an image having been sheet-discharged to "Bin1" with a paper discharge tray name of "kakky". The output image sheet-discharged to this paper discharge tray 251 is an image undergoing sheet discharging destination designation under distinguishing name of "kakky". In addition, the user information being the owner of the memory card 110 in which the source data for these images have been stored is displayed as a print result of "user information=Shimomaruko Taroh (TEL: 03-3757-????), the date and time when these images have been outputted as a print result of "printed date and time=2000/05/ 15:51" and the number of images sheet-discharged to this paper discharge tray 251 as a print result of "print number=41 sheets". Moreover, the respective images sheet-discharged to this paper discharge tray 251 have been print-outputted as a list together with the image serial number and output copy number in form of a down-sized image. It goes without saying that information other than that described above may be print-outputted as the contents to be print-outputted to the index print.

As described above, with output of the index print 36, the user can easily know output images classified to respective paper discharge trays under which distinguishing names have undergone sheet discharge of how many sheets of copies respectively and how many sheets in total. In addition, for example, the printing image is distributed to a user at the distribution destination together with the index print 36 so that the user at the side where receipt has taken place can know at a glance that he/she has received what images and how many of them.

FIG. 29 exemplifies print output of information of loading job of all paper discharge trays. In FIG. 29, output images display loading job information on all the paper discharge trays 251 to 257 in form of a list, and other than common information such as "sheet discharging mode", "total number of sheet discharge", "output date and time" or the like the information such as paper discharge tray name registered in a paper discharge tray and "number of sheets of sheet discharge" sheet-discharged to the paper discharge tray or the like is printed for each paper discharge tray. This entire paper discharge tray loading job information print 37 may be the one to automatically output on a job-by-job bases according to setting of the system, or may be the one to output only entire stack job information when the user has clearly instructed. When the output of the entire paper discharge tray loading job information print 37 is instructed, the operation may be operation of a button from the digital camera 1 or may be operation of the panel of the image recording device 102 or the like. In addition, outside apparatus such as a host computer or the like may make instructions. The output destination may be a paper discharge tray for escaping, a set predetermined paper discharge tray or may be a paper discharge tray to instruct the user at the time of outputting.

As described above, the entire paper discharge tray job information is made to be available for outputting, the user can easily know which distinguishing names have been registered for respective sheet discharging ports 251 to 257 of the image recording device for the sheet-discharged job.

FIG. 30 exemplifies print outputs of information of a loading job of a specific paper discharge tray. In FIG. 30, an output image displays loading job information of a specific paper discharge tray in form of a list, and other than information on the paper discharge tray such as "paper discharge tray", "paper discharge tray name", "sheet discharging mode", "number of load copies" of the paper discharge tray, "output date and time" or the like, image attached information such as "image serial number", "photographed date", "title" and "number of copies" is printed for loaded individual image. This paper discharge tray loading job information print 38 may be the one to automatically output on a job-by-job bases according to setting of the user or the system, or may be the one to output only specific job information in the case where the user has clearly instructed. The output instruction of paper discharge tray loading job information print 38 may be executed by operations of buttons from the digital camera 1 or may be executed by operations of the panel of the image recording device 102. In addition, it may be instructed from outside equipment such as a host computer, etc. Whether or not to which paper discharge tray output should be made may be up to selection of the user. The output destination may be the one to sheet-discharge respectively to paper discharge trays being the objects of the print contents, or may be the paper discharge tray the user instructs.

As described above, the paper discharge tray loading job information is outputted so that the user can easily know detailed information concerning the output image of that paper discharge tray at need.

(Second Embodiment)

In the above described first Embodiment of the present invention, the memory card 110 was arranged to execute printing by being mounted onto the image recording device 102, but the digital camera 1 and the image recording device 102 may be brought into communication connection with RS-232C, Centronics, Ethernet, SCSI, USB and interface cable stipulated by IEEE 1394 or by an interface realizing various data transfer method such as IRDA and Blue Tooth, etc. so that printing is executed by printing indication from the display part of the panel part 104 or the digital camera 1 of the image recording device 102. Here, the memory media of the digital camera 1 may be a compact flash, a smart media and a detachably attachable flash memory such as a memory stick or the like, or be the one fixedly built-in in the digital camera.

The second Embodiment in the present invention will be described for only portions that are different from those in the first Embodiment of the present invention with reference to FIG. 31 to FIG. 36.

Figure 31:
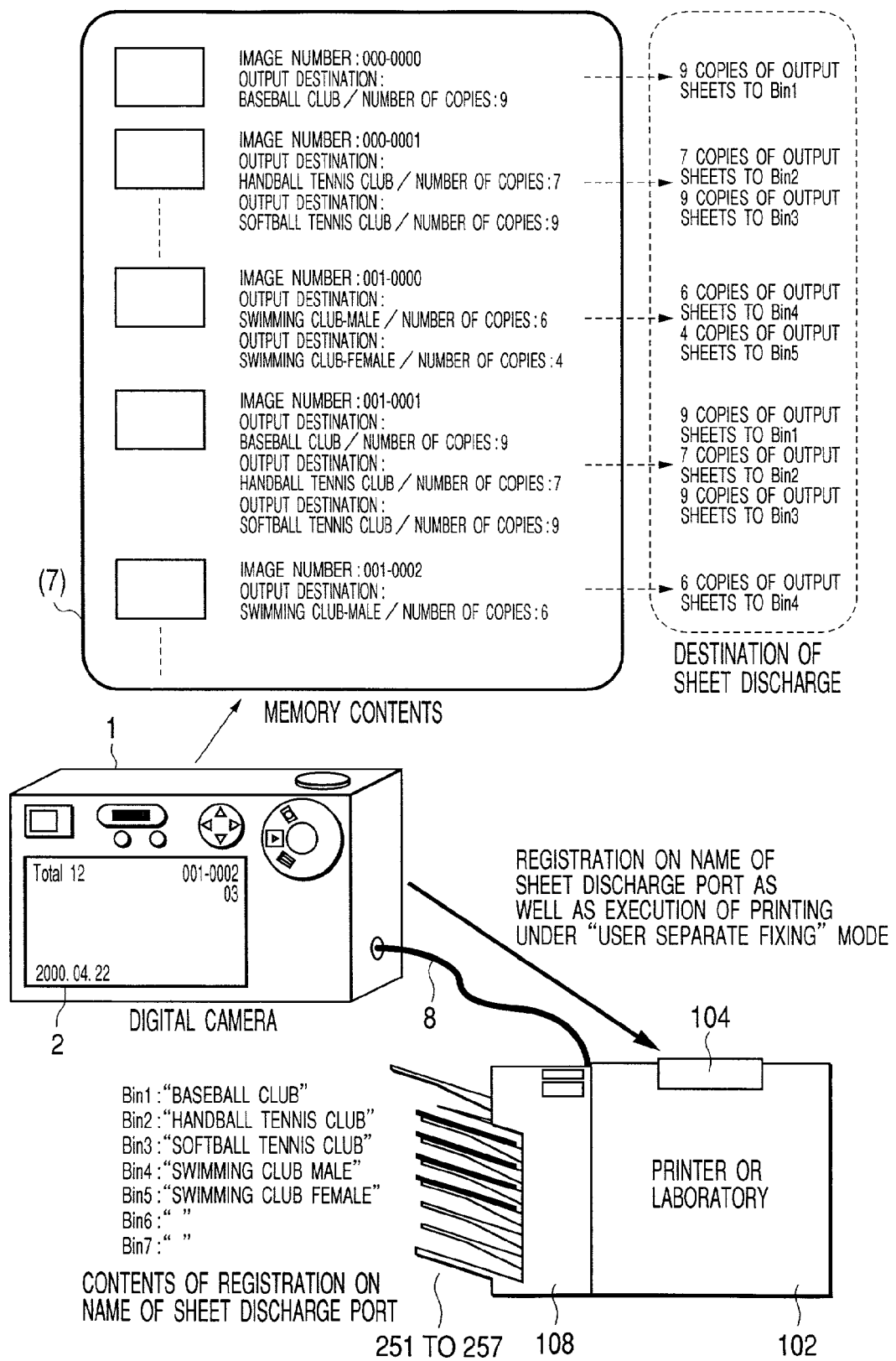
FIG. 31 shows the operation system of printing out an image read by a digital camera in the user separate fixing mode, and shows the concept of an example of designating the identification name of the destination of each image by a digital camera, and classifying an output image for each identification name based on the contents of the memory card storing the information according to a second embodiment of the present invention.

FIG. 31 shows a concept on an example of an operation system to print and output images read out with the digital camera 1 by way of "user separate fixing mode". In particular, FIG. 31 depicts an example where the digital camera 1 has in advance designated the output destination on an image-by-image bases under distinguishing name, the output images are classified for distinguishing names according to contents of the storage media in which those designated pieces of information are stored.

The storage media 7 inside the digital camera 1 stores attached information related to respective images other than image data of shot images. For these pieces of information, as information to be automatically stored, there are image number, photographed date, and formatting format of an image file, etc., and as information to be inputted by a user after shooting, there are title, trimming information, rotation information, and number of print sheet etc. Otherwise, names of people who need distribution as distribution users so that a same image is delivered to a plurality of person as in the case of printing as well as names of their offices may be inputted there.

Moreover, into the storage medium 7, not only the above described image attached information but also information on printing indication may be stored. For printing indication information, there are graphic mode, color mode, sheet discharging mode, number of sheet printing, etc. to become information of outputting printer and control information at the time of printing and respective detailed setting information, etc. shall be included.

According to an example in FIG. 31, the printing processing that is instructed for execution from the digital camera 1 will be described.

In FIG. 31, "user separate fixing" as sheet discharging mode, any distinguishing name for each image as output destination, and any necessary copy number value for each image as number of copies is stored in the storage medium 7 inside the digital camera 1 with input operations from a user. In receipt of printing indication from a user, the image recording device 102 receives image related information of the storage medium 7 inside the digital camera 1 via a predetermined communication medium 8, and reads in the image related information that the job generation unit has received to start preparation of the job based on the "user separate fixing" mode designated as sheet discharging mode.

In the case where the print job by way of "user separate fixing" mode is generated, the distinguishing name designated as output destination will become judgment clue to execute classification processing for each image. For the example in FIG. 31, "baseball club", "hardball tennis club", "softball tennis club", "swimming club male", and "swimming club female", etc. being "output destination" for each image is used as distinguishing name for classification processing. Here, images may be set for operations without any "output destination" being designated.

In the processing for generating print jobs, with "user separate fixing" mode being designated, the distinguishing name having been designated as "output destination" for each image is treated as the sheet discharging destination and the value designated as "number of copies" is added to the printing indication information for each image.

When preparation of a print job is completed, the job generation unit delivers that print job to the data analysis portion. The image recording device 102 analyzes contents of the print job based on the generated print job to execute predetermined print processing according to those contents. In the case of the print job as in the example of FIG. 31, as the page information on the number covering the value designated as the number of copies is copied, sheet discharge destination for each image will be determined so that the outputs are classified into the paper discharge trays 251 to 257 registered under the same name as the distinguishing name designated as the sheet discharge destination.

Here, respective paper discharge trays 251 to 257 of the image recording device 102 shall be registered by distinguishing names in advance, and that registration may be inputted by way of panel operation the user from the panel part 104 of the image recording device 102 or registration of paper discharge tray name may be made so that the digital camera 1 accesses to the image recording device 102 via a predetermined communication media 8.

As for images for which feeding-discharging destinations have been determined, predetermined print processing is executed sequentially, and as in the example of FIG. 31, sheets for designated number of copies of each image covering the output results of images with sheet discharging destination being designated under distinguishing name of "baseball club" are sheet-discharged into the paper discharge tray "Bin1" with reference numeral 251, sheets for designated number of copies of each image covering the output results of images with sheet discharging destination being designated under distinguishing name of "hardball tennis club" are sheet-discharged into the paper discharge tray "Bin2" with reference numeral 252, sheets for designated number of copies of each image covering the output results of images with sheet discharging destination being designated under distinguishing name of "softball tennis club" are sheet-discharged into the paper discharge tray "Bin3" with reference numeral 253, sheets for designated number of copies of each image covering the output results of images with sheet discharging destination being designated under distinguishing name of "swimming club male" are sheet-discharged into the paper discharge tray "Bin4" with reference numeral 254, and sheets for designated number of copies of each image covering the output results of images with sheet discharging destination being designated under distinguishing name of "swimming club female" are sheet-discharged into the paper discharge tray "Bin5" with reference numeral 255.

Thus, the print processing is executed under "user separate fixing" mode so that without taking the position of the sheet discharging destination into consideration, the user can designate the sheet discharging destination under names and can designate necessary copies for each image. In addition, those designations are made to be stored into the storage medium 7 inside the digital camera 1 as the image related information in advance so that only necessary number of necessary images can be outputted with print instruction at a time.

So far, a concept on an operation system to print and output images read out with the digital camera 1 by way of user separate fixing mode has been described.

Next, for print setting processing as well as printing execution indication processing in the present embodiment, an example of user interface as well as the processing procedures will be described.

The print setting processing as well as printing execution indication processing may be executed from the display part of the panel part 104 of the image recording device 102 as in the first Embodiment of the present invention, or may be executed while communicating with the image recording device 102 from the display part 2 of the digital camera 1. However, here the case where the processing starts from the display part 2 of the digital camera 1 will be described.

At first, with reference to FIGS. 32A and 32B, print setting processing in the digital camera 1 will be described. FIGS. 32A and 32B are examples of user interface screen to describe procedure for a user to execute print setting with the digital camera 1.

FIG. 32A is an example of an user interface screen of the display part 2 displayed in the case where "print setting" is selected from the operation menu of the digital camera 1 in order to execute print settings. In the above described drawing, the print setting contents include items such as "sheet discharging mode" to set how to classify the output images, "media" to set media such as ordinary paper, paper for special purpose, thick paper and OHP, etc., "graphic mode" to set drawing method or drawing quality of the output image, "print system" to set which print system to take in the case there are a plurality of print systems (LBP (laser beam print) system and ink jet system, etc.) in the image recording device of the output destination, and "number of copies" or the like to set number of copies to be duplicated for the entire job for printing. The user matches the cursor indicated by "*" onto the item to be set among respective items with operation buttons or the like so as to execute selection with "determining" operation. For example, in the case where setting of sheet discharging mode is executed, in this screen the cursor "*" is matched to "sheet discharging mode" so as to realize by executing "determining" operation.

FIG. 32B is an example of user interface screen to be displayed when "sheet discharging mode" is selected in FIG. 32A in order to set the sheet discharging mode. In the above described drawing, setting contents for the sheet discharging mode include items such as "user separate automatic", "user separate fixed", "sort" and "stack", etc. for each possible sheet discharging mode in the image recording device 102 which is brought into communication connection. The user matches the cursor indicated by "*" onto the item to be set among respective items as the sheet discharging mode with operation buttons or the like so as to execute selection with "determining" operation. In the case where the sheet discharging mode is set to the user separate automatic mode, in this screen the cursor "*" is matched to "user separate fixing" so as to realize by executing "determining" operation.

Figure 33A:
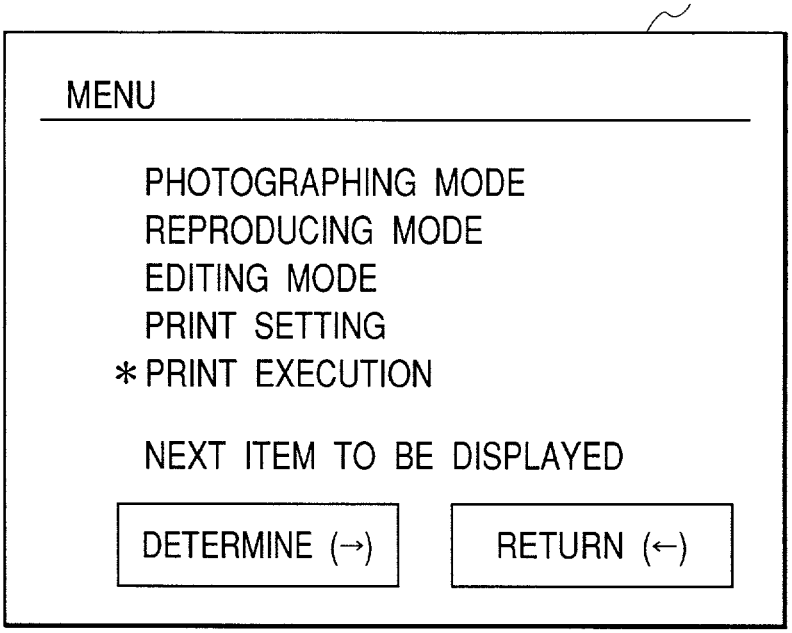
FIGS. 33A and 33B are plan views showing an example of the UI screen on which the user issues an instruction to perform the printing process using the digital camera according to the second embodiment of the present invention.
Figure 33B:
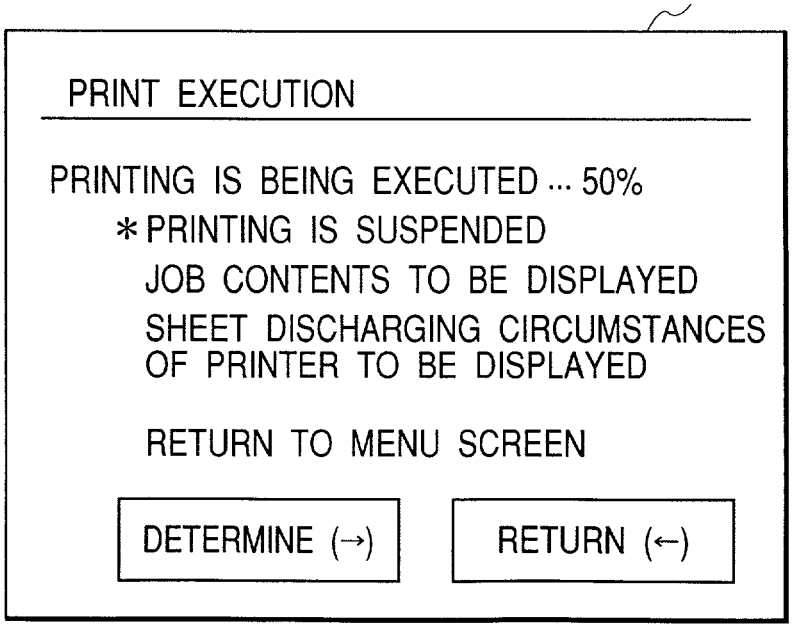
Figure 34:
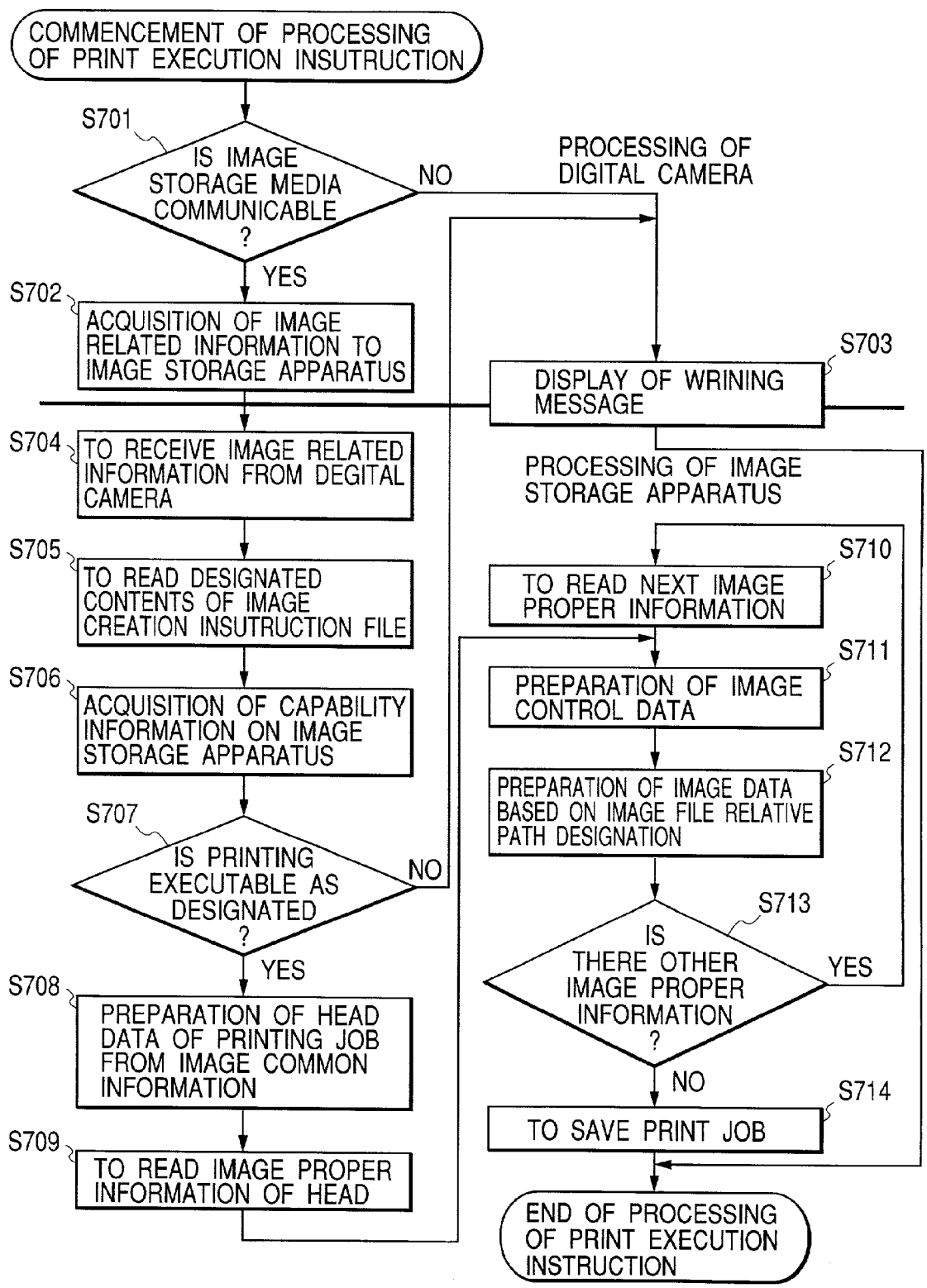
FIG. 34 is a flowchart of the procedure of the print execution instructing process in the data process unit of a digital camera and an image recording device according to the second embodiment of the present invention.

Next, with reference to FIGS. 33A and 33B and FIG. 34, printing execution indication processing in the digital camera 1 as well as the image recording device 102 will be described. FIGS. 33A and 33B show examples of user interface screen to describe procedure for a user to execute printing execution indication from the digital camera 1 while the flow chart in FIG. 34 shows the printing execution indication procedure in the data processing part as well as the image recording device 102 of the digital camera 1.

At first, in FIGS. 33A and 33B, FIG. 33A is an example of a user interface screen of the display part 2 having displayed the operation menu of the digital camera 1. In the above described drawing, the menu items include "photographing mode" to photograph images, "reproducing mode" to display the photographed image in the LCD (liquid crystal display: display part) 2 of the digital camera 1, "editing mode" to edit the photographed images, "print setting" to set on printing having described in FIG. 32, and "print execution" to execute printing execution indication of the photographed image based on the contents of this "print setting" or the like. The user matches the cursor indicated by "*" onto the item to be set among respective items with operation buttons or the like so as to execute selection with "determining" operation. For example, in the case where instruction of print execution is executed, in this screen the cursor "*" is matched to "print execution" so as to realize by executing "determining" operation.

FIG. 33B is an example of user interface screen of the display part 2 to be displayed when "print execution" is selected in FIG. 33A in order to execute the printing execution indication. In the above described drawing, when processing for printing execution indication is executed, it is indicated together with ongoing status of print processing that printing processing is going on such as for example, "printing is being executed . . . 50%", and in addition, selection items such as "printing is suspended" in order to suspend printing, "job contents to be displayed" in order to display contents of the printing job with access to the image recording device 102, "delivery status of printer to be displayed" in order to display delivery status of the image recording device 102, and "return to menu screen" in order to return to the menu screen in FIG. 33A or the like are displayed.

With the printing execution indication from the digital camera 1, when the image related data are transmitted from the digital camera 1 to the image recording device 102, the image recording device 102 may be a system that automatically judges that data in receipt is image related data, and may be a system that the image recording device 102 has been set so as to receive the image related data for the digital camera 1 to execute thereafter data transmission by the printing execution indication.

The flow chart in FIG. 34 relates to FIGS. 33A and 33B and shows the processing procedure in the case where the printing execution indication from the digital camera 1 by the user is executed. The flow chart in FIG. 34 includes the processing of the digital camera 1 and the processing of the image recording device 102 and for the data communication between S702 and S704, actually transmission and reception shall be executed in a non-synchronized fashion.

In FIG. 34, when the user instructs printing execution, the digital camera 1 proceeds with negotiation with the image recording device 102 and checks whether or not they are ready for communication (S701). In S701, if it is judged that communication with the image recording device 102 is impossible, the warning message such as "Communication with the printer is impossible. Please check the communication cable." or the like is displayed so as to notify the user of the fact that communication connection with the image recording device 102 is missing (S703) so that the printing execution indication processing comes to an end. In S701, if communication with the image recording device 104 is possible, the image related information stored in the storage medium 7 inside the digital camera 1 is transmitted to the image recording device 102 (S702).

On the other hand, the image recording device 102 receives the image related information transmitted from the digital camera 1 to store in a predetermined storage part (S704). In S704, when reception of data is completed, in S705 the Image forming instruction file 12 is detected from the image related information stored in that storage part and the contents thereof are read in, and the image data, the image attached data and the print setting data or the like are referred to. In addition, ability information (number of paper discharge trays, number of sheet feeding ports, feeding paper size, and types, etc.) of the image recording device 102 is also acquired (S706) and with comparison between those pieces of the acquired ability information and the contents referred to in S705 it is judged whether or not printing as designated can be executed (S707).

In S707, if print execution is impossible, the warning message such as "Cannot proceed with user separate fixing sheet discharge." is displayed so as to display reflecting the contents and notify the user that printing as designated is not executable (S703) with the printing execution indication processing coming to an end. Display of the warning message is executed to the display part 2 of the digital camera 1 but may be executed to the display part of the image recording device 102.

In S707, if printing is executable, the processing goes forward to S708 and onwards. In S708, taking the print setting data into consideration, based on the image common information 12-1 described in the Image forming instruction file 12 read-in in S705, header data for the print image are added so that the print job is generated. Moreover, respective image inherent information 12-2 described in the Image forming instruction file 12 will be read in and after, at first, in S709 the leading image inherent information is read in, based on the image inherent information in midst of reference, the processing in S711 to prepare the control data of that image based on the image inherent information in midst of reference as well as the processing of S712 to prepare the image data part of the print job from the image file stored in a position indicated by the relative path of the image file and to finalize the processing to the image inherent information in midst of reference, and in S713 if there is another image inherent information 12-2, the next image inherent information 12-2 will be read in sequentially (S710) so that the print job will be generated by repeating the processing in S711 and S712.

Here, the images to be referred to are images that the print setting data have instructed printing or images the output destination of which is designated in the image inherent information 12-2, and images lacking those designations shall be excluded in advance. At the time of preparation of the image control data in S711, if there are any output destination and number of copies, etc. clearly designated by the user at the time of printing execution indication, those pieces of information are reflected to the image control data. If there is not any other image inherent information to be read-in in S713, the generated print job is saved (S714) and the printing execution indication processing comes to an end.

Figure 35:
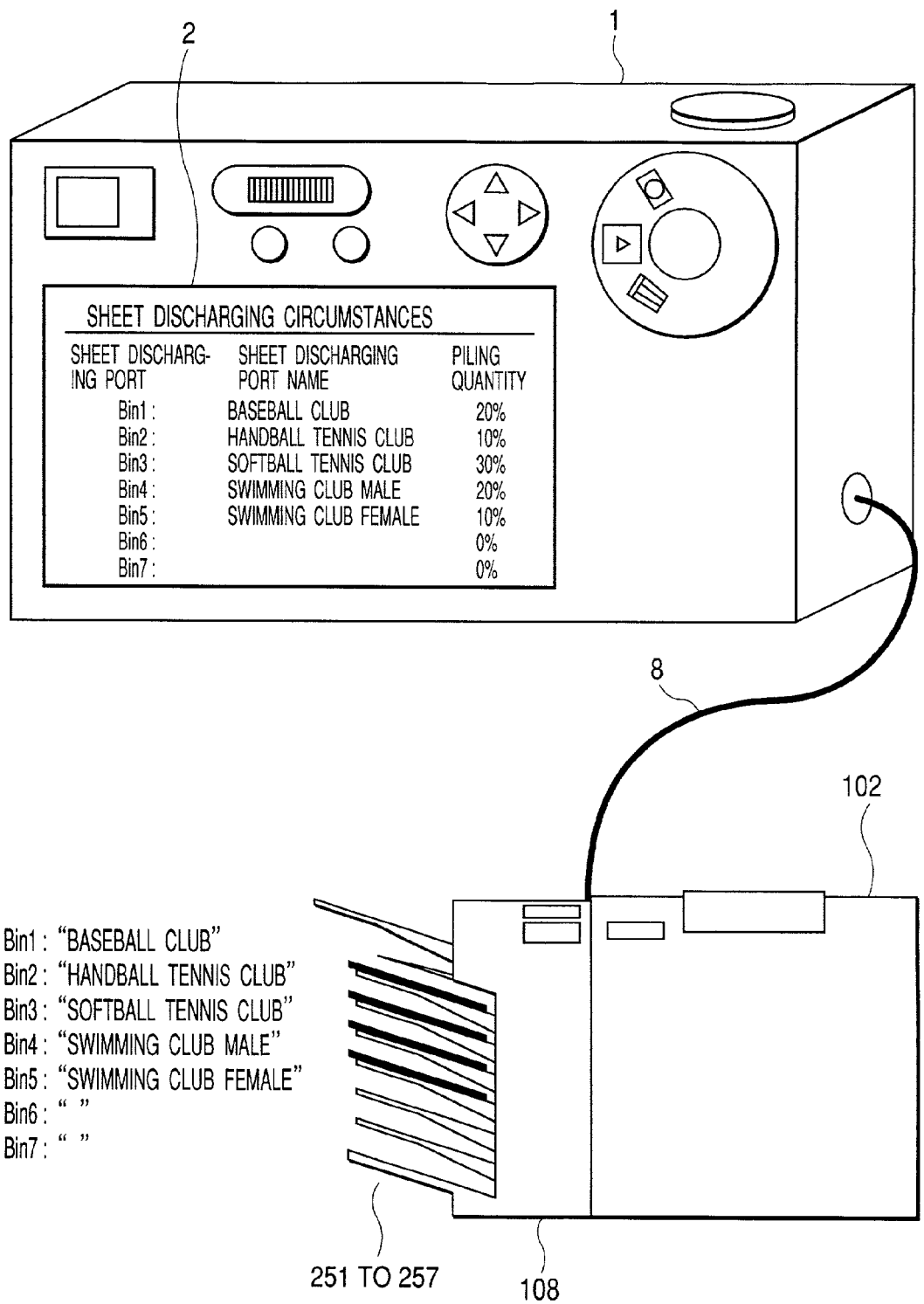
FIG. 35 shows the concept of the digital camera showing a delivery status (loading information) of each paper discharge tray of the image recording device to which the camera is attached according to the second embodiment of the present invention.

FIG. 35 depicts a status that the digital camera 1 displays the delivery status (loading information) of respective paper discharge trays 251 to 257 of the image recording device 102 of the connection destination. In the above described drawing, the digital camera 1 displays, in its display part 2, information on delivery status of respective paper discharge trays 215 to 257 from the image recording device 102 being the connecting destination. The display contents thereof are information, for example, the paper discharge tray name registered in a paper discharge tray and load capacity, etc. on each of the paper discharge trays 251 to 257, and displays in a list the delivery status for all the paper discharge trays. With this display, the user can know easily to which discharging port the respective output images are sheet-discharged.

FIG. 35 was to display all the paper discharge trays, but as will be described next, the digital camera 1 can further display detailed information on the output images page discharged to the respective paper discharge trays 251 to 257.

Figure 36:
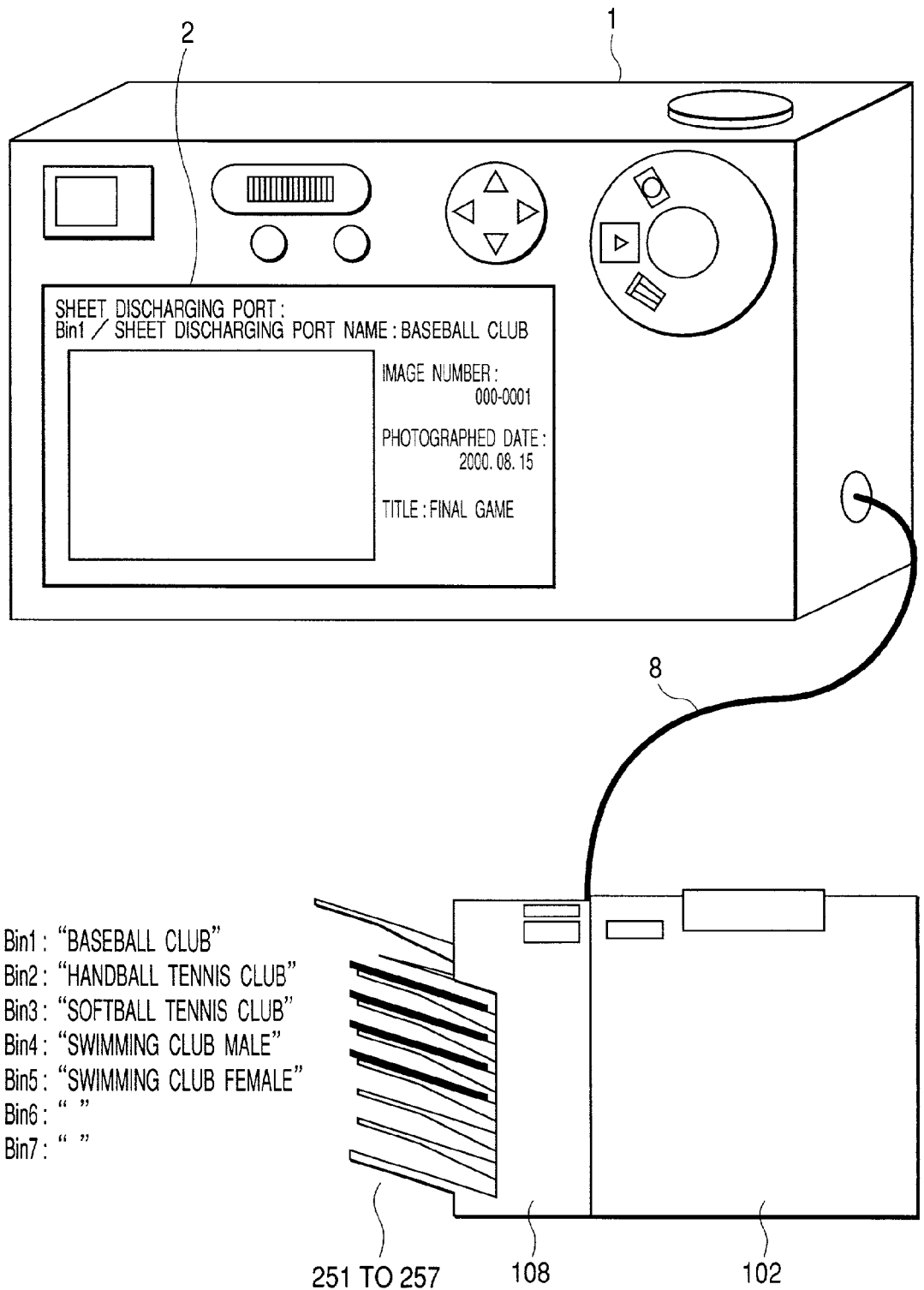
FIG. 36 shows the concept of the digital camera displaying in detail an image loaded at a specific paper discharge tray of the image recording device to which the camera is attached according to the second embodiment of the present invention.

FIG. 36 depicts that the digital camera 1 displays detailed information of the images loaded on a specific paper discharge tray of the image recording device 102 of the connection destination. In the above described drawing, the digital camera 1 displays detailed information of the images outputted to a specific paper discharge tray of the image recording device 102 of the connection destination, for example, "Bin1". This display can be executed by the user to operate "*" cursor displayed in the head of the "paper discharge tray" of FIG. 35 and to select the paper discharge tray that he/she is going to refer to. The display contents are the paper discharge tray name of "Bin1", the image outputted to that paper discharge tray, that image number, the photographed date of that image, and the title of that image, etc. The user can refer to the outputted images to that paper discharge tray 251 sequentially by operation of buttons or the like.

(Variation of First Embodiment)

Figure 37:
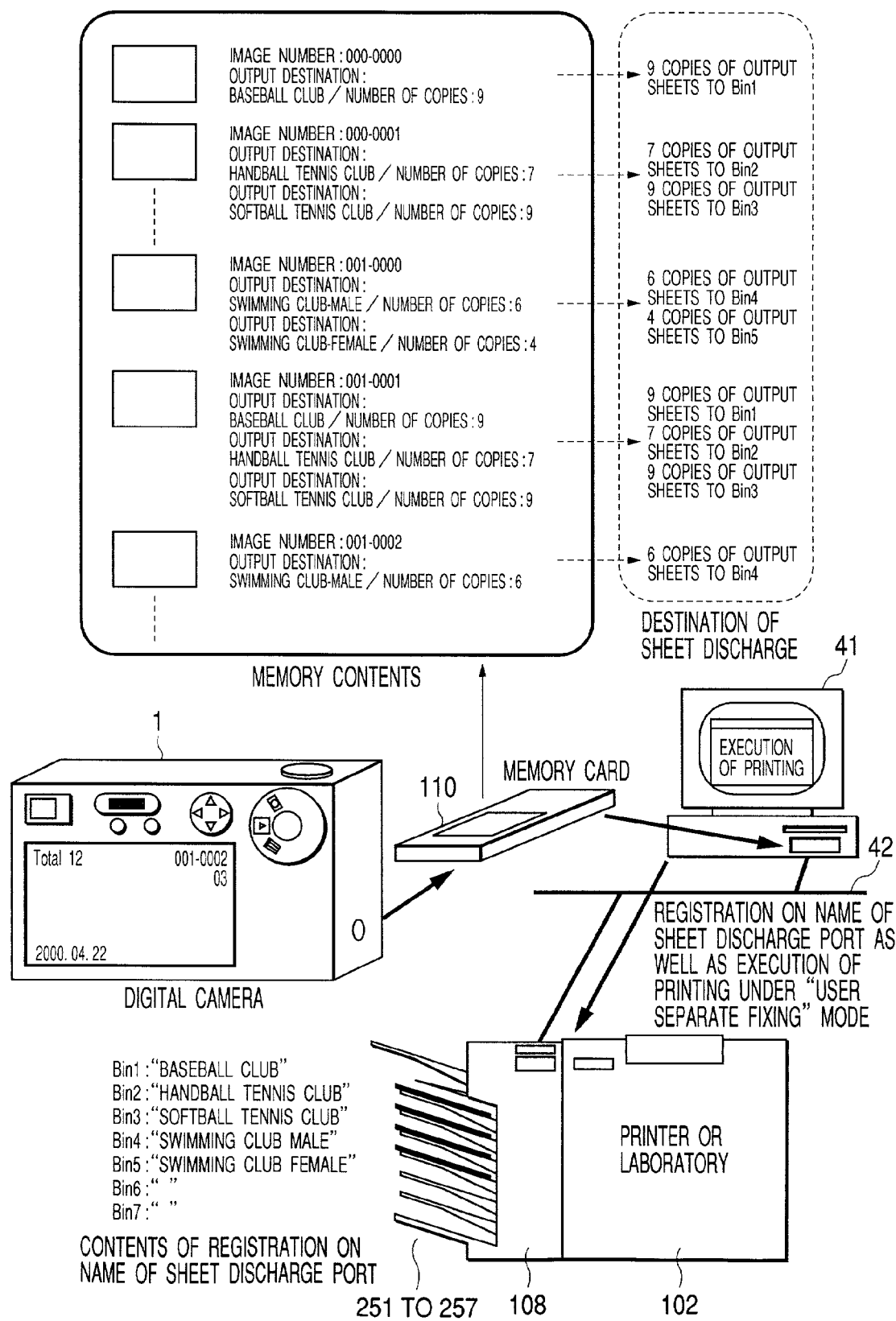
FIG. 37 shows the concept of the operation system printing out in the user separate fixing mode an image read by a host computer from the memory card in a variation of the first embodiment of the present invention.
Figure 38A:
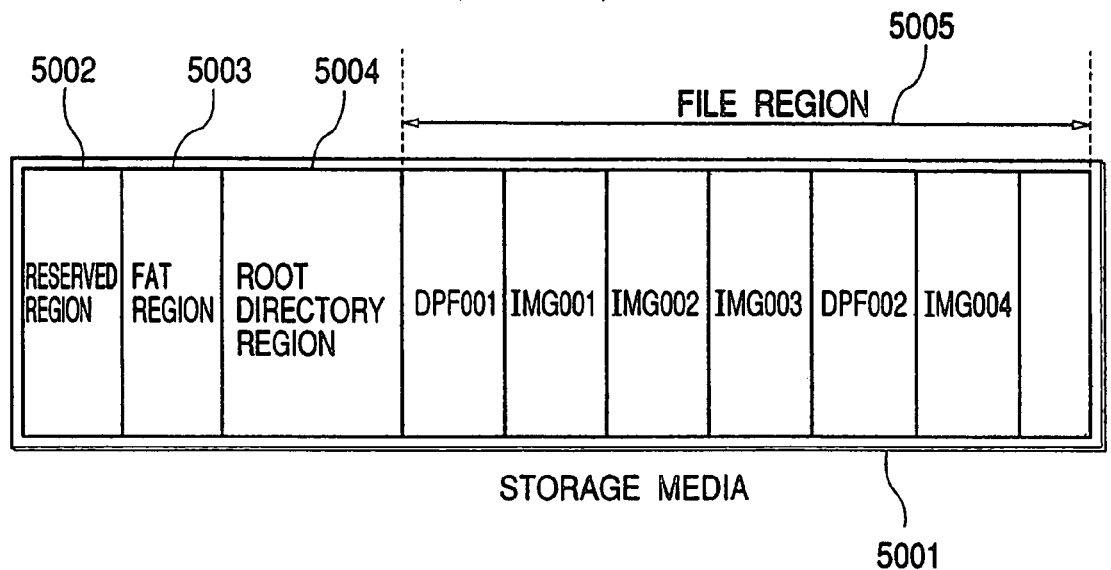
FIGS. 38A, 38B, and 38C are memory maps showing a conventional technology, and shows an example of a configuration of a storage medium as an information storage medium.
Figure 38B:
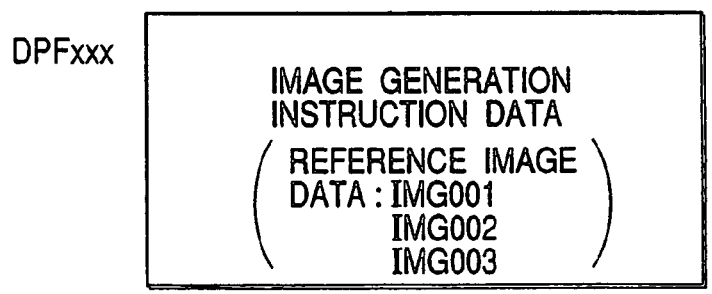
Figure 38C:
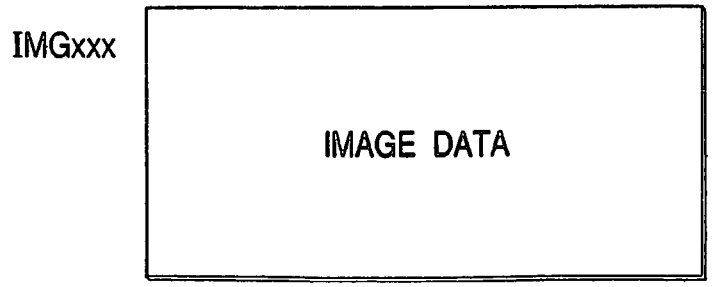
Figure 39:
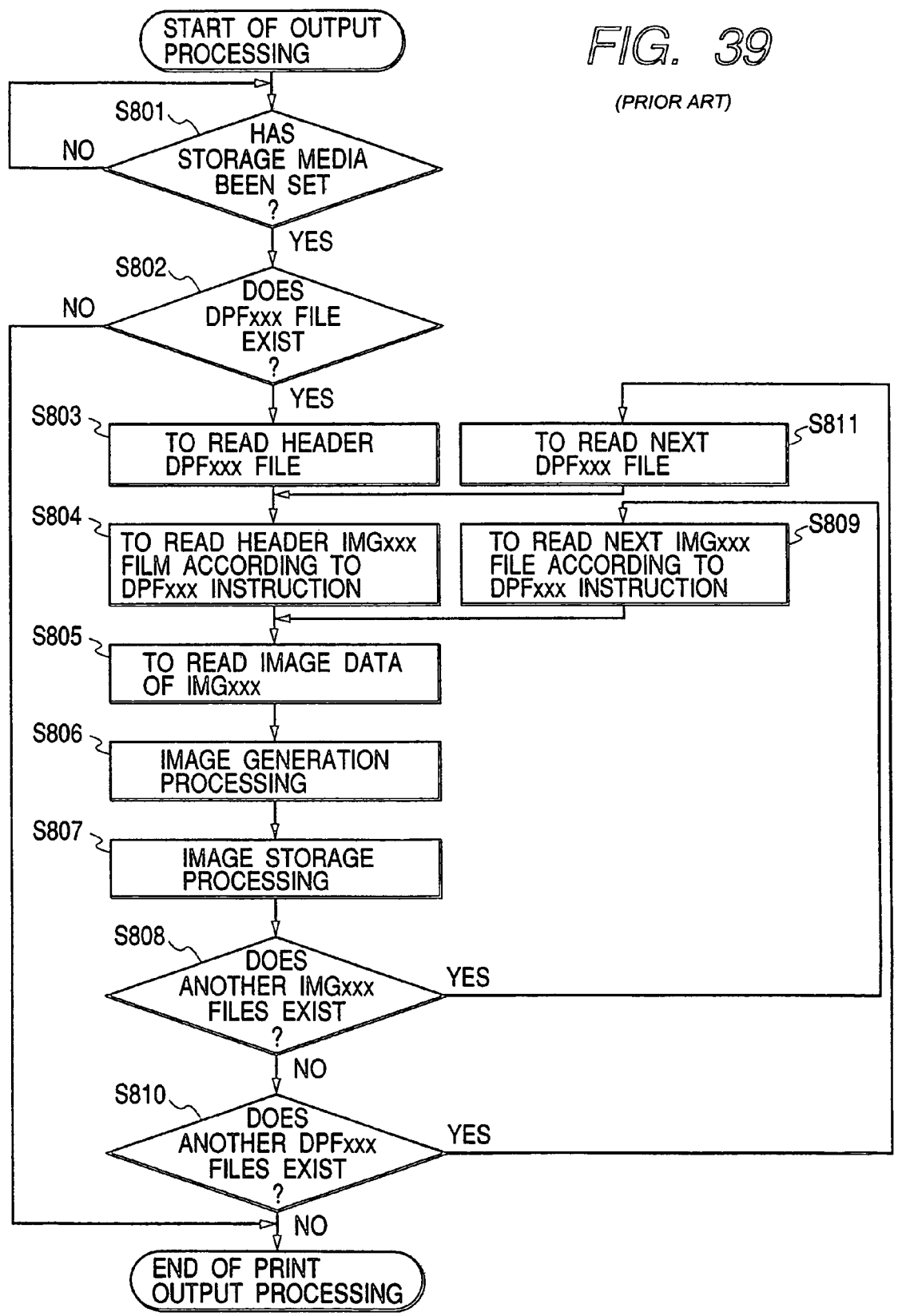
FIG. 39 shows the conventional technology, and is a flowchart of the procedure of a print control process in which a desired print image is generated and output by using the image data recorded in a storage medium.

The first Embodiment of the present invention was to mount a memory card 110 onto the image recording device 102 and execute printing, but as shown in FIG. 37, may be to mount storage medium 110 such as a memory card, etc. onto a data processor 41 such as a personal computer, etc., to indicate printing from the display part of that data processor 41 so that the image recording device 102 receives a print job generated in the data processor 41 via an interface cable 42 to execute print processing.

(Variation 1 of Second Embodiment)

The second Embodiment of the present invention was a system to transfer image related data from the digital camera 1 to the image recording device 102 so that the image recording device 102 analyzes that image related data to generate the print job, but in the case where the image recording device 102 became communicable with the storage medium 7 inside the digital camera 1, may be a system to automatically acquire the image related data inside that storage medium 7 to generate the print job based on that image related data.

(Variation 2 of Second Embodiment)

The second Embodiment of the present invention was a system to transfer the image related data from the digital camera 1 to the image recording device 102 so that the image recording device 102 analyzes that image related data to generate the print job, but may be a system to read out the image related data from the storage medium 101 such as a memory card, etc. inside the digital camera 1, to provide with means to generate the print job, to generate the print job inside the digital camera 1, to transfer that print job to the image recording device 102, and to execute printing.

Moreover, a menu that can select these processes may be provided to the digital camera 1 or to the image recording device 102 so that the user can select an optimal processing even when there is difference in the performance of the digital camera 1 and the performance of the image recording device 102 or the like, and this selection may be arranged so that the performance is compared between the digital camera 1 and the image recording device 102 and automatic judgment is executed so as to achieve high picture quality (resolution and gradation, etc.) and rapid printing (SPU specification, etc.) for printing.

(Third Embodiment)

Next a third embodiment of the present invention will be described. Incidentally, description on the common parts in FIG. 3 to FIG. 25 will be omitted.

Figure 40:
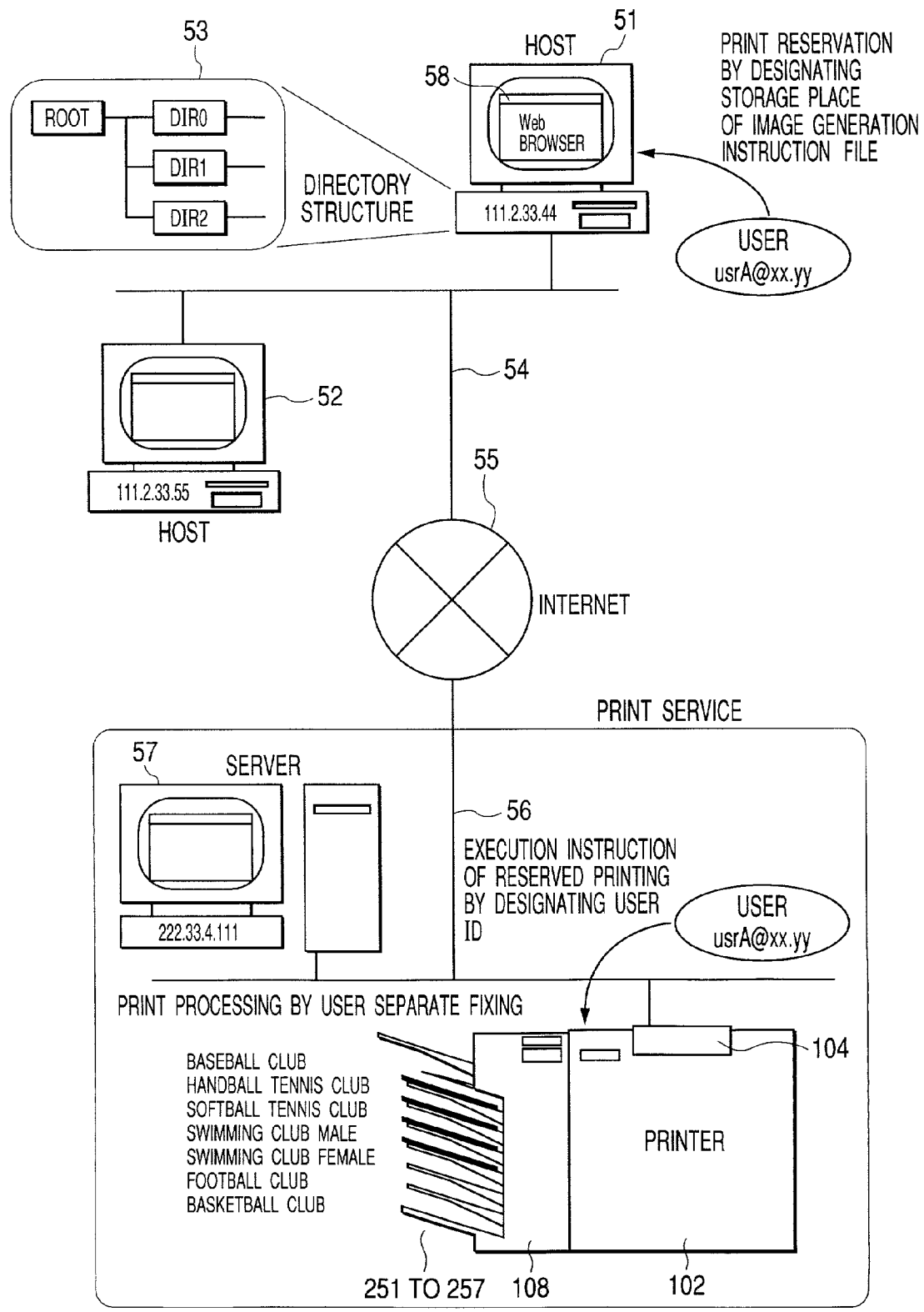
FIG. 40 shows the concept of an operation system in which the user issues an instruction to reserve a printing process on the image data stored in a host computer to a remote printer connected through Internet, and issues an explicit instruction to perform the printing process in a panel operation to the printer when the user visits a place where the printer is installed, and the printer prints out the image data in the user separate fixing mode at the instruction according to a third embodiment of the present invention.

FIG. 40 shows an operation system for a user to execute a printing reservation on image data stored in hosts (host computers) 51 and 52 which are connected with a remote printer 102 via the Internet 55, to execute clear printing execution indication by panel operation of a panel part 104 to the printer 102 when he/she visits a printer installation spot so that the printer 102 executes print output by user separate fixing mode according to that indication.

Figure 41:
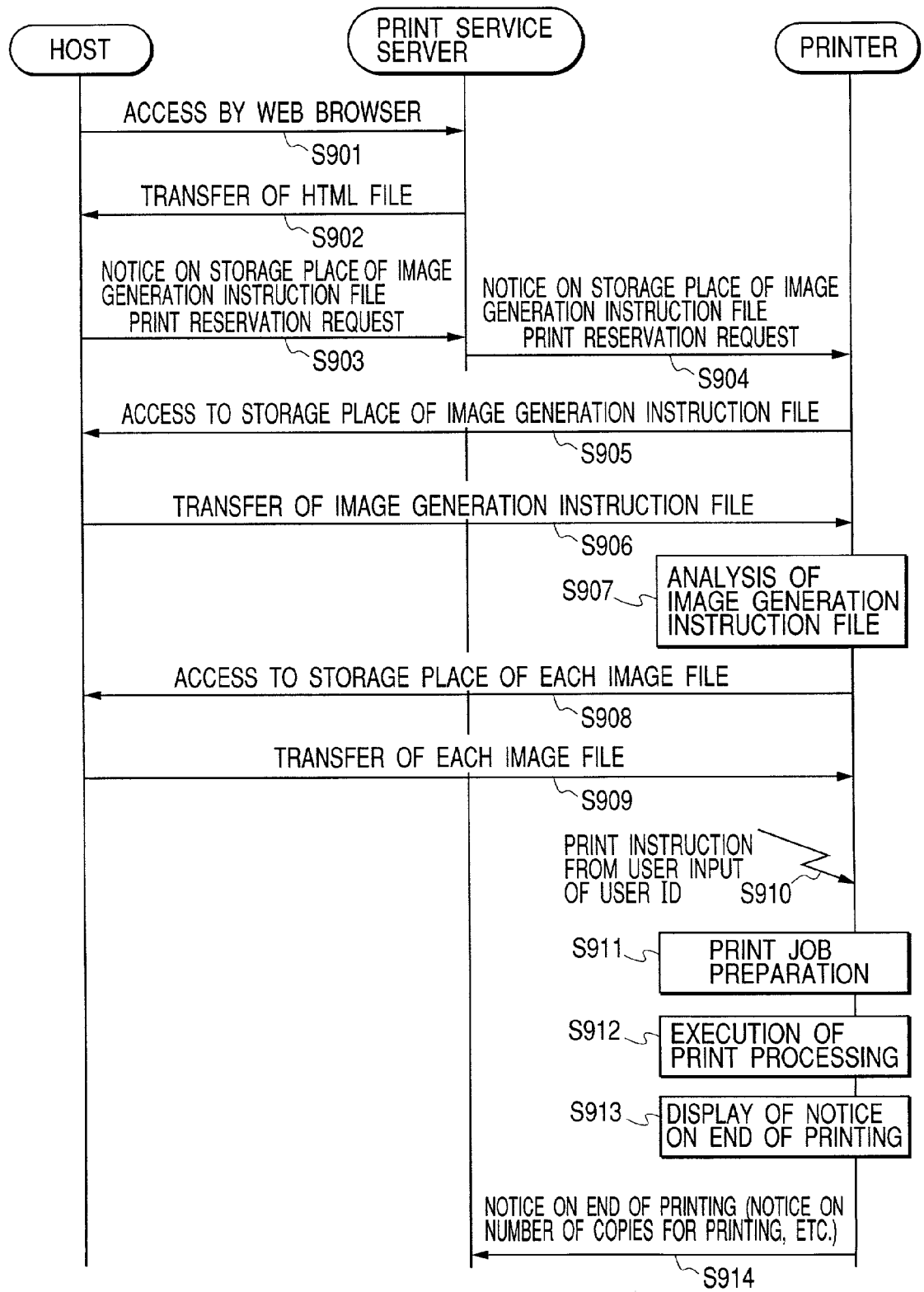
FIG. 41 is an event trace view showing the procedure of the operation system in which the user issues an instruction to reserve a printing process on the image data stored in a host computer to a remote printer connected through Internet, and issues an explicit instruction to perform the printing process in a panel operation to the printer when the user visits a place where the printer is installed, and the printer prints out the image data in the user separate fixing mode at the instruction according to the third embodiment of the present invention.

FIG. 41 shows operation timing of an operation system for a user to execute a printing reservation on image data stored in the hose 51 in hosts 51 and 52 which are connected with a remote printer 102 via the Internet 55, to execute clear printing execution indication by panel operation of a panel part 104 to the printer 102 when he/she visits a printer installation spot so that the printer 102 executes print output by user separate fixing mode according to that indication.

At first, in FIG. 40, a host 51 with IP (Internet Protocol) address of "111.2.33.44" and a host 52 with IP address of "111.2.33.55" are constructed in the same LAN (Local Area Network) 54, and a server 57 with IP address of "222.33.4.111" and a printer 102 with IP address without clear description are constructed in the print service LAN 56. Moreover, the respective LAN 54 and 56 are brought into connection via the Internet 55.

Under such system, procedures for a user to execute a printing reservation on image data stored in the host 51 which are connected with a remote printer 102 via the Internet 55, to execute clear printing execution indication by panel operation of a panel part 104 to the printer 102 when he/she visits a printer installation spot so that the printer 102 executes print output by user separate fixing mode according to that indication will be described with reference to FIG. 40 and FIG. 41.

In FIG. 41, the user executes an access to a print service server "222.33.4.111" with reference numeral 57 via a Web (WWW) browser 58 on the host 51 (S901) and downloads a file in HTML (Hypertext Markup Language) format for executing print reservation request to the printer 102 controlled by the print service (S902). The HTML file transferred from the print service server 57 is displayed, for example, as in FIG. 43 to be described later on the Web browser 58 of the host 51.

The user will describe information necessary to output the image file 53 stored in the host 51 to the remote printer 102 on the Web browser 58 according to contents of the HTML file downloaded from the print service server 57. Those description contents include image information for printing, a storage place of the Image forming instruction file where user information, etc. are stored (directory), an outputting printer 102 and a trustee service-company name, a method of receiving output images or the like. In the case where the Image forming instruction file 12 does not exist in the host 51, it is required to be prepared according to a predetermined format, and can be prepared by description onto the screen on the Web browser 58 displayed as in FIG. 44 to be described later.

When a user notifies the print service server 57 of respective places of the Image formation instruction file via the Web browser 58 of the host 51 to execute print reservation requests based on the contents of that Image forming instruction file (S903), the print server 57 accesses to the outputting printer 102 designated by the host 51 to execute print reservation requests by notifying places of the Image formation instruction files 12 notified by the host 51 and that host information (IP address, etc.) (S904).

Printer 102 receives print reservation requests from the printer service server 57 to access to respective places of the Image forming instruction file 12 of the remote host 51 via the Internet 55 according to received host information and information on the storage place of the Image forming instruction file (S905). The Image forming instruction file 12 that is stored in a predetermined format inside that directory is searched and the found Image forming instruction file 12 is downloaded (S906). When a predetermined Image forming instruction file has not been found at the time of searching, an error message may be displayed on the Web browser 58 of the host via the print service server 57 in order to notify the user of that unjust event.

The printer 102 completes downloading of a predetermined Image forming instruction file 12, and then analyzes image information as well as user information, etc. described in the Image forming instruction file 12 (907). After analysis, all the necessary image files 15 having been described in the Image forming instruction file 12 are downloaded from that storage place (S908 and S909), and the downloaded Image forming instruction file 12 as well as the image file 15 are arranged to be stored in a predetermined recording device allocated to each user. In the case where image files are stored, staying conscious on the directory classification designated to the Image forming instruction file 12, storage takes place in such a construction that relative path of each image file from the Image forming instruction file 12 will become the same as the destination of downloading. However, in the case where the same construction is impossible, the host 51 is notified of that, or changed path subject to storage in a form that can be constructed may be reflected to the Image forming instruction file 12.

In the case where the user has designated for print reservation, the printer 102 will wait until the user visits the installation spot of the printer 102 and executes printing execution indication clearly by panel operation of the panel part 104 of the printer 102. In the case where the user executes printing indication to the printer 102, he/she inputs user ID from the panel part 104 of the printer 102 (S910). The user ID to be inputted may be an ID and a password that the user himself has designated or an electric mail address and a password, or may be a reservation number given by the print service server 57 at the time of print reservation.

When the user ID is inputted, the printer 102 displays the contents of the Image forming instruction file 12 that the host 51 having been designated by that user has downloaded, and if necessary, receives setting such as printing setting or the like from the user and waits for printing indication. In receipt of the printing execution indication from the user, the printer 102 prepares a printing job based on the contents of the Image forming instruction file 12 and the image file 15 (S911).

At the time of preparation of the printing job, with the sheet discharging mode of the printer being set at "user separate fixing" among print setting from the user, the "user separate fixing" mode is added to the sheet discharging designation of the printing job.

When the printing job generation is completed, the printer starts print processing, and executes classification processing under "user separate fixing" mode as shown in FIG. 40 to output (S912).

When the printing processing is completed, the printer displays a printing completion message to the panel 104 or transmits a sign expressing the printing completion in order to notify the user that printing is completed (S913) and the notification is made to the print service server 57 as well (S914). At that time, information of number of printing or the like that will become information for settling the print service charge will be notified additionally.

In the operation system such as the present embodiment having been described so far, the user executing printing indication can monopolize to use the printer 102, which can use all of a plurality of sheet discharging bins 251 to 257 corresponding with purposes of the user. The print setting corresponding with respective purposes of classification and classification processing of the printer 102 based on that designation will be described with reference to examples.

FIG. 42 shows an operation system for print outputting under user separate fixing mode, and is an example to proceed with classification of output images for each distinguishing name according to contents of the Image forming instruction file 12 in which the outputting destination has been designated in advance by distinguishing name for each image file.

In FIG. 42, in the Image forming instruction file 12, "user separate fixing" is stored by input operation from the user as sheet discharging mode, any distinguishing name for each image as the outputting destination, and any necessary value of number of copies for each image as number of copies. In receipt of print indication from the user, the job generation part reads out the contents of the Image forming instruction file 12 and starts preparation of the job based on the "user separate fixing" mode designated as the sheet discharging mode. In the case where the print job by way of "user separate fixing" mode is generated, the distinguishing name designated as output destination will become a judgment clue to execute sorting processing for each image. For the example in FIG. 42, "baseball club", "hardball tennis club", "softball tennis club", "swimming club male", and "swimming club female", etc. being "output destination" for each image is used as distinguishing name for classification processing. Here, images may be set for operations without any "output destination" being designated. In the processing for generating print jobs, with "user separate fixing" mode being designated, the distinguishing name having been designated as "output destination" for each image is treated as the sheet discharging destination and the value designated as "number of copies" is added to the print instruction information for each image.

When preparation of a print job is completed, the job generation unit delivers that print job to the data analysis portion. The image storage apparatus 102 analyzes contents of the print job based on the generated print job to execute predetermined print processing according to those contents. In the case of the print job as in the example of FIG. 42, as the page information on the number covering the value designated as the number of copies is copied, sheet discharge destination for each image will be determined so that the outputs are sorted into the paper discharge trays 251 to 257 registered under the same name as the distinguishing name designated as the sheet discharge destination.

Here, respective paper discharge trays 251 to 257 of the image recording device 102 shall be registered by distinguishing names in advance, and that registration may be inputted by way of panel operation of the panel part 104 of the image recording device 102, may be set from the server 57 or hosts 51 and 52, etc. to control the image recording device 102, or may be made to be designated in the Image forming instruction file 12 as one of print indication information so that after downloading from the remote hosts 51 and 52 the image recording device 102 reads the registered contents in from the Image forming instruction file 12 for setting.

As for images for which feeding-discharging destinations have been determined, predetermined print processing is executed sequentially, and as in the example of FIG. 42, sheets for designated number of copies of each image covering the output results of images with sheet discharging destination being designated under distinguishing name of "baseball club" are sheet-discharged into the paper discharge tray "Bin1" with reference numeral 251, sheets for designated number of copies of each image covering the output results of images with sheet discharging destination being designated under distinguishing name of "hardball tennis club" are sheet-discharged into the paper discharge tray "Bin2" with reference numeral 252, sheets for designated number of copies of each image covering the output results of images with sheet discharging destination being designated under distinguishing name of "softball tennis club" are sheet-discharged into the paper discharge tray "Bin3" with reference numeral 253, sheets for designated number of copies of each image covering the output results of images with sheet discharging destination being designated under distinguishing name of "swimming club male" are sheet-discharged into the paper discharge tray "Bin4" with reference numeral 254, and sheets for designated number of copies of each image covering the output results of images with sheet discharging destination being designated under distinguishing name of "swimming club female" are sheet-discharged into the paper discharge tray "Bin5" with reference numeral 255.

Thus, also in the case where the image recording device 102 is temporally monopolized for use by an individual, the print processing is executed under "user separate fixing" mode so that without taking the position of the sheet discharging destination into consideration the sheet discharging destination can be designated under names and necessary copies for each image can be designated. In addition, those designations are made to be designated into the Image forming instruction file 12 so that only necessary number of necessary images can be outputted with print instruction at a time.

FIG. 43 depicts a user interface example 61 of the Web browser 58 for the user to request printing to the printer 102 brought into connection from the host 51 via the Internet 55, and FIG. 44 depicts a user interface example 62 of the Web browser 58 for editing the Image forming instruction file 12 necessary for executing printing request via the Internet 55.

At first, FIG. 43 will be described. In FIG. 43, the user selects at first a company name to which print service is requested as an output destination of the image file, or the name of the convenience store or the like is selected in the combo box of the "trustee service company". As for designation of the storage place of the Image forming instruction file, the host information is directly described to a text field of the "host information (IP address)" to directly describe the directory information to the text field of "directory information", or may be made to be designated while reference is being made to the directory by pushing the button of "editing of Image forming instruction file". If the host 51 which the user is requesting printing is automatically detectable on the host information (IP address), the initial value of "host information (IP address)" may be displayed automatically. In addition, if the Image forming instruction file is not prepared, the screen in FIG. 44 to be described later which is opened by pushing the button of "editing of Image forming instruction file" may be used for preparation.

As for designation on a method for reception, in case of receiving output image at the service window, or in case of indicating printing from a printer at the service window after a print reservation, the check box of "delivery by hand at the service window" is checked while in case of arranging a door-to-door delivery system (a door-to-door delivery) to deliver the output image to the client's residence, the check box of "door-to-door delivery" is checked. In case of receiving output images at the service window, a desired service window is selected for designation from the combo box of the "designated service window".

In the case where print reservation is requested subject to finishing all inputting, the button of "printing to be reserved" is pushed. This serves to notify the print reservation request to the printer, and the printer 102 executes only downloading processing. At the time when the button of "printing to be reserved" is pushed, if there are unjust events such as the case that description to each item is incomplete or the case that the designated image indication file does not exist etc., a warning message may be arranged to be displayed.

Next, FIG. 44 will be described. In FIG. 44, the user designates at first the storage place of the Image forming instruction file. Designation of the storage place is directly described into the text field of "storage place of Image forming instruction file (directory)", or the "reference" button may be pushed to proceed with designation while referring to the directory. The image file for outputting is displayed in the list of "designation of image file", and with the "reference" button, each image file of each directory can be designated.

In addition, each image file can be edited by selecting the image file to be edited and pushing the button of "editing of image file" while image attached information (photographed date, image serial number, title, trimming information and rotation information etc.) on each image file) can be edited by selecting the image file to be edited and pushing the button of "editing of image attached information".

As for designation of user information, the user fills out respective text fields of "name", "electric mail address", "address" and "telephone number".

Incidentally, editing work on the Image forming instruction file 12 to be executed on a screen depicted by FIG. 43 may not be executed at the time of request of printing, but may be executed in the case where the title and image attached information such as image editing information etc. for each image file are stored. In addition, in the screen in FIG. 44, when the storage place of the Image forming instruction file 12 is designated, already stored displayable information may be displayed so as to notify the user that the information is already stored. If the format of the image indication file is the same, editing work may be executed with a predetermined application software and not on the Web browser.

Data contents to be described in the Image forming instruction file 12 are the same as in the above described FIG. 4, and therefore description thereon will be omitted.

Here, if the Image forming instruction file 12 is in a predetermined format, it can be prepared from an image read-out apparatus such as a digital camera etc., and except the above described Web browser, equipment supporting the same format or an application software can prepare or can edit. In addition, the image file 15 will not be limited in terms of classes whether it be a file of picture image or a text file.

FIG. 45 depicts an example of user interface of the Web browser 58 for a user to register a paper discharge tray name (distinguishing name) at the time of operation under user separate fixing mode. In order to operate the image recording device 102 under the user separate fixing mode, it is necessary to register the distinguishing names for respective paper discharge trays 251 to 257 of the image recording device 102 in advance. When the distinguishing names are registered for respective paper discharge trays 251 to 257, the user interface 63, shown in FIG. 45 for example, displayed in the display part of the image recording device 102 can be used for registration.

In FIG. 45, the fixed paper discharge trays 251 to 257 set at the EEPROM 410 of the printer 102 in advance such as "Bin1", "Bin2" or "Bin3" are registered under names that the user can recognize easily such as "baseball club", "hardball tennis club" and "softball tennis club" respectively. As names to be registered for the paper discharge tray under user separate fixing mode, user name, group name, or otherwise in the case where the image recording device is temporally monopolized for use by an individual, any name may be guessed freely corresponding with respective purposes.

The flow chart showing a processing procedure to register the paper discharge tray name (distinguishing name) at the time of operation under user separate fixing mode is the same as in the above described FIG. 6, and therefore description thereon will be omitted.

FIG. 46 depicts a user interface example of 64 of the Web browser 58 for indicating printing by panel operation of the panel 104 of the printer 102 based on the Image forming instruction file 12 as well as the image file 15 downloaded from the host 51.

As shown in FIG. 46, the display part of the image recording device 102 provides with "image designation" and "media" being selectable, and as for "output destination" and "number of copies", designation on whether reference should be made to data contents or designation should be made clearly without reference to data contents can be designated with check boxes. Moreover, in the case where "output destination" and "number of copies" are clearly designated without reference to data contents, desired output destinations as well as desired numbers of copies can be designated respectively. For "image designation", for example, whether all images inside the memory card 110 are printed or a portion thereof is printed, or a page of an index print showing a list of selected images is printed, is selected. In "media", it is selectable onto what the image should be printed.

In some cases, the image recording device 102 could be a machine exclusive for photos, but in the present embodiment, the apparatus shall be printable for a plurality of media, and ordinary paper, postcard, photo, coated paper, OHP sheet or the like can be selected, and in the input example of media in FIG. 46, "photo" has been selected. In the case where "output destination" is clearly designated, all paper discharge tray names (distinguishing names) having been registered in respective paper discharge tray in advance are displayed as selection items, and among them a sheet discharging destination tray of an image selected at "image designation" can be selected under distinguishing name corresponding with desired classification purposes. In the input example of the output designation in FIG. 46, "baseball club" is selected. In case of clearly designating "number of copies", desired number of output copies for images selected at "image designation" can be selected. In the input example on number of copies in FIG. 46, "as for number of copies, reference should be made to contents of data" is designated, and therefore number of copies for images selected under "image designation" is not designated clearly.

After executing these selections, the user pushes "OK" button, the printer 27 reads out the contents of the Image forming instruction file 12 so that printing starts with the above described settings.

Figure 47:
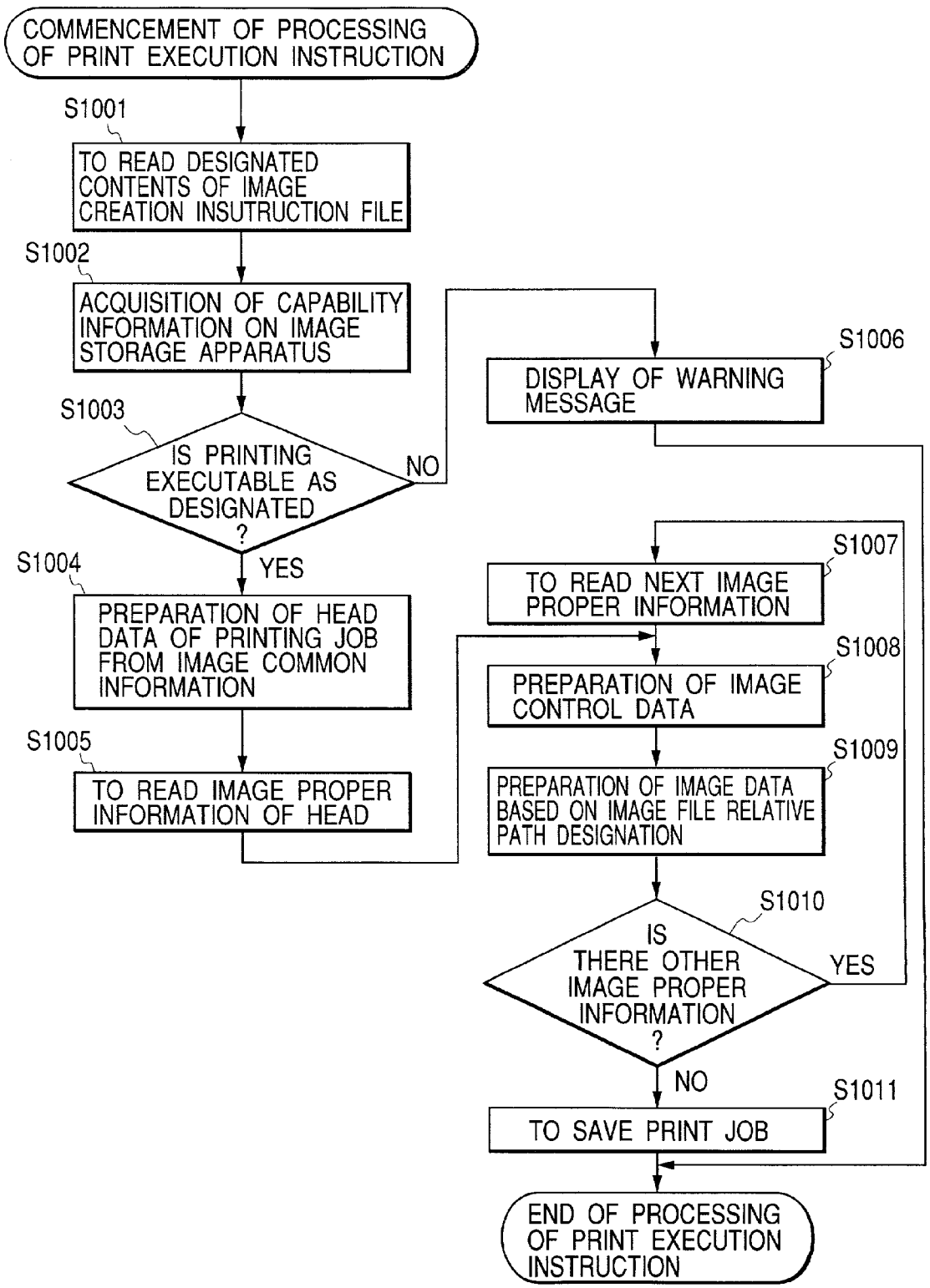
FIG. 47 is a flowchart of the procedure of the process performed when the user issues an instruction to perform a printing process by operating the panel of a printer according to the third embodiment of the present invention.

The flow chart in FIG. 47 shows a processing procedure in the case where execution of printing is instructed from the user by the panel operation of the panel part 104 of the printer 102.

In FIG. 47, when print execution is instructed from the user, the data readout part 413 reads out the contents of the predetermined Image forming instruction file 12 so as to refer to the image data, the image attached data and the print setting data or the like (S1001). Thereafter capability information (number of paper discharge trays, number of sheet feeding ports, feeding paper size and type or the like) of the image storage apparatus 102 is acquired (S1002), and in S1003, it is judged whether or not printing as described can be executed.

In S1003, if printing is not executable, warning message such as "user separate sheet discharge cannot be executed," or the like is displayed, display corresponding with the contents is executed, the user is notified that printing as designated is not executable (S1006), and the printing execution indication processing ends. In S1003, if printing is executable, the step goes forward to processing of next S1004 and onwards.

In S1004, header data for a print image is added based on image common information described in the read-in Image forming instruction file in S1001 so that the print job is generated. Moreover, each image inherent information described in the Image forming instruction file, or at first, the leading image inherent information of S1005 will be read in, and the other image inherent information is sequentially read in so that the job will be generated, and the step goes forward to the processing of S1008.

In S1008, the control data of that image are prepared based on the image inherent information in midst of reference. At the time when the image control data are prepared, if there are output destination and number of copies or the like clearly designated from the user at the time of printing execution indication, those pieces of information are reflected onto the image control data. And in the next S1009, the image data part of the print job is prepared from the image file stored in a position which the relative path of the image file expresses, and processing for image inherent information in midst of reference will be finished. Next in S1010, it is judged whether or not there exist other image inherent information, and if any, with the next image inherent information as a reference destination (S1007), processing of S1008 to S1010 is repeated. Here, the image data to be used for job generation are selected based on image designation having been set in advance in FIG. 46 and all the image data or a part of image data reflecting the designated contents will be selected.

In S1010, if other image inherent information disappears, the step goes forward to the processing of S1011, and in S1011, the print job prepared in the above described processing is stored in the predetermined storage region so that printing execution indication is finished.

The above described FIG. 9 to FIG. 25 are applied to a third Embodiment of the present invention likewise, but in order to refrain from repeated description, and therefore description thereon will be omitted.

That is, system constructions of the image recording device in the image system of the third Embodiment of the present invention are as those in the above described FIG. 9, and therefore description thereon will be omitted. Likewise, the sectional structure of the printer 102 in FIG. 9 is the same as that in the above described FIG. 10, and therefore description thereon will be omitted. In addition, various option units having been brought into connection with the main body of the printer 102 in a detachably-attachable fashion are also as those in the above described FIG. 10, and therefore description thereon will be omitted. Circuit construction of the printer 102 and signals in FIG. 9 are as those in the above described FIG. 11, FIG. 12 and FIG. 13, and therefore description thereon will be omitted.

In addition, the circuit construction of the video controller 103 in FIG. 11 is as that in the above described FIG. 14, and therefore description thereon will be omitted. Means to acquire detailed information on respective input-output options by issuing command status based on the (not shown) common memory with the video controller 103 secured in the (not shown) RAM provided inside the option controller 106 in FIG. 11 as well as the (not shown) original status are as those respectively in the above described FIG. 15 and FIGS. 16A and 16B, and therefore description thereon will be omitted. Procedure to access to that common memory, exchange command status with respective options and exchange information is as that in the above described FIG. 17, and therefore description thereon will be omitted.

In addition, the data flow from the data processor 101 and the memory card 110 to the option controller part 106 and the engine controller part 105 in the present embodiment is as that in the above described FIG. 18, and therefore description thereon will be omitted. The structure of the page table 31 to store page information in FIG. 18 is as that in the above described FIG. 19, and therefore description thereon will be omitted.

In addition, the structure of the job control table 33 and the engine status table 34 inside the RAM 407 in FIG. 14 is as that respectively in the above described FIG. 20 and FIG. 21, and therefore description thereon will be omitted. In addition, the processing procedure from reception of the print data to printing completion is as that in the above described FIG. 22, the paper discharge tray searching processing procedure at the time of user separate fixing mode is as that in the above described FIG. 23, the notifying processing procedure for data processing at the time of job finishing is as that in the above described FIG. 24 and the contents of information renewing processing for each paper discharge tray is as those in the above described FIG. 25, and therefore description hereon will be omitted.

Figure 48:
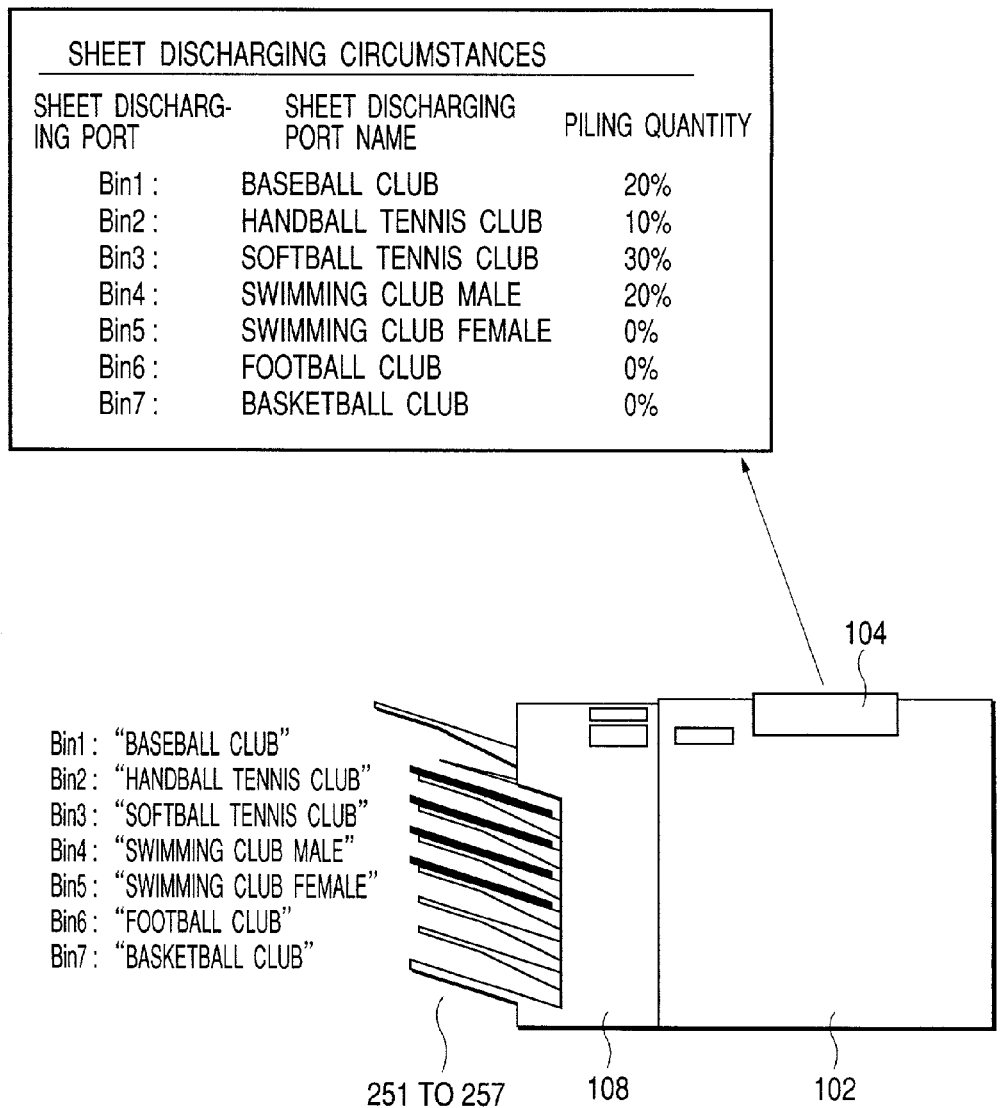
FIG. 48 shows the concept of displaying the delivery state (loading information) at each paper discharge tray of the panel unit of the image recording device according to the third embodiment of the present invention.

FIG. 48 depicts an example of display that the panel part 104 of the image recording device 102 renews display of the sheet discharging status (load status) of respective paper discharge trays 251 to 257. In this sheet discharging status, "paper discharge tray", "paper discharge tray name" and "load capacity" are displayed in each bin of Bin1 to Bin7.

FIG. 49 depicts a display example that the panel part 104 of the image storage apparatus 102 renews display of detailed information of the images loaded on a specific paper discharge tray 251. In this display example, "paper discharge tray", "paper discharge tray name", "image serial number", "photographed date", and "title" and "image" as the printing object are displayed for a specific paper discharge tray.

Moreover, the drawing showing the index print 36 for the images having been sheet-discharged to respective paper discharge trays 251 to 257 respectively in the case where printing is executed under user separate fixing mode is as that in the above described FIG. 28. In the present embodiment, FIG. 28 shows an example of the index print of an image having been sheet-discharged to "Bin1" with a paper discharge tray name of "baseball club". The output image sheet-discharged to this paper discharge tray 251 is an image undergoing sheet discharging destination designation under distinguishing name of "baseball club". In addition, the user information being the owner of the memory card 110 in which the source data for these images have been stored is displayed as a print result of "user information=Shimomaruko Taroh (TEL: 03-3757-XXXX), the date and time when these images have been outputted as a print result of "printed date and time=2000/05/05 15:51" and the number of images sheet-discharged to this paper discharge tray as a print result of "print number=40 sheets". Moreover, the respective images sheet-discharged to this sheet discharging port have been print-outputted as a list together with the image serial number and output copy number. It goes without saying that information other than that described above may be print-outputted as the contents to be print-outputted to the index print 36.

As described above, with output of the index print 36, the user can easily know output images classified to respective paper discharge trays under which distinguishing names have undergone sheet discharge of how many sheets of copies respectively and how many sheets in total. In addition, for example, in case of distribution to a user at the distribution destination, delivery is made together with the index print 36 so that the user at the side where receipt has taken place can easily know that he/she has received what images and how many of them.

FIG. 50 exemplifies print output of information of loading job of all paper discharge trays. In FIG. 50, output images of all the paper discharge tray loading job information prints 65 display loading job information on all the paper discharge trays in form of a list, and other than common information such as "sheet discharging mode", "total number of sheet discharge", "output date and time" or the like the information such as paper discharge tray name registered in a paper discharge tray and "number of sheets of sheet discharge" sheet-discharged to the paper discharge tray or the like is printed for each paper discharge tray. This entire paper discharge tray loading job information print 65 may be the one to automatically output on a job-by-job bases according to setting of the user or the system, or may be the one to output only entire loading job information when the user has clearly indicated.

The output of the entire paper discharge tray loading job information print 65 may be instructed by panel operation of the image recording device 102 or the like or may be outputted automatically for each print job by setting at a server or a host or the like to control the image storage apparatus 102. In addition, as for that output instruction, outside apparatus such as a host computer or the like may make instructions at the time when printing is requested. The output destination may be a paper discharge tray for escaping, a set predetermined paper discharge tray or may be a paper discharge tray to instruct the user at the time of outputting.

As described above, the entire paper discharge tray job information is made to be available for outputting, the user can easily know which distinguishing names have been registered for respective paper discharge trays of the image recording device for the sheet-discharged job.

FIG. 51 exemplifies print outputs of information of a loading job of a specific paper discharge tray. In FIG. 51, an output image of a specific paper discharge tray loading job information print 66 displays loading job information of a specific paper discharge tray in form of a list, and other than information on the paper discharge tray such as "paper discharge tray", "paper discharge tray name", "sheet discharging mode", "number of load copies, "output date and time" or the like, image attached information such as "image serial number", "photographed date", "title" and "number of copies" is printed for loaded individual image. This paper discharge tray loading job information may be the one to automatically output on a job-by-job bases according to setting of the user or the system, or may be the one to output only specific job information in the case where the user has clearly instructed. The output of the paper discharge tray loading job information may be instructed by panel operation of the image recording device or the like or may be outputted automatically for each print job by setting at a server or a host or the like to control the image recording device. In addition, it may be instructed from outside equipment such as a host computer, etc. Whether or not to which paper discharge tray output should be made may be up to selection of the user. The output destination may be the one to sheet-discharge respectively to paper discharge trays being the objects of the print contents, or may be the paper discharge tray the user instructs.

As described above, the paper discharge tray loading job information is outputted so that the user can easily know detailed information when it become necessary on the output image of that paper discharge tray.

As described above, the third Embodiment of the present invention executes classification under user separate fixing mode so that sheet discharging destination can be designated by names and required number of copies of required print objects can be outputted. In addition, with whatever that is brought into connection with the printer inclusive of the printer, the host computer, or other outside apparatus, the loading status of the paper discharge tray of the printer can be easily confirmed, and therefore what kind of designated printed product is loaded to that paper discharge tray can be judged easily. Moreover, since the loading status of each paper discharge tray, detailed information on each image, and detailed information for each print job or the like can be printed and outputted, preparation of detailed statements on charges in print service operation and index print etc. can be executed automatically, and enhancement in service work efficiency can be realized. Moreover, the data will have been downloaded in advance, actual printing will take place when the user has executed printing indication, at that time he/she inputs the user ID as well as the password etc. and therefore operation with high security can be realized. Moreover, as for the download data, a storage period on the data is set and in the case where no printing indication is executed during that period, those data are erased automatically so that a vacant memory can be secured and thus such a state that reception of reservation is impossible due to insufficient memory will become preventable.

(Fourth Embodiment)

The above described third Embodiment of the present invention was an operation system that in the case where print request is executed from the host 51 by the user the printer 102 executes only download processing of the Image forming instruction file 12 and the image file 15 toward the host 51, and in the case where clear printing execution indication of the user is executed by the panel operation etc., the print processing starts, but as in the fourth embodiment of the present invention to be described as follows, such an operation system may be provided that, in the case where print request is executed from the host 51 by the user, the printer 102 executes downloading of the Image forming instruction file 12 and the image file 15 toward the host 51, and at the same time when this downloading is completed, the printing processing starts.

In the fourth Embodiment of the present invention, only portions that are different from those in the third Embodiment (FIG. 52 and FIG. 53) will be described.

Figure 52:
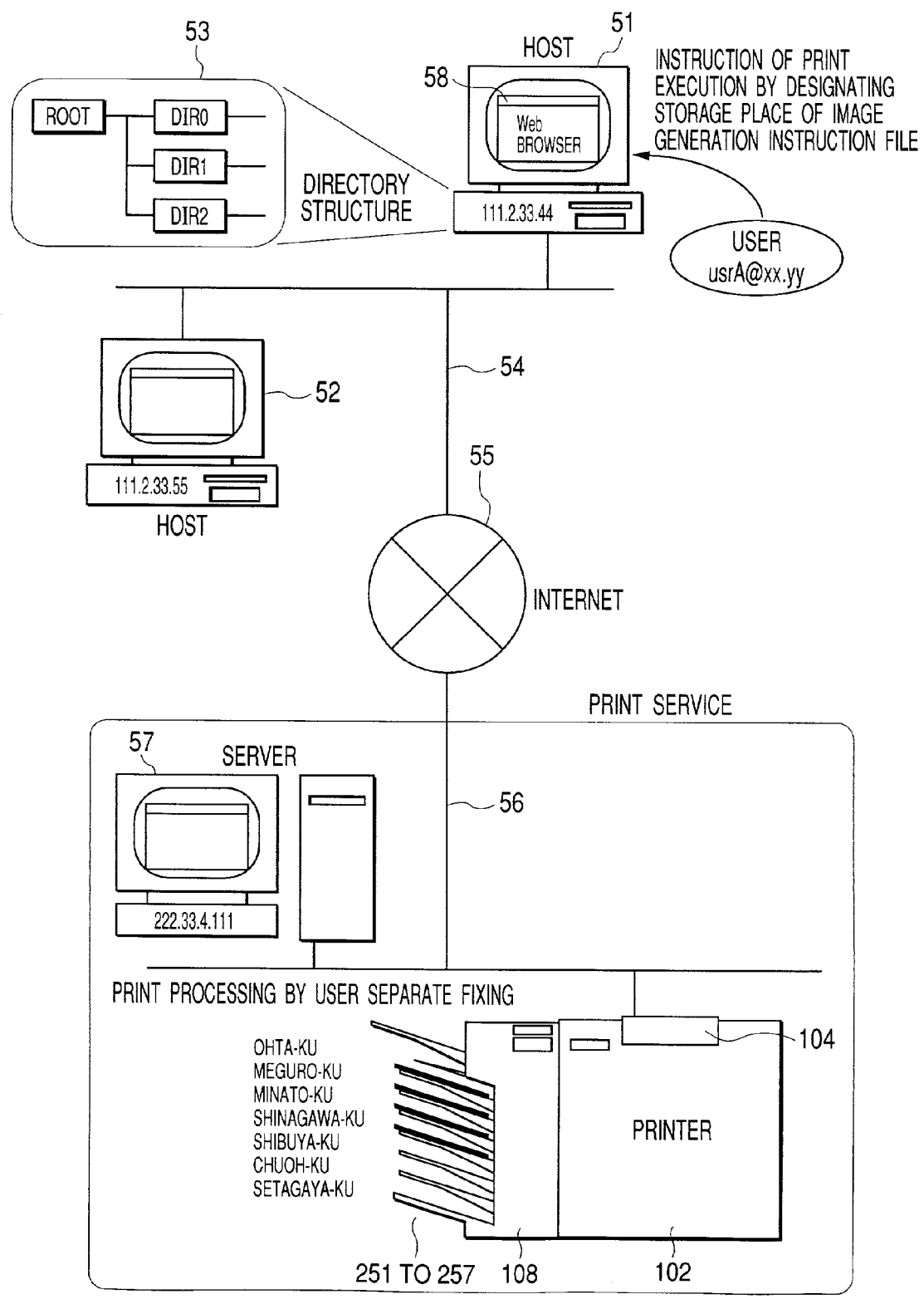
FIG. 52 shows the concept of the operation system in which the user issues an instruction to perform a printing process on the image data stored in a host computer to a remote printer connected through Internet, and the printer prints out the image data in the user separate fixing mode at the instruction according to a fourth embodiment of the present invention.
Figure 53:
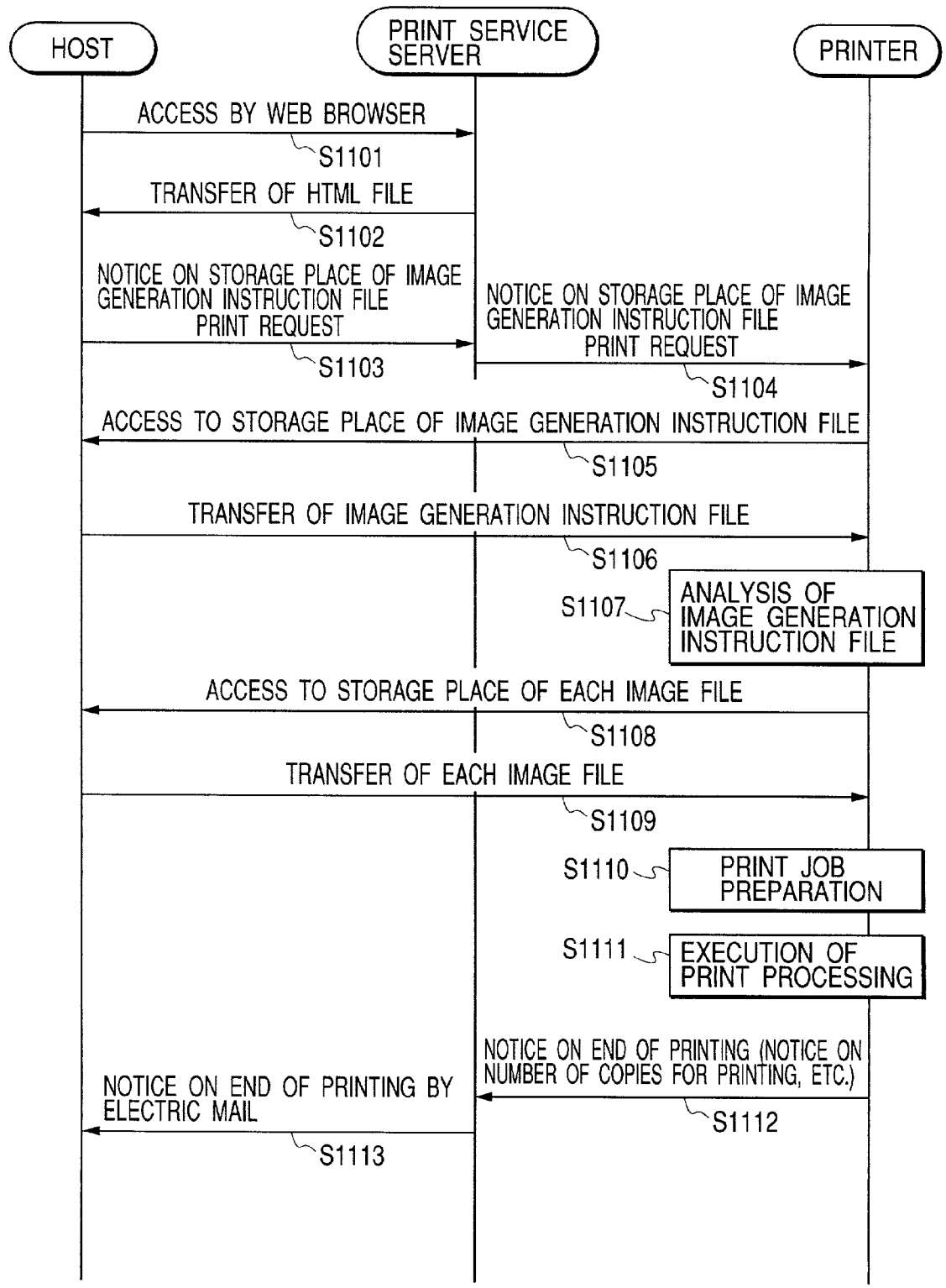
FIG. 53 is an event trace view showing the procedure of an operation of the system in which the user issues an instruction to perform a printing process on the image data stored in a host computer to a remote printer connected through Internet, and the printer prints out the image data in the user separate fixing mode at the instruction according to the fourth embodiment of the present invention.

FIG. 52 shows an operation system for a user to execute a printing indication on image data stored in a host 51 which is connected with a remote printer 102 via the Internet 55 so that the printer 102 executes print output by user separate fixing mode according to that indication. FIG. 53 shows a processing procedure of the operation system.

At first, in FIG. 52, a host 51 with IP (Internet Protocol) address of "111.2.33.44" and a host 52 with IP address of "111.2.33.55" are constructed in the same LAN 54, and a server 57 with IP address of "222.33.4.111" and a printer 102 with IP address without clear description are constructed in the print service LAN 56. Moreover, the respective LAN 54 and 56 are brought into connection via the Internet 55.

Under such system, procedures for a user to execute a printing indication on image data stored in the host 51 which are connected with a remote printer 102 via the Internet 55 so that the printer 102 executes print output by user separate fixing mode according to that indication will be described with reference to FIG. 34.

In FIG. 34, the user executes an access to a print service server "222.33.4.111" with reference numeral 57 via a Web browser 58 on the host 51 (S1101) and downloads a file in HTML format for executing print request to the printer 102 controlled by the print service (S1102).

The HTML file transferred from the print service server 57 is displayed, for example, as in the screen (an example of user interface) 61 in the above described FIG. 43 in the third Embodiment on the Web browser 58 of the host 51.

The user will describe information necessary to output image file stored in the host 51 to the remote printer 102 on the Web browser 58 according to contents of the HTML file downloaded from the print service server 57. Those description contents include image information for printing, a storage place of the Image forming instruction file where user information, etc. are stored (directory), an outputting printer 102 and a trustee service-company name, a method of receiving output images or the like.

In the case where the Image forming instruction file 12 does not exist in the host 51, it is required to be prepared according to a predetermined format, and in the third Embodiment, can be prepared by description onto the screen (an example of user interface) 62 on the Web browser displayed as in the above described FIG. 44.

When a user notifies the print service server 57 of respective places of the Image formation instruction file 12 via the Web browser 58 of the host 51 to execute print requests based on the contents of that image forming instruction file 12 (S1103), the print server 57 accesses to the outputting printer 102 designated by the host 51 to execute print requests by notifying places of the Image forming instruction files 12 notified by the host 51 and that host information (IP address etc.) (S1104).

Printer 102 receives print requests from the printer service server 57 to access to respective places of the image forming instruction file 12 of the remote host 51 via the Internet 55 according to received host information, information on the storage place of the image forming instruction file 12 (S1105). The Image forming instruction file 12 that is stored in a predetermined format inside that directory is searched and the found image forming instruction file 12 is downloaded (S1106). When a predetermined Image forming instruction file 12 has not been found at the time of searching, an error message may be displayed on the Web browser 58 of the host 51 via the print service server 57 in order to notify the user of that unjust event.

The printer 102 completes downloading of a predetermined Image forming instruction file 12, and then analyzes image information as well as user information, etc. described in this Image forming instruction file 12 (S1107). After analysis thereon, all the necessary image files having been described in the Image forming instruction file 12 are downloaded from that storage place (S1108, S1109), and the print job is prepared from the contents of the analysis of Image forming instruction file 12 as well as the downloaded the image files (S1110).

At the time of preparation of the printing job, with the sheet discharging mode of the printer being set at "user separate fixing" in advance, the "user separate fixing" mode is added to the sheet discharging designation of the printing job. In addition, at that time, designation of outputting destination for each image will become necessary, but automatic designation via such an application software that automatically allocates the outputting destination by the setting of the printer 102 may be taken as well. For example, being mediated by such an application software that reads out address being one of the user information of the Image forming instruction file 12 so as to classify it to respective regions with a predetermined classification method such as "classification on a prefecture basis inclusive of -to, -doh, -fu, and -ken", or "classification on a city bases inclusive of -ku, -shi, and -gun", "address" of the user information of the image forming instruction file 12 is automatically converted into "region name" so that the outputting destination of the image file 15 is designed by the region name of the user. That is, thus, designation on "user separate fixing" is not executed at the side of the user as in the above described third Embodiment, but is executed by automatic setting at the side of print service.

Thus, when the printing job generation is completed, the printer 102 starts print processing, and executes classification processing under "user separate fixing" mode as shown in FIG. 52 to output (S1111).

When the print processing indicated by the user is completed, the printer 102 notifies the print service server 57 of the fact that printing has come to an end (S1112). At that time, information of number of printing or the like that will become information for settling the print service charge will be notified additionally. When the print service server 57 receives a notice that printing has finished from the printer 102, the user will be provided with a notice on completion of printing, guidance on settlement of charge, and a method how to receive the output images with electric mail from electric mail address information at the time when printing has been requested at an appropriate point of time according to a predetermined setting of the print service operation corresponding with necessity (S1113). This notice of completion of printing and guidance may be provided via display on the Web browser 58 of the host 51.

Incidentally, in the conception view of FIG. 52, the printer 102 designates name of regions as distinguishing names based on address information of the user at the time of job generation to control so as to sheet-discharge to sheet-discharge bin to which the same distinguishing name as the distinguishing name (the region name of the user) of the image data at the time of print processing having been registered in advance. Thus also for printing indication from the remote host 51, via an application software or settings of the printer 102 etc., specific information of the Image forming instruction file 12 is converted into the distinguishing name to become the destination of outputting so that classification processing on the print materials can be automatically executed under user separate fixing.

As described above, the fourth Embodiment of the present invention starts printing immediately after indicating printing so that the prints will be ready when the user visits for example a developing laboratory to pick them up, and time can be spent efficiently. Moreover, with door-to-door delivery being designated, reception will become able to take place at home or at an office etc., which will provide with further convenience.

(Fifth Embodiment)

The above described third Embodiment of the present invention was an operation system that in the case where print request is executed from the host 51 by the user the printer 102 executes only download processing of the Image forming instruction file 12 and the image file 15 toward the host 51, and in the case where clear printing execution indication of the user is executed by the panel operation etc., the print processing starts, and the above described fourth Embodiment of the present invention was an operation system that, in the case where print request is executed from the host 51 by the user, the printer 102 executes downloading of the Image forming instruction file 12 and the image file 15 toward the host 51, and at the same time when this downloading is completed, the printing processing starts, but as in the fifth Embodiment of the present invention to be described as follows, such an operation system may be provided that, the user designates a storage destination of the Image forming instruction file 12 to be downloaded from the printer side so as to execute print request as well as printing indication, and the printer 102 executes download processing as well as print processing according to that indication.

In the fifth Embodiment of the present invention, only portions that are different from those in the third Embodiment (FIG. 54 and FIG. 55) will be described.

Figure 54:
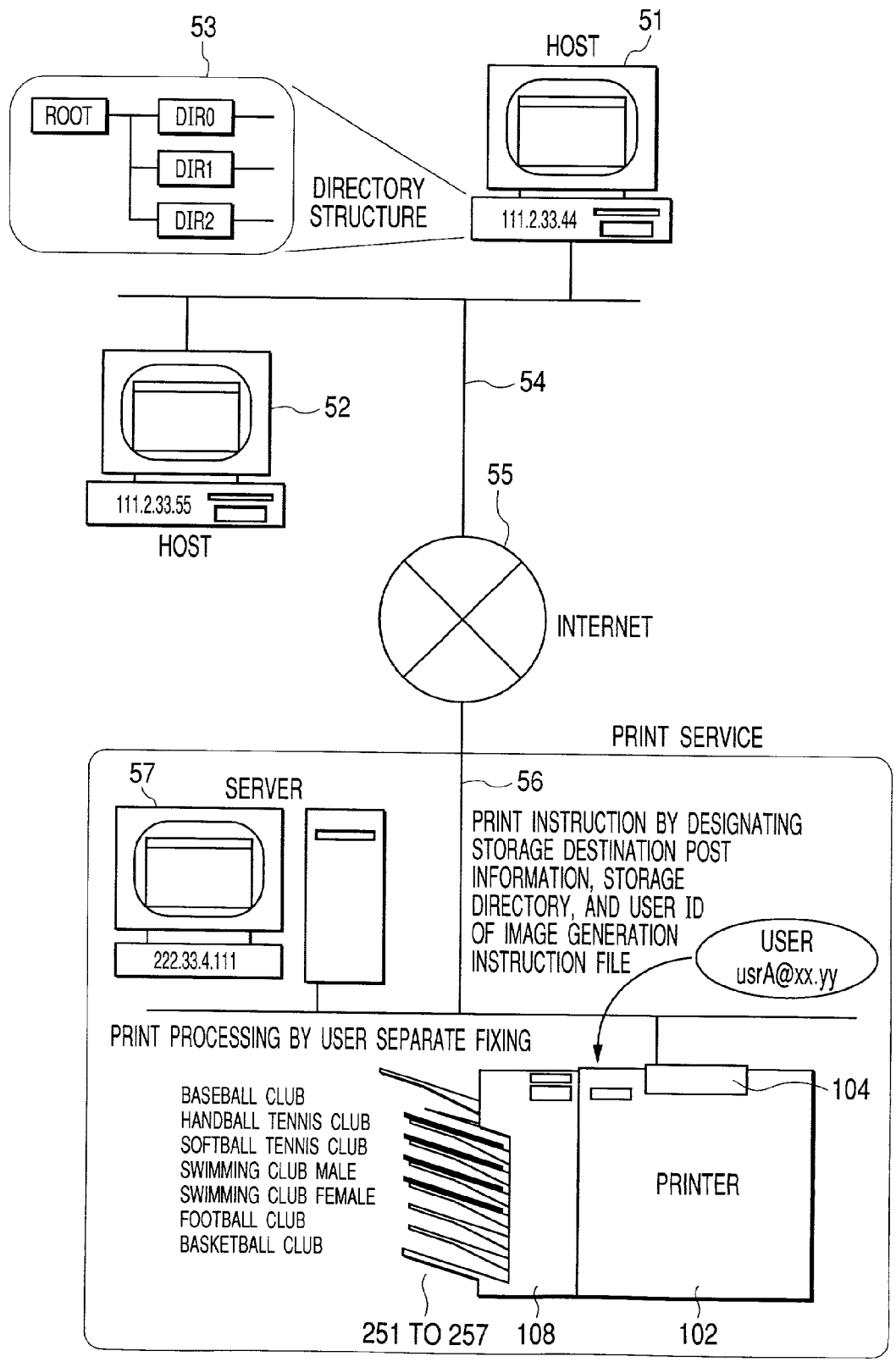
FIG. 54 shows the concept of an operation system in which the user issues an instruction to perform a printing process by designating a storage position of image data stored in a remote host computer using the panel unit of a printer, and the printer prints out the image data in the user separate fixing mode at the instruction according to a fifth embodiment of the present invention.
Figure 55:
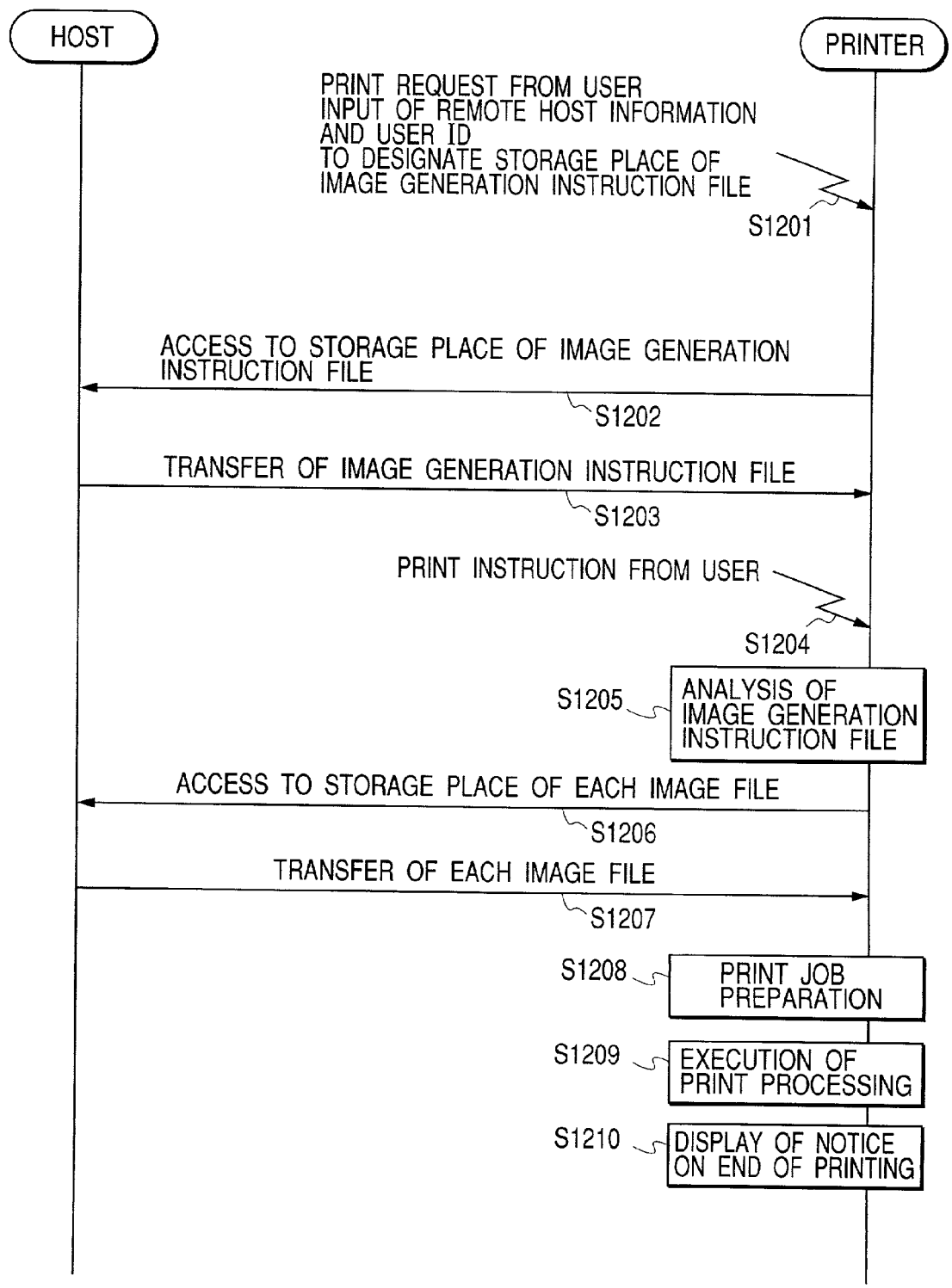
FIG. 55 shows an event trace view showing the procedure of an operation system in which the user issues an instruction to perform a printing process by designating a storage position of image data stored in a remote host computer using the panel unit of a printer, and the printer prints out the image data in the user separate fixing mode at the instruction according to the fifth embodiment of the present invention.

FIG. 54 shows an operation system for a user to execute a printing indication by designating the storage place of the image data of the remote host 51 with the panel part 104 of the printer 102 so that the printer 102 prints for outputting under user separate fixing mode according to that indication. FIG. 55 shows a processing procedure of that operation system.

At first, in FIG. 54, a host 51 with IP (Internet Protocol) address of "111.2.33.44" and a host 52 with IP address of "111.2.33.55" are constructed in the same LAN 54, and a server 57 with IP address of "222.33.4.111" and a printer 102 with IP address without clear description are constructed in the print service LAN 56. Moreover, the respective LAN 54 and 56 are brought into connection via the Internet 55.

Under such system, procedures for a user to designate the storage place of the image data 15 of the remote host 55 with the panel part 104 of the printer 102 to execute a printing indication and for the printer 102 to execute printing for outputting under user separate fixing mode according to that indication will be described as follows with reference to FIG. 55.

In FIG. 55, the user designates host information (IP address etc.) in which the image data for outputting are stored with panel operations etc. toward the printer 102. Moreover, the user ID (account name, password etc.) for accessing to that host is inputted and the storage place (directory) of the Image forming instruction file 12 is designated so that print request is executed to the printer 102 (S1201). In the example in FIG. 54, "111.2.33.44" is designated as the host information.

When the user requests printing, the printer 102 accesses to the remote host 51 designated by the user via the Internet 55 (S1202). According to information in the storage place of the instructed Image forming instruction file 12, the Image forming instruction file 12 that is stored in a predetermined format is searched and the found Image forming instruction file 12 is downloaded (S1203). When a predetermined Image forming instruction file has not been found at the time of searching, an error message may be displayed on the panel 104 in order to notify the user of that unjust event.

The printer 102 completes downloading of a predetermined Image forming instruction file 12, and then displays a download completion message on the panel 104 in order to notify that downloading has been completed.

After completion of downloading of the Image forming instruction file 104, the user executes detailed print setting on the user interface 64 of the printer as shown in the above described FIG. 46 in the third Embodiment and executes printing indication (S1204). At that time, the printer 102 analyzes the downloaded Image forming instruction file 12 (S1205) so as to supply with necessary information when the user is executing print setting, reflects the print setting changed by the user onto the Image forming instruction file 12.

In receipt of the printing execution indication from the user, the printer 102 accesses to the storage place of respective necessary image files according to a result of analysis of the Image forming instruction file 12 in S1205 (S1206) so as to execute download of respective image files (S1207).

The downloaded Image forming instruction file 12 as well as image files 15 are arranged to be stored in a predetermined recording device allocated to each user. In the case where image files 15 are stored, staying conscious of the directory classification designated to the Image forming instruction file 12, storage takes place in such a construction that relative path of each image file 15 from the Image forming instruction file 12 will become the same as the destination of downloading. However, in the case where the same construction is impossible, the user is notified of that, or changed path subject to storage in a form that can be constructed may be reflected to the Image forming instruction file 12.

Thus, when downloading of all the image files is completed, the printer 102 prepares the printing job (S1208). At the time of preparation of the printing job, with the sheet discharging mode of the printer 102 being set at "user separate fixing" among print setting from the user, the "user separate fixing" mode is added to the sheet discharging designation of the printing job.

When the printing job generation is completed, the printer 102 starts print processing, and executes classification processing under "user separate fixing" mode as shown in FIG. 54 to print for outputting (S1209).

When the printing processing is completed, the printer 102 displays a printing completion message to the panel 104 in order to notify the user that printing is completed (S1210). At that time, information of number of printing or the like that will become information for settling the print service charge will be notified additionally.

Incidentally, the printing indication of S1204 may come after the processing of S1201 or may come after S1207 if the print setting of the Image forming instruction file 12 is not changed in particular.

As described above, in the fifth Embodiment of the present invention, all the operations can be executed on the image recording device 102, and even such a user that does not have a personal computer or a mobile terminal will become capable of taking an operable mode. Moreover, designation equivalent to the Web browser input which personal computers execute can be executed from a panel 104 on the image recording device 102, and therefore a server 57 is not needed to be provided in particular so that cost reduction will become attainable.

(Variation 1 of Third to Fifth Embodiments)

In the above described third to fifth embodiments of the present invention, printing execution indication or printing reservation indication was executed from the host computers 51 and 52 or the printer 102, but printing execution indication or printing reservation indication may be executed form outside equipments such as a portable terminal etc. that is communicable with the Internet 55.

Figure 56:
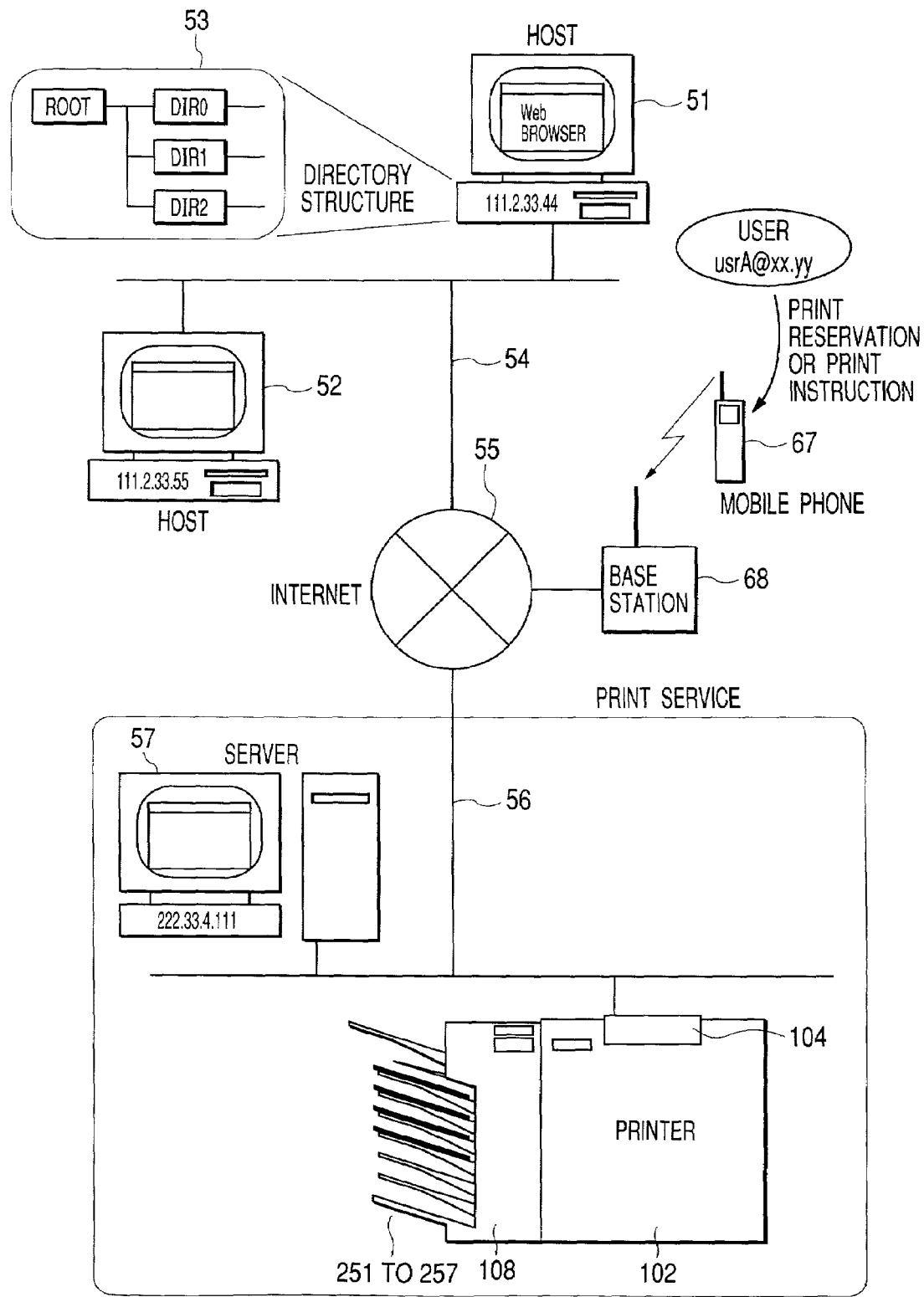
FIG. 56 shows the concept of the operation system in which the user issues an instruction to perform or reserve a printing process from a portable terminal, and a printer performs a predetermined printing process in a variation 1 according to the third to fifth embodiments of the present invention.

FIG. 56 shows an operation system for a user to execute printing execution indication or printing reservation indication from a portable terminal 67 so that the printer 102 executes a predetermined print processing according to that indication. In FIG. 56, the user executes the printing execution indication or the printing reservation indication of a predetermined print processing based on the Image forming instruction file 12 as well as the image file 15 stored in the host computer "111.2.33.44" from a portable telephone 67. That indication is notified to the printer 102 from the portable telephone 67 via a base station 68 and the Internet 55, and the printer 102 executes a predetermined download processing or print processing as the above described third to fifth embodiments.

Incidentally, the portable terminal 67 does not have to be a portable telephone, but anything will do if it is communicable with the base station 68, any communication means will do. In addition, it goes without saying that such an operation system that another (not shown) outside equipment is brought into connection with the tip of the portable terminal 67, and from that outside equipment, printing execution indication or print reservation indication is executed will do.

As described above, in the present example, without any host computers 51 and 52, printing execution indication or printing reservation indication can be executed, and printing execution indication or printing reservation indication can be executed from the mobile terminal 67, and therefore without preference in places, but printing execution indication or printing reservation indication will become executable from anywhere.

(Variation 2 of Third to Fifth Embodiments)

In the above described third to fifth Embodiments, the server 57 constructed in the same LAN 56 as the printer 102 was a server to control settings etc. of the printer 102 and to provide the user with print service with Web browser etc., but such a server that provides the user with print service with Web browser etc. or such a server that controls settings of a printer does not have to be constructed in the same LAN 56 as the printer 102, servers to perform respective functions do not have to be the same server, and moreover, the server to provide the user with print service with Web browser etc. may function as a relay server to relay the communication processing between the hosts 51 and 52 and the printer 102, and download the Image forming instruction file 12 as well as the image file 15 that the user made print reservation from the host 51 to the storage region that the relay server controls, and in the case where printer executed printing indication, may be an operation system that the printer downloads the Image forming instruction file 12 as well as the image file 15 from the relay server to execute print processing.

Figure 57:
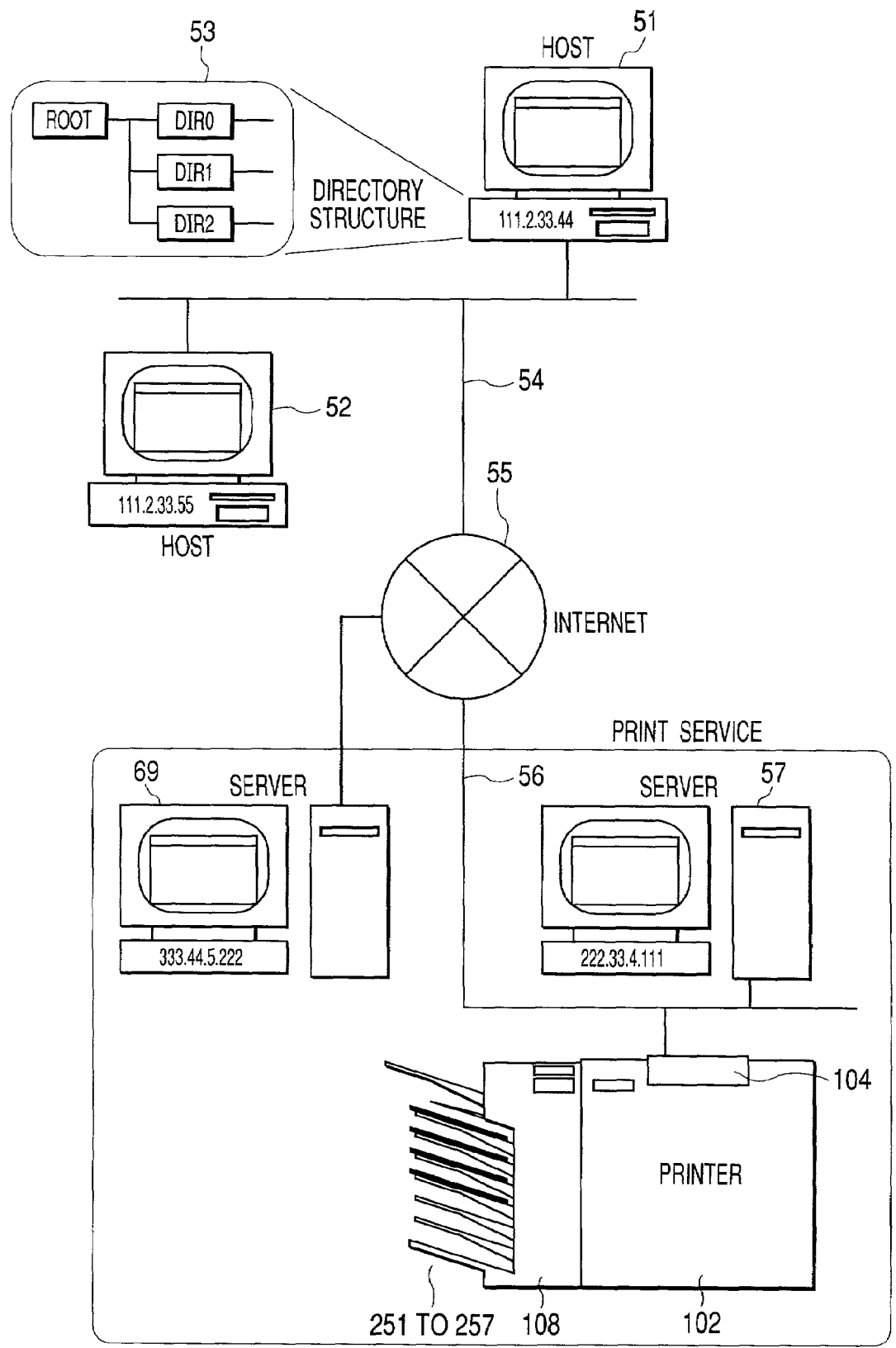
FIG. 57 shows the concept of the operation system in which a server providing a print service is not configured in the same LAN as a printer in a variation 2 according to the third to fifth embodiments of the present invention.

FIG. 57 shows such an operation system that the server supplying with print service is not constructed in the same LAN 56 as the printer 102. In FIG. 57, the server "333.44.5.222" to provide the user with a print service with the Web browser etc. shown in reference numeral 69 is brought into communication connection with the printer 102 or the hosts 51 and 52 via the Internet 55 so as to function as a relay server to relay the communication processing between the host 55 and the printer 102.

Under such a system, in receipt of the printing reservation indication from the user in the host "111.2.33.44" with reference numeral 51, the server "333.44.5.222" with reference numeral 69 downloads the Image forming instruction file 12 and the image file 15 from the host "111.2.33.44" with the reference numeral 51 to store them in the storage region which that server 69 controls.

Thereafter, in the case where the user has indicted printing execution from the side of the printer 102, the printer 102 downloads the Image forming instruction file 12 as well as the image file 15 of that user from the server "333.44.5.222" with reference numeral 69 to execute print processing. On the other hand, the server "222.33.4.111" with reference numeral 57 that is constructed on the same LAN 56 as the printer 102 and controls setting etc. of the printer 102 executes setting on access to the relay server "333.44.5.222" with reference numeral 69 toward the printer 102 as well as setting of sheet discharging means at the time of printing etc.

Thus, in the case where the host 51 executes the printing reservation, storing the Image forming instruction file 12 as well as the image file 15 to be downloaded into the storage region that the relay server 69 controls, the user changes the reception place that he/she designated at the time of printing reservation, and even when another printer 102 executes printing indication, printing indication can be executed from that another print 102 and from that another printer 102 image outputting can be executed.

(Variation 3 of Third to Fifth Embodiments)

Figure 58:
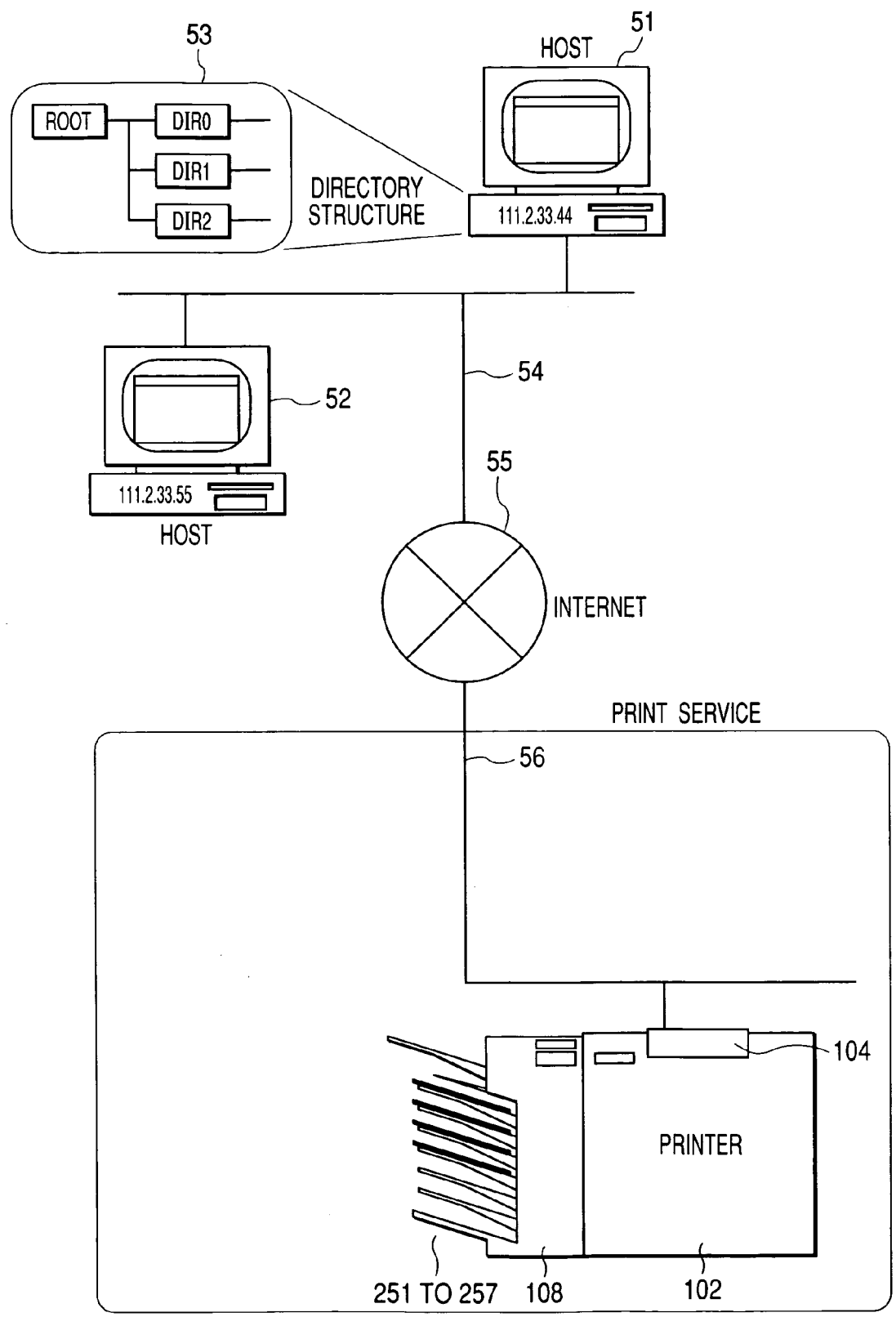
FIG. 58 shows the concept of the operation system in which a printer has the function of receiving a print request and a print reservation request from a host computer, or managing a print setting process, etc. in a variation 3 according to the third to fifth embodiment of the present invention.

In the above described third to fifth Embodiments of the present invention, the printer 102 receives the printing request or printing reservation request from the host 51 via the server 57 and the printing indication etc. was controlled by the server 57, but the printer 102 itself may have the function to receive print request and printing reservation request from the host 51 or control etc. of print setting etc. and be an operation system without server as shown in FIG. 58.

Thus, in the present example, since it is not necessary to provide a server, costs for the system such as print service etc. can be reduced.

(Variation 4 of Third to Fifth Embodiments)

The above described third to fifth Embodiments of the present invention involved account name or electric mail address when the user ID is inputted, but the printer may distinguish the user by insertion of information storage medium such as an ID card etc., in which a predetermined ID information is stored, into the printer to read in the inserted information storage medium.

In addition, the above described information storage medium may store not only user ID but also information such as host information as well as information of storage directory of Image forming instruction file, and the printer may be the one to read out that information to access to a predetermined host and a predetermined directory.

Moreover, the above described storage medium may store the Image forming instruction file itself, and the printer may read out that information to access to a predetermined host and a predetermined directory so as to start download processing as well as print processing of image files automatically from the contents of the read out Image forming file.

Thus, in the present example, instead of user ID or password inputting, insertion of ID card will do, which will further simplify the user operation. In addition, in order to enhance security, password may be inputted without exception.

(Variation 5 of Third to Fifth Embodiment)

In the above described third to fifth embodiment of the present invention, the user was supposed to designate the host information (IP account etc.) at the time of print request, but if the printer can register host information as well as the user information, the host information as well as the user information is designated and registered only at the first time, at the time of print requests for the second time and onward, designation of only the user information such as the user ID etc. may enable access automatically to the host that has been registered in advance.

In the case where only a specific printer is used, print services can execute printing indication easily and is efficient.

In addition, as a registration contents to the printer, not only the designated host information but also information such as Image forming instruction file storage destination inside that designated host etc. can be made to be registered, and for such a user that will store the Image forming instruction file only in a specific directory, printing indication can be executed efficiently.

Thus, the present example enables registration of the user information so as to enable the utilizing user for the second time and onwards to save time.

(Variation of Fifth Embodiment)

In the above described fifth Embodiment of the present invention, the user had to input for designation the path from the root directory of the designated host in its entirety to the printer at the time of designating storage place (directory) of the Image forming instruction file stored in a remote host, but if the printer accesses to the designated host and is a printer which can display that directory class to the user, it may involve the user to proceed with searching a desired Image forming instruction file from the root directory.

Thus, the present example only has to designate the host where Image forming instruction file exists and will become able to save time for the user's inputting when to execute print request.

(Other Embodiments)

Incidentally, the present invention may be applied to a system constructed by a plurality of equipments (such as a host computer, interface equipment, a reader and a printer etc.), or may be applied to a device (for example, photocopier and a facsimile device etc.) consisting of one equipment.

In addition, it goes without saying that the purpose of the present invention is attainable by supplying a system or a device with recording medium (storage medium) that has recorded program codes of a software to realize the functions of the above described embodiment so that the computer (or CPU and MPU) of that system or device reads out program codes stored in the recording medium for execution.

In this case, the program codes themselves that were read out from the recording medium will realize the functions of the above described embodiments, and the recording medium that recorded that program codes will construct the present invention.

As the recording medium to record that program codes and the variable data such as a table etc., for example, a floppy disk (FD), a hard disk, an optical disk, an optical magnetic disk, a CD-ROM, a CD-R, a magnetic tape, non-volatile memory card (IC memory card) and a ROM etc. can be used.

In addition, it goes without saying that, by executing the program codes that the computer reads out, not only functions of the above described embodiments are realized, but also such a case that, based on indications of that program code, the OS (operating system) etc. that is operating on the computer executes a part or all of the actual processing is included.

As having been described so far, according to the present invention, irrespective of existence or lack of a host computer, for printing from a storage device on an outside device such as a digital camera etc., and printing from storage medium such as a memory card etc., printing indications such as sheet discharging selection or the like will be made executable from an existing devices such as a digital camera and a printing device etc. so as to enable realization of automatic sheet discharging methods fulfilling the needs of users and enhancement of efficiency in various classifying operation such as classification of printed materials for personal use, and in classification for each client in the print service work.

In addition the present invention enables to request printing for a necessary copies on necessary items from home or anywhere without limitation on places by adding the image data storage place, the print destination, the number of print, the sheet discharging method, the reception method and the payment method for charges etc. to electronic information to execute communication between image recording devices such as printer etc. and outside devices such as a personal computer, a mobile terminal and a digital camera etc. in print services such as printing etc., so as to be interpretable with an image recording device.

Moreover, as for reception, the present invention will enable to provide users with a mode of service fulfilling his/her needs by enabling designation of neighborhood of a residence or a place nearby the traveling destination (convenience store, developing laboratory, personal computer shop etc.) where the image recording device is installed or door-to-door delivery etc. by designating the reception place so as to enable reception at place and by method convenient to users and saving time for clients to request print services, thus providing users with a mode of service fulfilling his/her needs.

Moreover, in the present invention, all print indications are stored in electronic information, and shop clerks who conduct printing will not have to execute elections of images etc. by way of memo to save time for printing operation, enabling to enhance efficiency in printing services.

In addition, according to the present invention, without executing any indications from the host computer, in direct printing from a host computer on a network or a storage medium on an outside device such as a digital camera etc., printing indications such as sheet discharging selection or the like will be made executable from an existing devices such as a digital camera and a printing device etc. so as to enable realization of automatic sheet discharging methods fulfilling the needs of users and enhancement of efficiency in various classifying operation such as classification of printed materials for personal use, and in classification for each client in the print service work.

What is claimed is:

1. An image recording device, comprising:
   a designation unit, adapted for designating a name of each paper discharge tray;
   a connection unit, adapted for detachably connecting to said device a memory card that stores image data and attached information for the image data; and
   a determination unit, adapted for determining a paper discharge tray of paper recording an image based on the image data read from the memory card connected by said connection unit according to the attached information read from the connected memory card, and the name designated by said designation unit.

2. The image recording device according to claim 1, wherein said attached information contains any of an owner, a date, a title, a destination user, and a directory.

3. The image recording device according to claim 1, wherein said attached information contains a name of a paper discharge tray.

4. An image recording device, comprising:
   designation means for designating a name of each paper discharge tray;
   determination means for determining a paper discharge tray of paper recording an image based on image data read from storage means according to attached information read from said storage means for storing image data and image data attached information, and the name designated by said designation means; and
   display means for displaying a name and a load capacity of each paper discharge tray.

5. An image recording device, comprising:
   designation means for designating a name of each paper discharge tray; and determination means for determining a paper discharge tray of paper recording an image based on image data read from storage means according to attached information read from said storage means for storing image data and image data attached information, and the name designated by said designation means, wherein said attached information and image data are stored in said storage means by a digital camera.

6. An image recording method for an image recording device, comprising:
   a designating step of designating a name of each paper discharge tray;
   a connection step of detachably connecting to said device a memory card that stores image data and attached information for the image data; and
   a determining step of determining a paper discharge tray of paper recording an image based on the image data read from the memory card connected during said connection step according to the attached information read from the connected memory card, and the name designated in said designating step.

7. The image recording method according to claim 6, wherein said attached information contains any of an owner, a date, a title, a destination user, and a directory.

8. The image recording method according to claim 6, wherein said attached information contains a name of a paper discharge tray.

9. An image recording method, comprising:
   a designating step of designating a name of each paper discharge tray;
   a determining step of determining a paper discharge tray of paper recording an image based on image data read from storage means according to attached information read from the storage means for storing image data and image data attached information, and the name designated in said designating step; and
   a displaying step of displaying a name and a load capacity of each paper discharge tray.

10. An image recording method, comprising:
    a designating step of designating a name of each paper discharge tray; and
    a determining step of determining a paper discharge tray of paper recording an image based on image data read from storage means according to attached information read from the storage means for storing image data and image data attached information, and the name designated in said designating step, wherein said attached information and image data are stored in said storage means by a digital camera.

11. A computer-readable program, comprising:
    a designating step of designating a name of each paper discharge tray;
    a connection step of detachably connecting to said device a memory card that stores image data and attached information for the image data; and
    a determining step of determining a paper discharge tray of paper recording an image based on the image data read from the memory card connected during said connection step according to the attached information read from the connected memory card, and the name designated in said designating step.

12. The computer-readable program according to claim 11, wherein said attached information contains any of an owner, a date, a title, a destination user, and a directory.

13. The computer-readable program according to claim 11, wherein said attached information contains a name of a paper discharge tray.

14. A computer-readable program, comprising:
    a designating step of designating a name of each paper discharge tray;
    a determining step of determining a paper discharge tray of paper recording an image based on image data read from storage means according to attached information read from the storage means for storing image data and image data attached information, and the name designated in said designating step; and
    a displaying step for displaying a name and a load capacity of each paper discharge tray.

15. A computer-readable program, comprising:
    a designating step of designating a name of each paper discharge tray; and
    a determining step of determining a paper discharge tray of paper recording an image based on image data read from storage means according to attached information read from the storage means for storing image data and image data attached information, and the name designated in said designating step, wherein said attached information and image data are stored in said storage means by a digital camera.

16. A storage medium storing a computer-readable program, wherein said program comprises:
    a designating step of designating a name of each paper discharge tray;
    a connection step of detachably connecting to said device a memory card that stores image data and attached information for the image data; and
    a determining step of determining a paper discharge tray of paper recording an image based on the image data read from the memory card connected during said connection step according to the attached information read from the connected memory card, and the name designated in said designating step.

17. The storage medium according to claim 16, wherein said attached information contains any of an owner, a date, a title, a destination user, and a directory.

18. The storage medium according to claim 16, wherein said attached information contains a name of a paper discharge tray.

19. A storage medium storing a computer-readable program, wherein said program comprises:
    a designating step of designating a name of each paper discharge tray;
    a determining step of determining a paper discharge tray of paper recording an image based on image data read from storage means according to attached information read from the storage means for storing image data and image data attached information, and the name designated in said designating step; and
    a displaying step of displaying a name and a load capacity of each paper discharge tray.

20. A storage medium storing a computer-readable program, wherein said program comprises:
    a designating step of designating a name of each paper discharge tray; and
    a determining step of determining a paper discharge tray of paper recording an image based on image data read from storage means according to attached information read from the storage means for storing image data and image data attached information, and the name designated in said designating step, wherein said attached information and image data are stored in said storage means by a digital camera.

* * * * *

UNITED STATES PATENT AND TRADEMARK OFFICE
CERTIFICATE OF CORRECTION

| | | |
|---|---|---|
| PATENT NO. | : 6,965,404 B2 | |
| APPLICATION NO. | : 09/910896 | |
| DATED | : November 15, 2005 | |
| INVENTOR(S) | : Hosoda et al. | |

It is certified that error appears in the above-identified patent and that said Letters Patent is hereby corrected as shown below:

ON TITLE PAGE, COL. 1:
(75) Inventors: "Nobuyodhi Kakigi" should read -- Nobuyoshi Kakigi --.
(56) References Cited, FOREIGN PATENT DOCUMENTS:
    "62244870 A" should read -- 62-244870 A --;
    "07187491 A" should read -- 07-187491 A --;
    "09086783 A" should read -- 09-086783 A --;
    "10013609 A" should read -- 10-013609 A --; and
    "11069076 A" should read -- 11-069076 A --.

DRAWINGS:
Sheet 6, FIG. 6, "PORT DESIGNATED" should read -- PORT BEEN DESIGNATED --;
Sheet 8, FIG. 8, "WRINING" should read -- WARNING --;
Sheet 15, FIG. 15, "ABNORMALLY" should read -- ABNORMALITY --;
Sheet 21, FIG. 21, "CASSETTE1" should read -- CASSETTE 1 --;
Sheet 28, FIG. 29, "ORT" should read -- PORT --;
Sheet 33, FIG. 34 (2 occurrences), "INSUTRUCTION" should read
    -- INSTRUCTION --, "DEGITAL" should read -- DIGITAL --, and
    "WRINING" should read -- WARNING --;
Sheet 46, FIG. 47, "INSUTRUCTION" should read -- INSTRUCTION --;
Sheet 50, FIG. 51, "HOTOGRAPH" should read -- PHOTOGRAPH --; and
Sheet 53, FIG. 54, "POST" should read -- HOST --.

COLUMN 5:
Line 34, "a laborious" should -- laborious --.

COLUMN 7:
Line 18, "detained" should read -- detailed --.

COLUMN 11:
Line 15, "collect" should read -- collects --; and
Line 47, "clerks" should read -- clerk --.

COLUMN 19:
Line 28, "roller 205" should read -- rollers 205 --.

COLUMN 20:
Line 21, "genera-purpose" should read -- general-purpose --.

UNITED STATES PATENT AND TRADEMARK OFFICE
CERTIFICATE OF CORRECTION

PATENT NO. : 6,965,404 B2
APPLICATION NO. : 09/910896
DATED : November 15, 2005
INVENTOR(S) : Hosoda et al.

It is certified that error appears in the above-identified patent and that said Letters Patent is hereby corrected as shown below:

COLUMN 21:
Line 9, "boy" should read -- body --;
Line 31, "flatter 280" should read -- flapper 280 --;
Line 36, "flatter 280" should read -- flapper 280 --; and
Line 67, "staple" should read -- stapler --.

COLUMN 22:
Line 15, "roller 205" should read -- rollers 205 --;
Line 17, "downsream" should read -- downstream --;
Line 28, "flatter 211" should read -- flapper 211 --; and
Line 64, "printing" should read -- printing, --.

COLUMN 23:
Line 43, "in to" should read -- into --.

COLUMN 25:
Line 2, "he" should read -- the --; and
Line 49, "troubles" should read -- troubles, --.

COLUMN 26:
Line 63, "gape" should read -- gap --.

COLUMN 28:
Line 22, "bases" should read -- basis --;
Line 30, "bases." should read -- basis. --;
Line 33, "on a" should read --on --;
Line 34, "bases," should read -- basis, --; and
Line 47, "the all" should read -- all the --.

COLUMN 29:
Line 5, "temporally" should read -- temporarily --; and
Line 56, "processings." should read -- processing. --.

COLUMN 31:
Line 6 and 55, "bases" should read -- basis --.

COLUMN 32:
Line 18 and 61, "bases" should read -- basis --.

UNITED STATES PATENT AND TRADEMARK OFFICE
CERTIFICATE OF CORRECTION

PATENT NO. : 6,965,404 B2
APPLICATION NO. : 09/910896
DATED : November 15, 2005
INVENTOR(S) : Hosoda et al.

It is certified that error appears in the above-identified patent and that said Letters Patent is hereby corrected as shown below:

COLUMN 33:
Line 5, "sheet" should read -- sheet, --;
Line 7, "person" should read -- persons --;
Line 37, "'hardball" should read -- "handball --; and
Line 65, "operation" should read -- operation by --.

COLUMN 34:
Line 13, "'hardball" should read -- "handball --; and
Line 61, "of an" should read -- of a --.

COLUMN 35:
Line 49, "having" should read -- having been --.

COLUMN 37:
Line 37, "trays 215" should read -- trays 251 --.

COLUMN 38:
Line 58, "hose 51" should read -- host 51 --.

COLUMN 39:
Line 62, "(907)." should read -- (S907). --.

COLUMN 41:
Lines 10 and 56, "'hardball" should read -- "handball --.

COLUMN 43:
Lines 10 and 20, "information" should read -- information, --;
Line 34, "camera" should read -- camera, --;
Line 56, "'hardball" should read -- "handball --; and
Line 60, "temporally" should read -- temporarily --.

COLUMN 47:
Lines 18 and 51, "bases" should read -- basis --; and
Line 46, "copies," should read -- copies," --.

COLUMN 48:
Line 1, "become" should read -- becomes --;
Line 17, "print" should read -- print, --;
Line 22, "password" should read -- password, --; and
Line 37, "operation" should read -- operation, --.

UNITED STATES PATENT AND TRADEMARK OFFICE
CERTIFICATE OF CORRECTION

| | |
|---|---|
| PATENT NO. | : 6,965,404 B2 |
| APPLICATION NO. | : 09/910896 |
| DATED | : November 15, 2005 |
| INVENTOR(S) | : Hosoda et al. |

It is certified that error appears in the above-identified patent and that said Letters Patent is hereby corrected as shown below:

<u>COLUMN 49</u>:
Line 33, "address" should read -- address, --; and
Line 56, "the" should be deleted.

<u>COLUMN 50</u>:
Line 4, "bases" should read -- basis --;
Line 42, "printer 102" should read -- printer 102, --;
Line 53, "office" should read -- office, --; and
Line 62, "operation" should read -- operation, --.

<u>COLUMN 51</u>:
Line 35, "address" should read -- address, --;
Line 36, "operations" should read -- operations, --; and
Line 37, "password" should read -- password, --.

<u>COLUMN 52</u>:
Line 55, "form" should read -- from --; and
Line 56, "terminal" should read -- terminal, --.

<u>COLUMN 53</u>:
Line 25, "settings" should read -- settings, --;
Lines 26, 28, 32, and 47, "browser" should read -- browser, --; and
Line 66, "setting" should read -- setting, --.

<u>COLUMN 54</u>:
Line 2, "printing" should read -- printing, --;
Line 16, "indication" should read -- indication, --;
Line 19, "control" should read -- control, -- and "setting" should read -- setting, --;
Line 23, "service" should read -- service, --;
Line 30, "card" should read -- card, --;
Line 54, "account" should read -- account, --; and
Line 60, "ID" should read -- ID, --.

UNITED STATES PATENT AND TRADEMARK OFFICE
CERTIFICATE OF CORRECTION

PATENT NO. : 6,965,404 B2  Page 5 of 5
APPLICATION NO. : 09/910896
DATED : November 15, 2005
INVENTOR(S) : Hosoda et al.

It is certified that error appears in the above-identified patent and that said Letters Patent is hereby corrected as shown below:

COLUMN 55:
Line 1, "host" should read -- host, --;
Line 24, "printer" should read -- printer, --;
Line 26, "device" should read -- device, --;
Lines 38 and 40, "that" should read -- those --;
Line 41, "table" should read -- table, --;
Line 44, "ROM" should read -- ROM, --;
Line 50, "system)" should read -- system), --;
Line 55, "camera" should read -- camera, --;
Line 56, "card" should read -- card, --;
Line 58, "an" should be deleted; and
Line 59, "device" should read -- device, --.

COLUMN 56:
Line 3, "charges" should read -- charges, --;
Line 5, "printer" should read -- printer, --;
Lines 6 and 26, "camera" should read -- camera, --;
Line 7, "printing" should read -- printing, --;
Line 13, "shop" should read -- shop, --;
Line 14, "delivery" should read -- delivery, --;
Line 21, "images" should read -- images, --; and
Line 29, "device" should read --device, --.

Signed and Sealed this

Thirty-first of October, 2006

JON W. DUDAS
*Director of the United States Patent and Trademark Office*